US011993418B2

(12) United States Patent
Brunner et al.

(10) Patent No.: US 11,993,418 B2
(45) Date of Patent: May 28, 2024

(54) MODULE ARTICULATION SYSTEM

(71) Applicant: KETER HOME AND GARDEN PRODUCTS LTD, Herzliya (IL)

(72) Inventors: Yaron Brunner, Kibbutz Gvat (IL); Ayala Vardi Bougay, Kefar Veradim (IL); Omer Menashri, Kibbutz Afikim (IL)

(73) Assignee: KETER HOME AND GARDEN PRODUCTS LTD, Herzliya (IL)

( * ) Notice: Subject to any disclaimer, the term of this patent is extended or adjusted under 35 U.S.C. 154(b) by 248 days.

(21) Appl. No.: 17/593,937

(22) PCT Filed: Mar. 30, 2020

(86) PCT No.: PCT/IL2020/050385
§ 371 (c)(1),
(2) Date: Sep. 28, 2021

(87) PCT Pub. No.: WO2020/202146
PCT Pub. Date: Oct. 8, 2020

(65) Prior Publication Data

US 2022/0177191 A1 Jun. 9, 2022

(30) Foreign Application Priority Data

Mar. 31, 2019 (IL) ........................................ 265736

(51) Int. Cl.
*B65D 21/036* (2006.01)
*A45C 5/03* (2006.01)
(Continued)

(52) U.S. Cl.
CPC ............ *B65D 21/0204* (2013.01); *A45C 5/03* (2013.01); *A45C 5/14* (2013.01); *A45C 7/0045* (2013.01);
(Continued)

(58) Field of Classification Search
CPC . A45C 13/1076; A45C 13/14; A45C 13/1084; A45C 13/10; A45C 5/03; B65D 21/0204; B65D 21/0223
See application file for complete search history.

(56) References Cited

U.S. PATENT DOCUMENTS 9,145,230 B2 9/2015 Madsen

FOREIGN PATENT DOCUMENTS

CN 107708935 A 2/2018
DE 10 2015 013 053 A1 4/2017
(Continued)

*Primary Examiner* — Stephen J Castellano
(74) *Attorney, Agent, or Firm* — Vorys, Sater, Seymour and Pease LLP; Anthony P. Venturino; Maryellen Feehery Hank

(57) ABSTRACT

Provided is a utility module including a base portion and a top portion and having a front side and a back side with a locking path extending between the front side and the back side. The top portion is configured at a back portion thereof with at least one back locking bar and at a front portion thereof with at least one front locking bar extending parallel to said back locking bar. The base of the utility module is configured at a back portion thereof with a back bar coupling recess facing towards the back side and having a back under-bar arresting surface and a front bar locking arrangement comprising a front facing barrier wall and a locking lever comprising an arresting tongue extendable in front of said barrier wall and having a front under-bar arresting surface.

21 Claims, 39 Drawing Sheets

(51) Int. Cl.

| | |
|---|---|
| ***A45C 5/14*** | (2006.01) |
| ***A45C 7/00*** | (2006.01) |
| ***A45C 13/10*** | (2006.01) |
| ***A45C 13/38*** | (2006.01) |
| ***B25H 3/02*** | (2006.01) |
| ***B65D 21/02*** | (2006.01) |

(52) U.S. Cl.
CPC ........ *A45C 13/1076* (2013.01); *A45C 13/385* (2013.01); *B25H 3/02* (2013.01)

(56) References Cited

FOREIGN PATENT DOCUMENTS

| | | | |
|---|---|---|---|
| WO | 2017/191628 | A1 | 11/2017 |
| WO | 2019/028041 | A | 2/2019 |

FIG. 3D
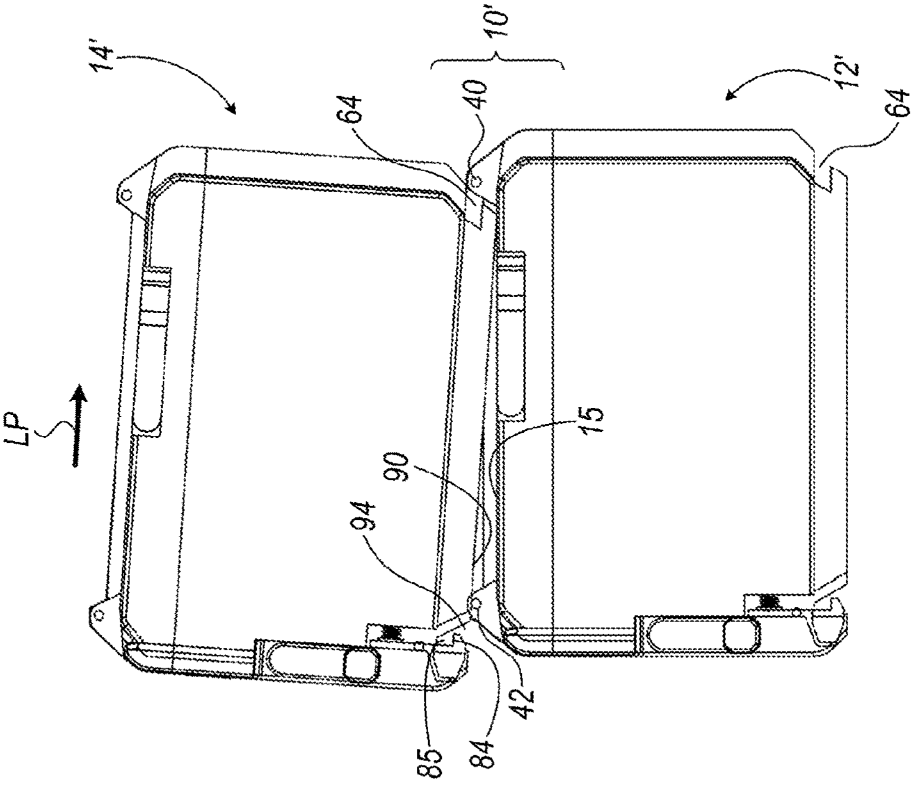
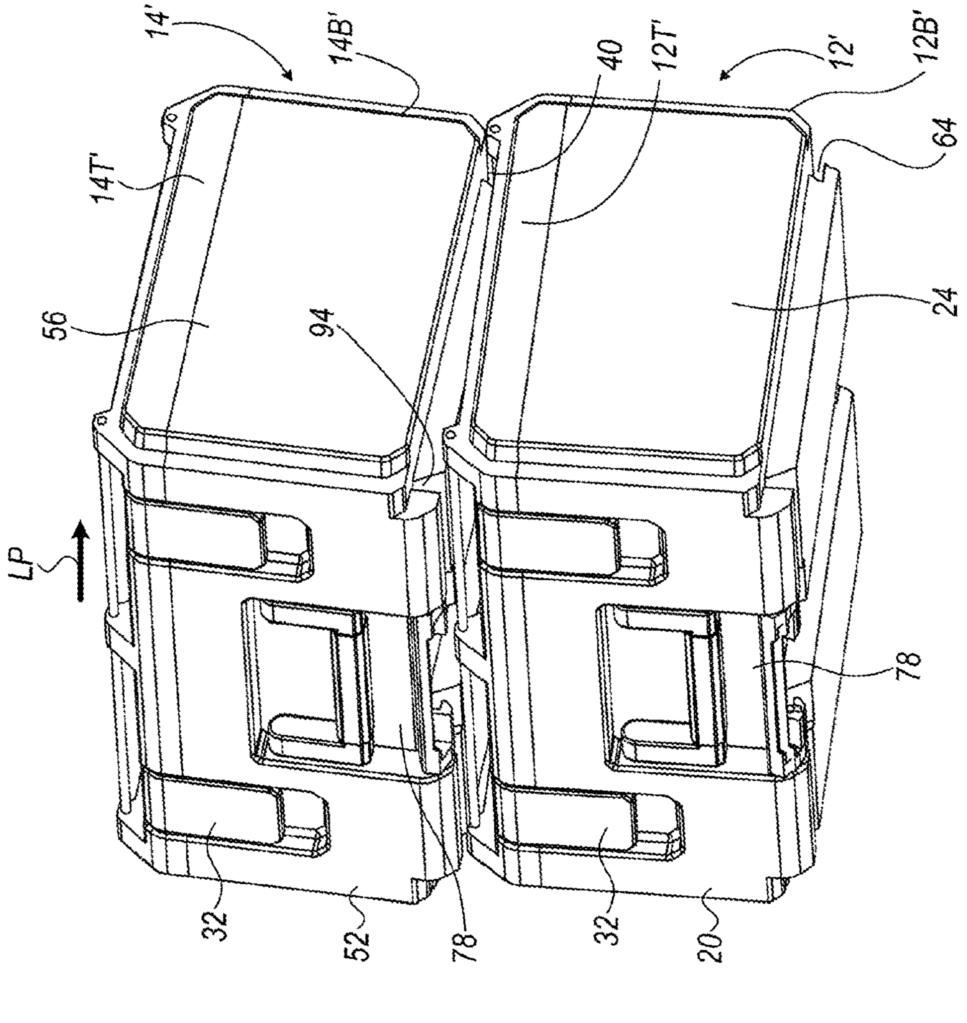
FIG. 3C

MODULE ARTICULATION SYSTEM

This application is the national stage of international application No. PCT/IL2020/050385 filed 30 Mar. 2020.

TECHNOLOGICAL FIELD

The present disclosure concerns a utility module articulation system. The disclosure further concerns a utility module system, and with a coupling mechanism facilitating detachably attaching utility modules to one another.

BACKGROUND ART

References considered to be relevant as background to the presently disclosed subject matter are listed below:

WO17191628

WO19028041

Acknowledgement of the above references herein is not to be inferred as meaning that these are in any way relevant to the patentability of the presently disclosed subject matter.

BACKGROUND

WO17191628 concerns a coupling mechanism for detachably attaching two or more utility modules to one another, utility assembles, mobile carriers and other attachable modules and articles.

WO19028041 concerns a storage container with various aspects. The storage container may have cleats or cleat receptacles to interact with other storage containers and/or accessories. The storage container may also include rails for attachment of various accessories. Some versions of the storage container may further include telescopic uprights connected to a handle. Many of the versions of the storage containers may further include wheels for transporting the storage containers and their contents.

GENERAL DESCRIPTION

The present disclosure is concerned with utility module articulation and suspension system, and with utility modules configured with an articulation and suspending system.

The term utility module as used herein the specification and claims is used in its broad sense. A utility module can be any article of utility articulatable to any other utility module. Examples of utility modules are tool boxes, containers, power generators, cooler boxes, tools and hand tools of any kind, organizers, work benches, carrying and mounting platforms and mounts, communication modules, locomotion platforms, etc., all of which can assume any shape and size, and wherein any utility module can be detachably attached to any other utility module. The term utility module system is used to denote at least two utility modules according to the present disclosure, and being be detachably attachable to one another.

The present disclosure is concerned with a utility module comprising a base portion and a top portion, said utility module having a front side and a back side with a locking path extending between the front side and the back side; the top portion is configured at a back portion thereof with at least one back locking bar and at a front portion thereof with at least one front locking bar extending parallel to said back locking bar; said back locking bar and said front locking bar disposed parallel to a top surface of the top portion and being spaced from the top surface;

the base of the utility module is configured at a back portion thereof with a back bar coupling recess facing towards the back side and having a back under-bar arresting surface; and a front bar locking arrangement comprising a front facing barrier wall and a locking lever comprising an arresting tongue extendable in front of said barrier wall and having a front under-bar arresting surface, said locking lever displaceable between a locked position at which the front under-bar arresting surface extends at a front locking bar arresting space in front of the barrier wall, and an open position at which the locking lever is displaced to facilitate passage of a front locking bar into and from the front locking bar arresting space.

According to a second aspect of the present disclosure there is a utility module system comprising at least a first utility module and a second utility module;

the first utility module comprising a top portion configured at a back portion thereof with at least one back locking bar and at a front portion thereof with at least one front locking bar extending parallel to said back locking bar; said back locking bar and said front locking bar disposed parallel to a top surface of the top portion and being spaced from the top surface;

the second utility module comprising a base portion configured at a back portion thereof with a back bar coupling recess facing towards the back side and having a back under-bar arresting surface; and a front bar locking arrangement comprising a front facing barrier wall and a locking lever comprising an arresting tongue extendable in front of said barrier wall and having a front under-bar arresting surface, said locking lever displaceable between a locked position at which the front under-bar arresting surface extends at a front locking bar arresting space in front of the barrier wall, and an open position at which the locking lever is displaced to facilitate passage of a front locking bar into and from the front locking bar arresting space.

A utility module according to the disclosure can be configured with one or both of a top portion and a base portion, both extending between a front side and a back side of the utility module; the top portion is configured at a back portion thereof with at least one back locking bar and at a front portion thereof with at least one front locking bar extending parallel to said back locking bar; said back locking bar and said front locking bar disposed parallel to a top surface of the top portion and being spaced from the top surface; the base of the utility module is configured at a back portion thereof with a back bar coupling recess facing towards the back side and having a back under-bar arresting surface; and a front bar locking arrangement comprising a front facing barrier wall and a locking lever comprising an arresting tongue extendable in front of said barrier wall and having a front under-bar arresting surface, said locking lever displaceable between a locked position at which the front under-bar arresting surface extends at a front locking bar arresting space in front of the barrier wall, and an open position at which the locking lever is displaced to facilitate passage of a front locking bar into and from the front locking bar arresting space.

Articulation of a second utility module to a first utility module is facilitated by positioning the base portion of the second utility module over the top portion of the first utility module and displacing it along a locking path extending between the front side and the back side so that the back bar coupling recess faces in close proximity the back locking bar, allowing the second utility module to further displace so that the under-bar arresting surface of the back bar coupling recess engages below the back locking bar, and then a front portion of the second utility module is depressed downwards against the first utility module such that the barrier wall extends behind the front locking bar and then allowing the locking lever to displace into the locked position wherein the front under-bar arresting surface of the arresting tongue extends above the front locking bar, and obstructing a path of the front locking bar arresting space in front of the barrier wall, thus preventing disengagement of the front locking bar from said front locking bar arresting space.

Detaching the second utility module from the first utility module takes place in a reverse sequence of operations. Namely, first the locking lever is displaced into its open position and then only the front portion of the second utility module can be displaced such that the front locking bar disengages from the front locking bar arresting space, and further then the second utility module can be displaced along the locking path facilitating withdrawal from coupling engagement with the first utility module.

The term 'top portion' as used herein the specification and claims denotes any portion of a utility module configured with the respective at least one back locking bar and at least one front locking bar extending parallel to said back locking bar; said back locking bar and said front locking bar disposed parallel to a surface of the top portion and being spaced from the top surface, and wherein the top portion can be a solid surface or an imaginary surface (e.g. at a top portion of a open container), and configured at any face or surface of the utility module (i.e. not necessarily a top face thereof).

The term 'base portion' as used herein the specification and claims denotes any portion of a utility module configured with the respective back bar coupling recess and front bar locking arrangement, and configured for locking engagement with a respective other utility module, and configured at any face or surface of the utility module (i.e. not necessarily a bottom face thereof).

The terms front and back can be interchanged in a sense that a second utility module can be articulately mounted over/to a first utility module, and vice versa, and in that a utility module can be displaced into articulation over another utility module at an opposite/reverse direction of the locking path, i.e. the locking path can extend in direction from the front side towards the back side, or from in direction from the back side towards the front side. The arrangement facilitates that a utility module system can comprise two or more utility modules each articulated over a respective utility module at either a front-to-front orientation or a front-to-back/back-to-front orientation, irrespective of the orientation of any first utility module.

According to a particular configuration the front locking bar arresting space defines a locking path extending between a front face of the barrier wall and a rear face of a front locking wall, and wherein said locking path is selectively interrupted by the arresting tongue displaceable between the locked position at which it projects into the locking path, and the open position at which it is displaced away from the locking path.

According to an example of the disclosure, the locking path of the front locking bar arresting space has a U-like side projection shape, extending between the front face of the barrier wall and the front locking wall, and having a bottom open portion. The open portion of the U-like shaped locking path can be at least partially blocked by the arresting tongue at the locked position, wherein the under-bar arresting surface faces a closed portion of the front locking bar arresting space.

The at least one back locking bar and the at least one front locking bar are parallel to one anther and extend perpendicular to the locking path.

Any one or more of the following features, designs and configurations can be incorporated in a utility module and a utility module system, separately or in various combinations thereof:

- The locking lever can be normally biased into its locked position, namely configured to normally project into the front locking bar arresting space; the arrangement is such that the locking lever temporarily displaces into the open position upon engaging a front locking bar;
- The locking lever can be configured for selective manual displacing between its respective locked position and closed position;
- The locking lever can be pivotally or slidingly displaceable between its respective locked position and open position;
- The arresting tongue of the locking lever can displace into its locked position within the front locking bar arresting space from either a rear direction or a front direction, i.e. either towards the barrier wall or away from the barrier wall and towards the front locking wall;
- The locking lever can be pivotally or slidingly displaceable between its respective locked position and open position by pulling manipulation or pushing manipulation;
- The top portion can be integral with a body portion of the utility module, or it can be articulable thereto;
- The top portion can be substantially flat, with elevated bar supports, from which the back locking bar and the front locking bar extend, said bar supports extending parallel to the locking path;
- The bar supports can extend across the top portion, continuously or interrupted;
- Sliding displacement of a second utility module over a first utility module, in a direction perpendicular to the locking path cab be facilitated by surface engaging projections extending from a bottom surface of the second container, which at an assembled position extend between facing bar supports extending from a top surface of the first utility module;
- A bottom surface of a utility module can be configured with front surface engaging projections and back surface engaging projections;
- The front surface engaging projections and back surface engaging projections can be configured with coplanar surface engaging foot;
- The surface engaging foot of each of the front surface engaging projections and the back surface engaging projections can be configured for resting over a top surface of a first utility module at an assembled position of a utility module system, or over a supporting surface;
- The top portion can be configured at a back end thereof with a depression below the back locking bar, to facilitate insertion of a suspending hook;
- The back locking bar and the front locking bar can be equally spaced from the top surface of the top portion;
- The locking lever can be configured with an inclined gliding surface, chamfered in a direction so as to temporarily displace the locking lever into its open position upon encountering the front locking bar;
- the locking lever can be hingedly articulated through a hinge articulation at a front wall portion of a body of the utility module;

The locking lever can be displaced into the open position by depressing against a push surface extending above the hinge articulation;

The locking lever can be displaced into the open position by pulling against a grab disposed below the hinge articulation;

The locking lever can be manipulated into the open position or the closed position by sliding displacement along the long path, wherein a locking lever manipulating portion is accessible at a front portion of the utility module;

The utility module can comprise one or more parallelly disposed locking levers;

The utility module system can be configured with a grip-enhancing mechanism configured to prevent sliding displacement of the second utility module from displacing over the first utility module (in a direction along the locking bars);

The grip-enhancing mechanism can be configured as a front grip-enhancing mechanism and as a back grip-enhancing mechanism;

The front grip-enhancing mechanism can comprise one or more notches disposed over one of the front locking bar and the locking lever, and one or more notch arresting locations disposed on the other one of the front locking bar and the locking lever, and where the one or more notches face the notch arresting locations;

A back grip-enhancing mechanism can be configured between the back locking bar and the back bar coupling recess, to prevent sliding displacement of the second utility module from displacing over the first utility module (in a direction along the locking bars);

One or more second utility modules can be articulately engaged over a top portion of a first utility module;

The footprint of a second utility module can be similar to the foot print of a first utility module, or it can be smaller or greater therefrom;

The width of the bottom surface of the second utility module can be configured for residing between respective bar supports disposed at the top surface of top portion of the first utility module;

The front locking bar and the back locking bar can be equally spaced from the top surface;

The bar distance extending between the back locking bar and the front locking bar corresponds with a distance between the back bar coupling recess and the front locking bar arresting space, said bar distance measured between imaginary facing tangents of the back locking bar and the front locking bar;

One or more intermediate locking bar can extend between the front locking bar and the back locking bar, wherein a reduced size second utility module can be interlocked between the intermediate locking bar and the front locking bar, or between said intermediate locking bar and a back locking bar;

A full size second utility module can be configured at a bottom face thereof with a depression disposed in register with the intermediate locking bar of a first utility module;

The vertical height of the back under-bar arresting surface at the back locking bar coupling recess and the vertical height of the front locking bar arresting space corresponds with the space of the back locking bar and the front locking bar, respectively from the top surface;

The back bar coupling recess can be formed within a U-like shaped bar receiving portion with an open end thereof facing a back wall of the utility module, said bar receiving portion having a longitudinal axis extending substantially parallel to the locking path;

The bar receiving portion can be configured with a bottom arm portion being shorter than a top arm portion, said top arm portion extending from a back wall of the utility module;

The locking lever can be an L-shaped lever, wherein at the locked position a short arm thereof is configured for engaging below the front locking bar;

The front locking bar arresting space can be configured between a portion of the locking lever and a respective front, bottom portion of the second utility module, wherein at the locked position the front locking bar is clamped between respective walls, to thereby prevent displacement of the second utility module over the first utility module;

A front, bottom portion of utility module can be configured with a gliding surface facilitating smooth displacement of the utility module into an articulated position, wherein the front locking bar is clamped within the front locking bar arresting space;

At an assembled position a bottom surface of the second utility rests over a major portion of the top surface of the first utility module;

The back locking bar and the front locking bar each extend along at least a portion of the rear portion and the front portion of the top surface, respectively;

The first utility module of a utility module system can be a mounting plate; such a mounting plate can be configured for wall mounting, or it can be integral with or integrated with any other system;

At a wall mounting position the utility module can be articulated to the mounting plate with the top portion thereof extending substantially parallel to the mounting plate, in a so-called 'heads-up' position, or with the top portion thereof extending substantially perpendicular to the mounting plate, with a portion extending substantially parallel to the mounting plate;

One or both of the back locking bar and the front locking bar can span continuously or interruptedly across the top portion of the utility module;

The second utility module can have a foot print equal or smaller than a foot print of a first utility module, over which the second utility module is to be articulately mounted;

One or more second utility modules can be articulately mounted over one or more second utility modules;

A foot print of the one or more second utility modules is equal or smaller than a foot print of a one or more first utility module over which the one or more second utility modules are to be articulately mounted;

The front locking bar and the back locking bar can be equally spaced from the respective back wall and front wall of the utility module;

A base portion of a utility module can be suspendingly articulated to a support module by a suspending hook system extending from the support module, said suspending hook configured for engaging at least the back locking bar of the utility module, wherein said suspending hook is configured for extending below at least the back locking bar;

The utility module can be articulated against a vertical wall, wherein the suspending hook system extends under the back locking bar from the back side of the top portion;

the utility module can be suspended by the suspending hook system extending under the back locking bar and the front locking bar, wherein the suspending hook system in introduced from the back side or the front side of the top portion;

The utility module can be suspended by the suspending hook system extending from above the top portion of the utility module and engages the back locking bar and the front locking bar from below;

A tolerance cancelation arrangement can be configured for eliminating or reducing tolerances between the first utility module and the second utility module; said tolerance cancelation arrangement can be in form of sloping surfaces at one or both of the back under-bar arresting surface and the front under-bar arresting surface.

EMBODIMENTS

The present disclosure also encompasses embodiments as defined in the following numbered phrases. It should be noted that these numbered embodiments are intended to add to the present disclosure and by no way it is intended to be limiting.

1. A utility module comprising a base portion and a top portion, said utility module having a front side and a back side with a locking path extending between the front side and the back side; the top portion is configured at a back portion thereof with at least one back locking bar and at a front portion thereof with at least one front locking bar extending parallel to said back locking bar; said back locking bar and said front locking bar disposed parallel to a top surface of the top portion and being spaced from the top surface; the base of the utility module is configured at a back portion thereof with a back bar coupling recess facing towards the back side and having a back under-bar arresting surface; and a front bar locking arrangement comprising a front facing barrier wall and a locking lever comprising an arresting tongue extendable in front of said barrier wall and having a front under-bar arresting surface, said locking lever displaceable between a locked position at which the front under-bar arresting surface extends at a front locking bar arresting space in front of the barrier wall, and an open position at which the locking lever is displaced to facilitate passage of a front locking bar into and from the front locking bar arresting space.
2. The utility module of embodiment 1, configured for suspendingly articulation by a suspending hook system configured for engaging at least the back locking bar of the utility module, wherein said suspending hook is configured for extending below at least the back locking bar.
3. The utility module of embodiment 1, wherein upon articulating against a vertical wall, the suspending hook system extends under the back locking bar from the back side of the top portion.
4. The utility module of embodiment 1, wherein upon suspending by the suspending hook system extending, the suspending hook system extends under the back locking bar and the front locking bar, wherein the suspending hook system in introduced from the back side or the front side of the top portion.
5. The utility module of embodiment 1, wherein upon suspension the suspending hook system extends from above the top portion of the utility module and engages the back locking bar and the front locking bar from below.
6. The utility module of embodiment 1, wherein the first utility module of a utility module system can be a mounting plate.
7. The utility module of embodiment 1, wherein the mounting plate is configured for wall mounting, or it can be integral with or integrated with any other system.
8. The utility module of embodiment 1, wherein at a wall mounting position the utility module can be articulated to the mounting plate with the top portion thereof extending substantially parallel to the mounting plate, in a so-called 'heads-up' position, or with the top portion thereof extending substantially perpendicular to the mounting plate, with a portion extending substantially parallel to the mounting plate.\
9. The utility module of embodiment 1, wherein the top portion is configured at a back end thereof with a depression below the back locking bar, to facilitate insertion of a suspending hook.
10. The utility module of embodiment 1, wherein the utility module comprises one or more parallelly disposed locking levers.
11. The utility module of embodiment 1, wherein the at least one back locking bar and the at least one front locking bar are parallel to one another and extend perpendicular to the locking path.
12. A utility module system comprising at least a first utility module and a second utility module; the first utility module comprising a top portion configured at a back portion thereof with at least one back locking bar and at a front portion thereof with at least one front locking bar extending parallel to said back locking bar; said back locking bar and said front locking bar disposed parallel to a top surface of the top portion and being spaced from the top surface; the second utility module comprising a base portion configured at a back portion thereof with a back bar coupling recess facing towards the back side and having a back under-bar arresting surface; and a front bar locking arrangement comprising a front facing barrier wall and a locking lever comprising an arresting tongue extendable in front of said barrier wall and having a front under-bar arresting surface, said locking lever displaceable between a locked position at which the front under-bar arresting surface extends at a front locking bar arresting space in front of the barrier wall, and an open position at which the locking lever is displaced to facilitate passage of a front locking bar into and from the front locking bar arresting space.
13. The utility module system of embodiment 12, wherein articulation of a second utility module over a first utility module is facilitated by positioning the second utility module over the first utility module and displacing it along the locking path so that the back bar coupling recess faces in close proximity the back locking bar, allowing the second utility module to further displace so that the back bar coupling recess engages the back locking bar, and then a front portion of the second utility module is depressed downwards against the first utility module so as to temporarily displace the locking lever into its open position, whereby the front locking bar is arrested at the front locking bar arresting space.
14. The utility module system of embodiment 12, wherein detaching the second utility module from the first utility module takes place in a reverse sequence of operations.
15. The utility module system of embodiment 12, wherein the locking lever is displaced into its open position and then only the second utility module can be withdrawn from coupling engagement with the first utility module.
16. The utility module system of embodiment 12, wherein one or more second utility modules can be articulately engaged over a top portion of a first utility module.

17. The utility module system of embodiment 12, wherein one or more second utility modules can be articulately engaged over a top portion of a first utility module.
18. The utility module system of embodiment 12, wherein the width of the bottom surface of the second utility module is configured for residing between respective bar supports disposed at the top surface of top portion of the first utility module.
19. The utility module system of embodiment 12, wherein at an assembled position a bottom surface of the second utility rests over a major portion of the top surface of the first utility module.
20. The utility module system of embodiment 12, wherein one or both of the back locking bar and the front locking bar span continuously or interruptedly across the top portion of the utility module.
21. The utility module system of embodiment 12, wherein the second utility module has a foot print equal or smaller than a foot print of a first utility module, over which the second utility module is to be articulately mounted.
22. The utility module system of embodiment 12, wherein one or more second utility modules can be articulately mounted over one or more second utility modules.
23. The utility module system of embodiment 12, wherein a foot print of one or more second utility modules is equal or smaller than a foot print of a one or more first utility module over which the one or more second utility modules are to be articulately mounted.
24. The utility module system of embodiment 12, configured with a grip-enhancing mechanism configured to prevent sliding displacement of the second utility module from displacing over the first utility module.
25. The utility module system of embodiment 12, wherein the grip-enhancing mechanism is configured as a front grip-enhancing mechanism and as a back grip-enhancing mechanism.
26. The utility module system of embodiment 12, wherein the front grip-enhancing mechanism comprises one or more notches disposed over one of the front locking bar and the locking lever, and one or more notch arresting locations disposed on the other one of the front locking bar and the locking lever, and where the one or more notches face the notch arresting locations.
27. The utility module system of embodiment 12, wherein a back grip-enhancing mechanism is configured between the back locking bar and the back bar coupling recess, to prevent sliding displacement of a second utility module from displacing over the first utility module, in a direction along the locking bars.
28. The utility module system of embodiment 12, wherein the locking path can extend in direction from the front side towards the back side, or in direction from the back side towards the front side.
29. The utility module system of embodiment 12, wherein the front locking bar and the back locking bar are equally spaced from the respective back wall and front wall of the utility module.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

Figure 3B:
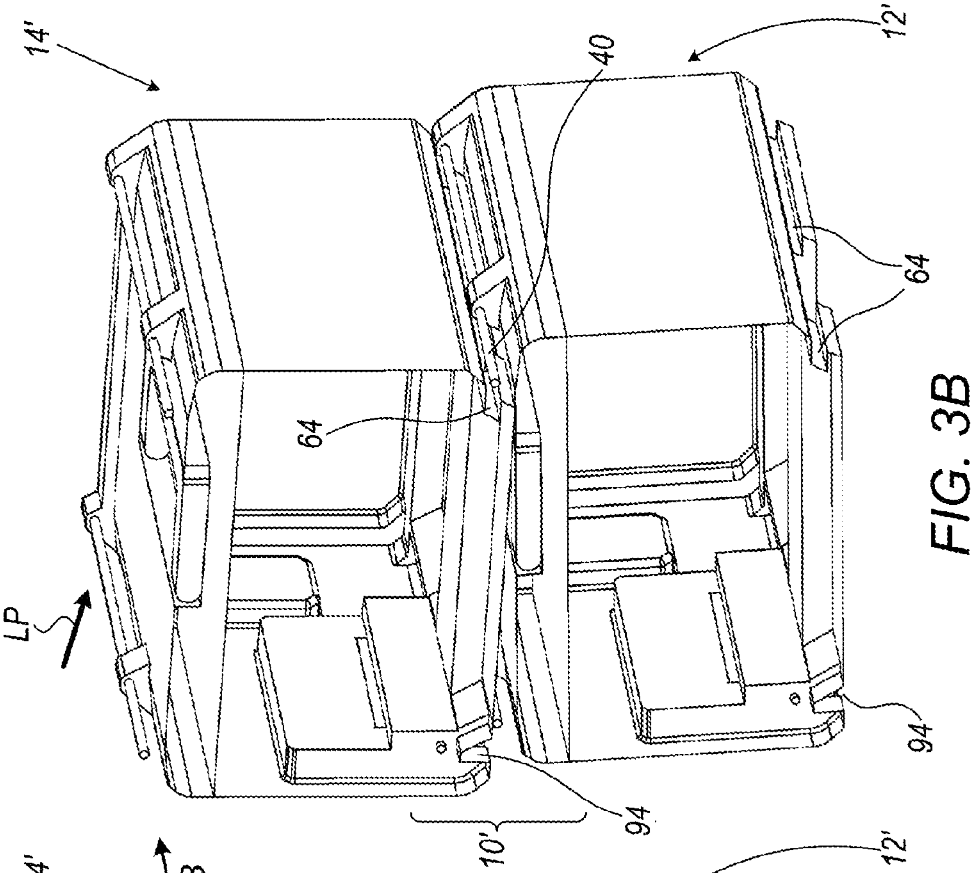
FIG. 3B is a sectioned view of FIG. 3A, taken along line B-B.
Figure 3A:
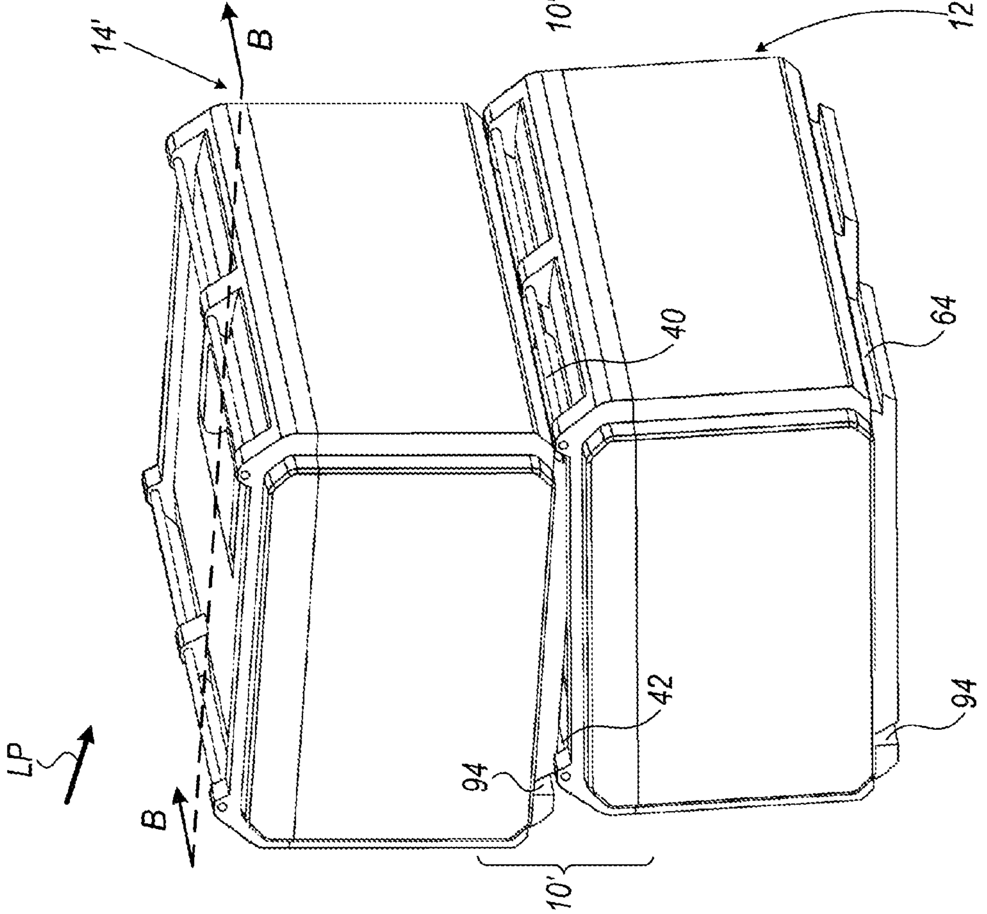
FIG. 3A is a perspective rear view, of a second utility module over a first utility module, at a first instance before locking arrestment.
Figure 3F:
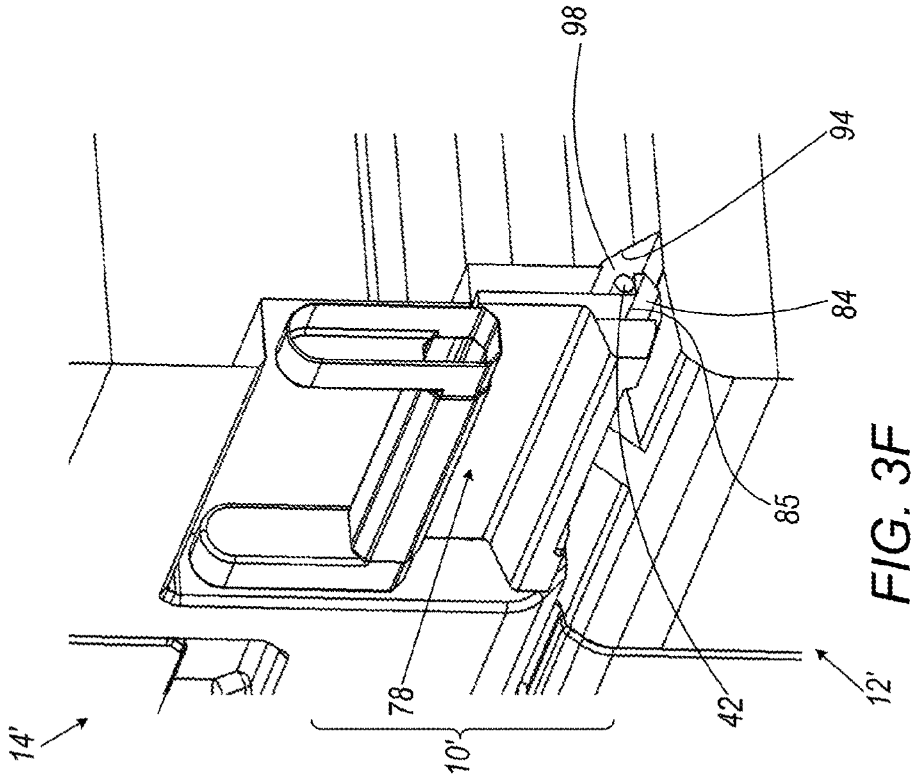
FIG. 3F is the same as FIG. 3E, with the locking lever displaced into its normally locked position.
Figure 3E:
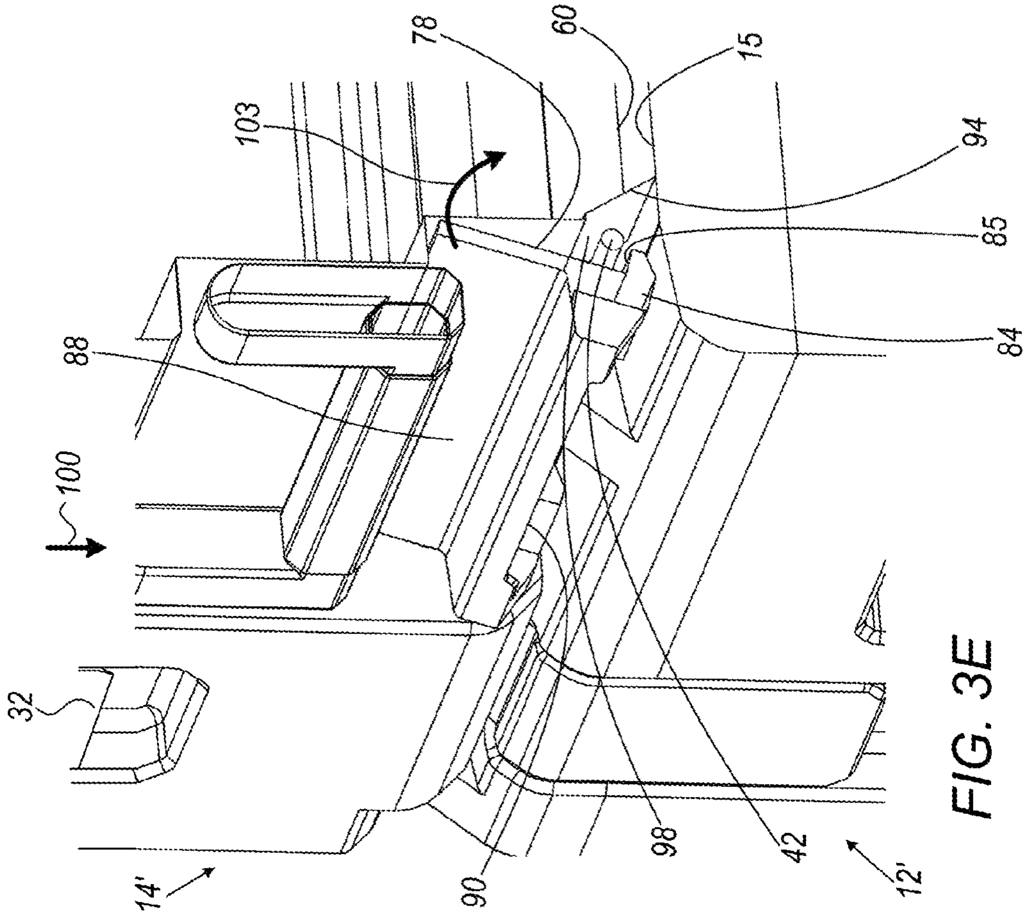
FIG. 3E is a front, perspective sectioned view, of the assembly of FIG. 3 at an instance after that of FIG. 3A, with the containers at position and the locking lever at an open position.
Figure 3H:
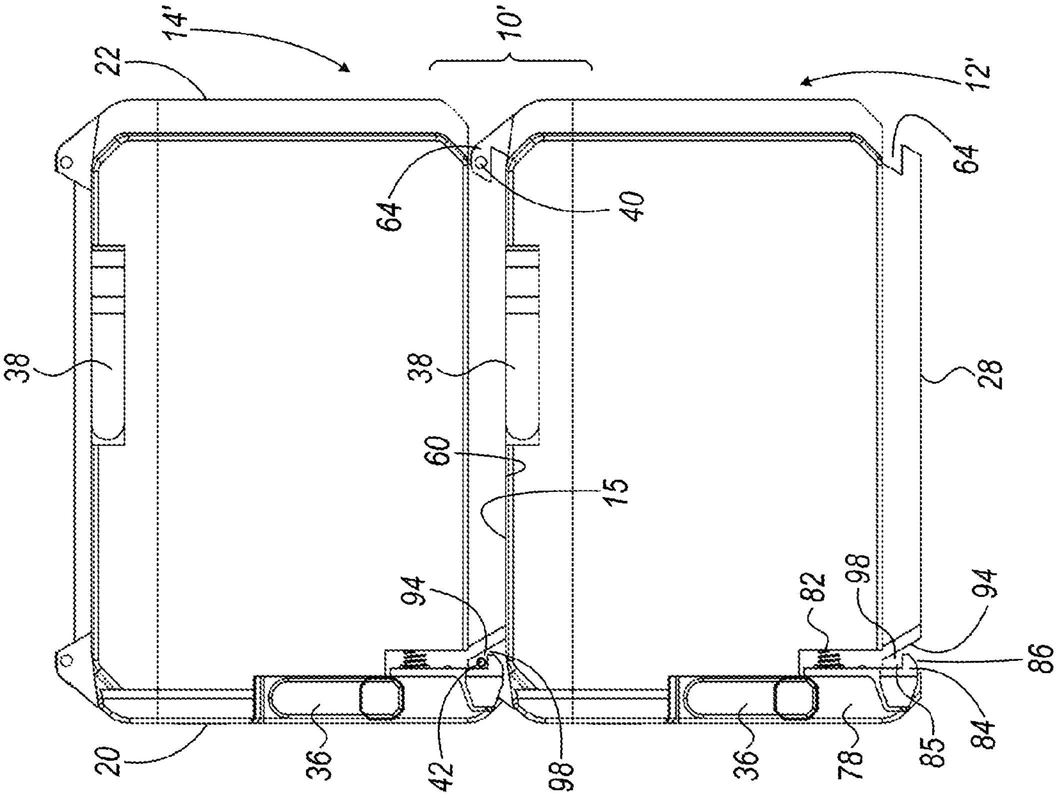
FIG. 3C is a front bottom perspective vie of FIG. 3A.
FIG. 3D is a planar side view of the sectioned view of FIG. 3B.
Figure 3G:
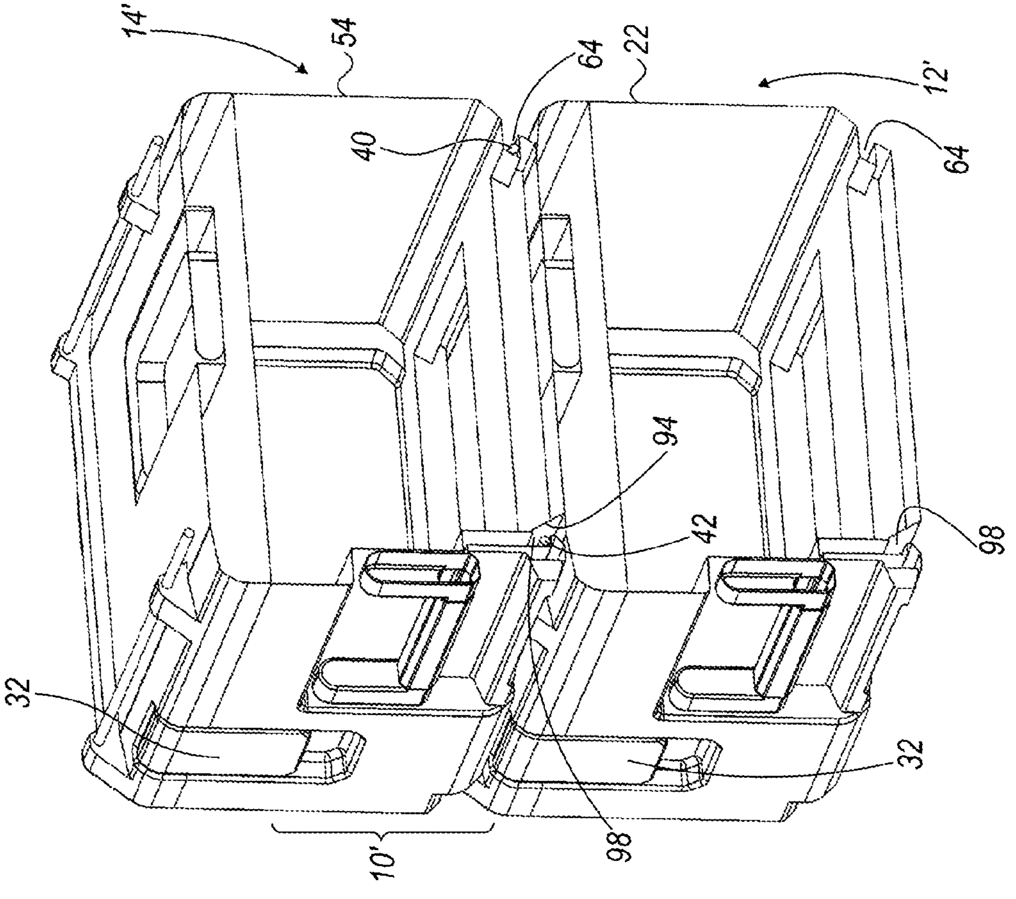
Figure 4C:
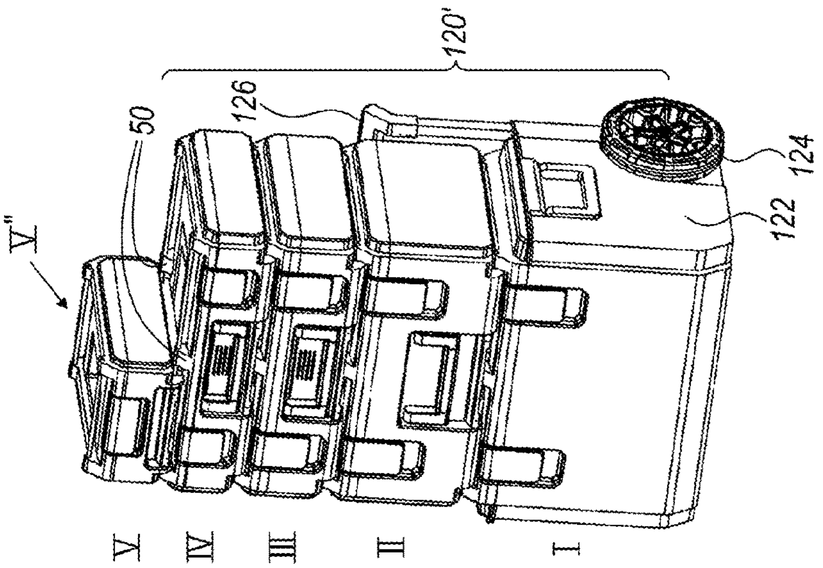
Figure 4B:
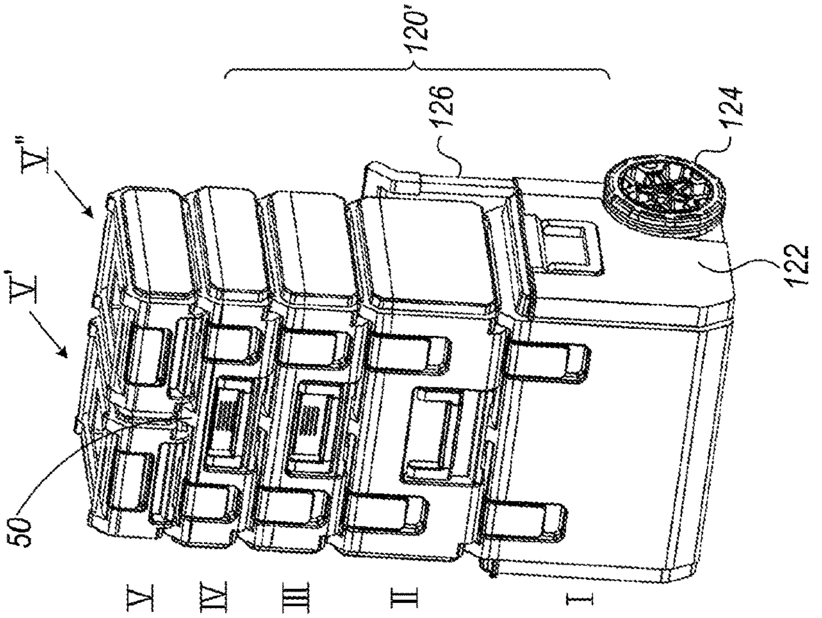
Figure 4A:
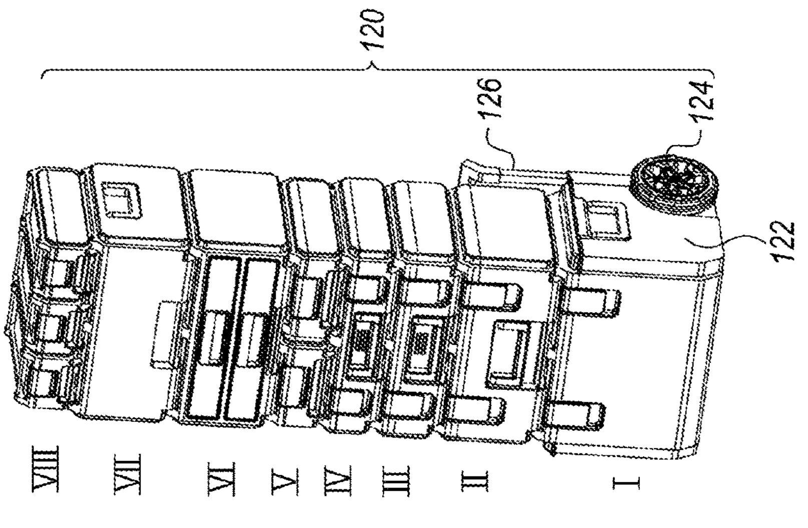
Figure 5B:
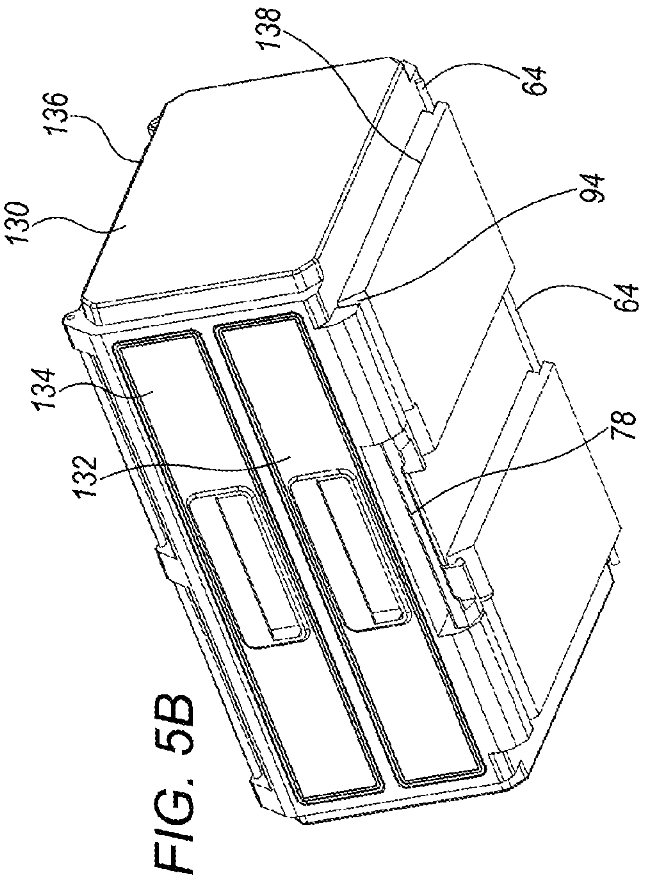
Figure 5A:
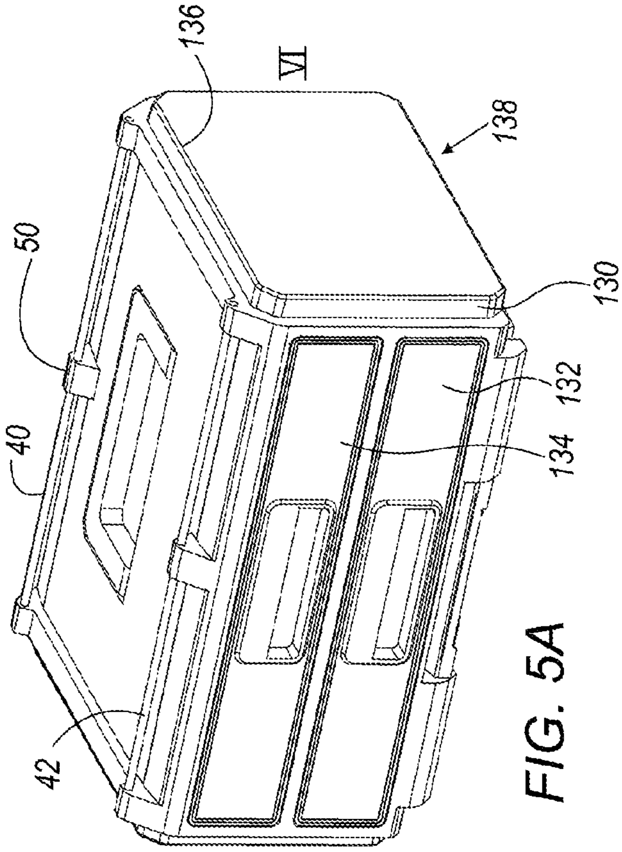
Figure 6:
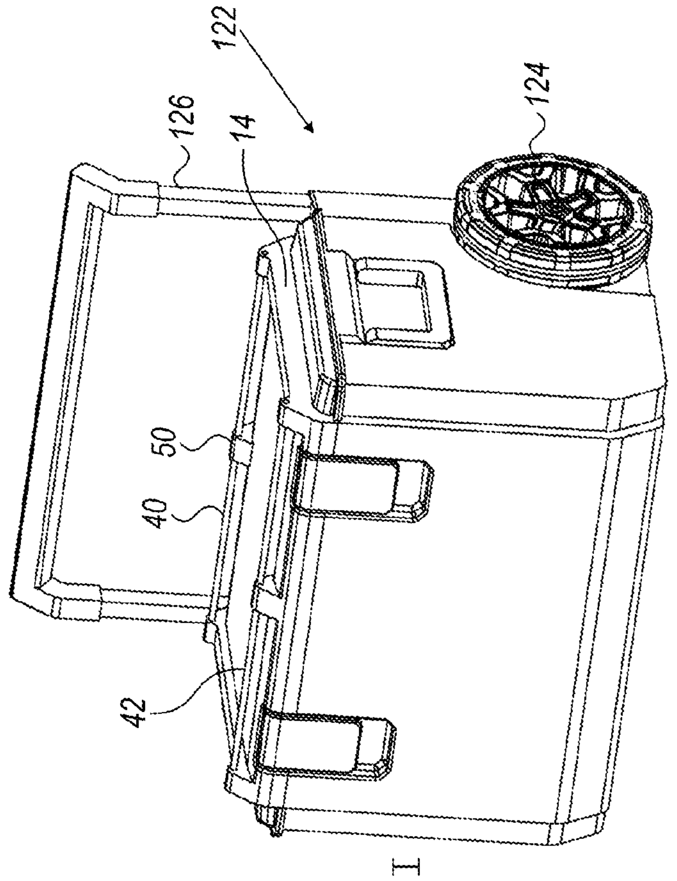
Figure 7B:
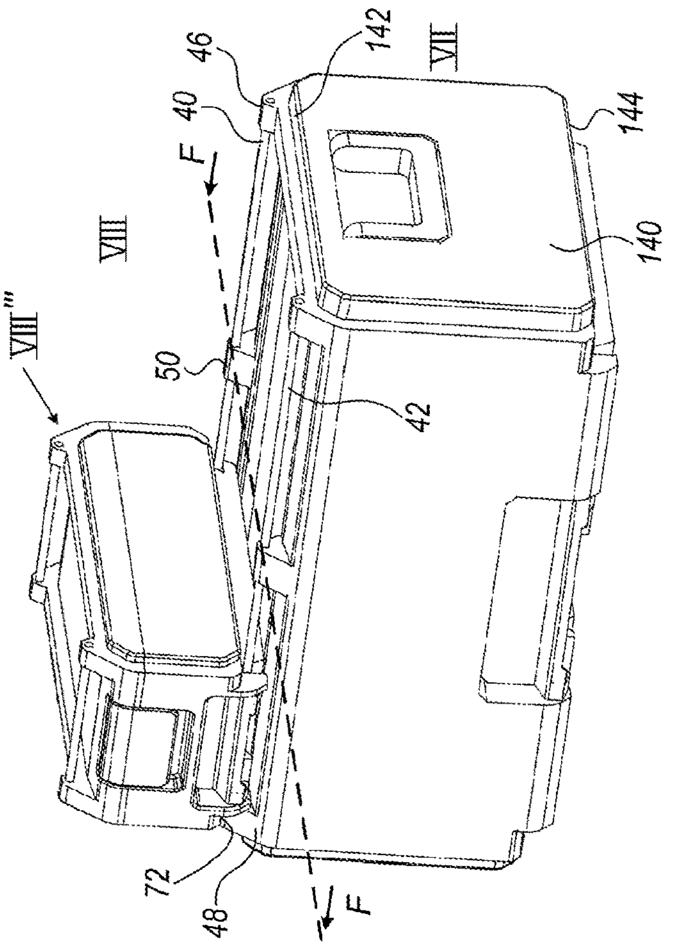
Figure 7A:
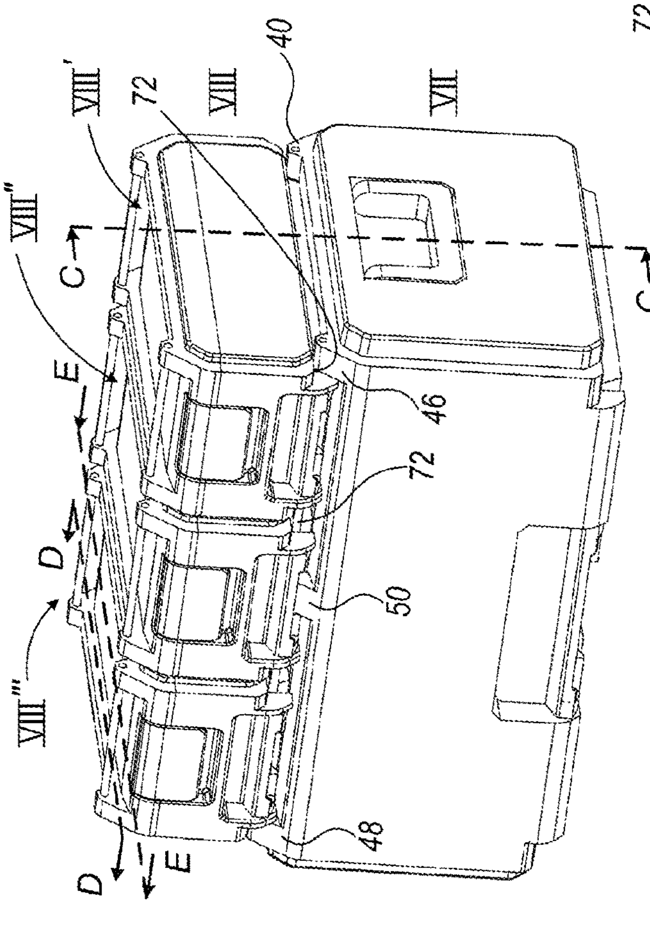
Figure 7D:
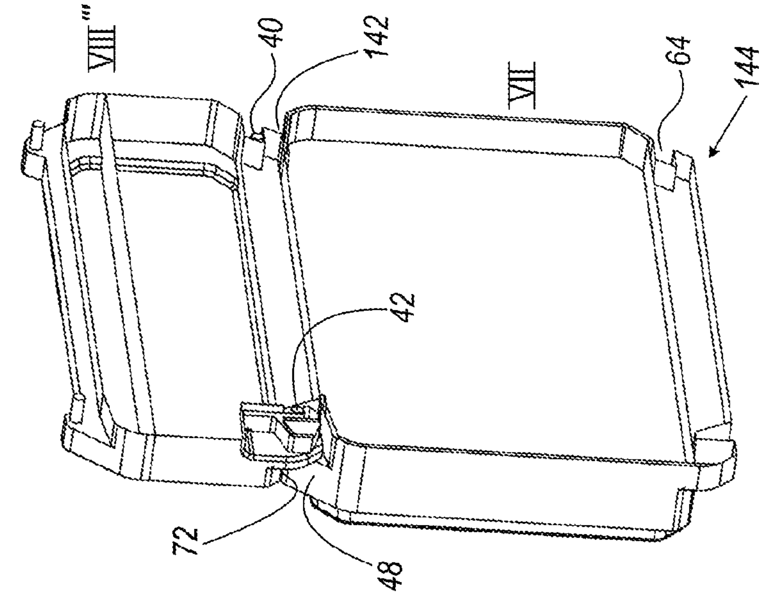
Figure 7C:
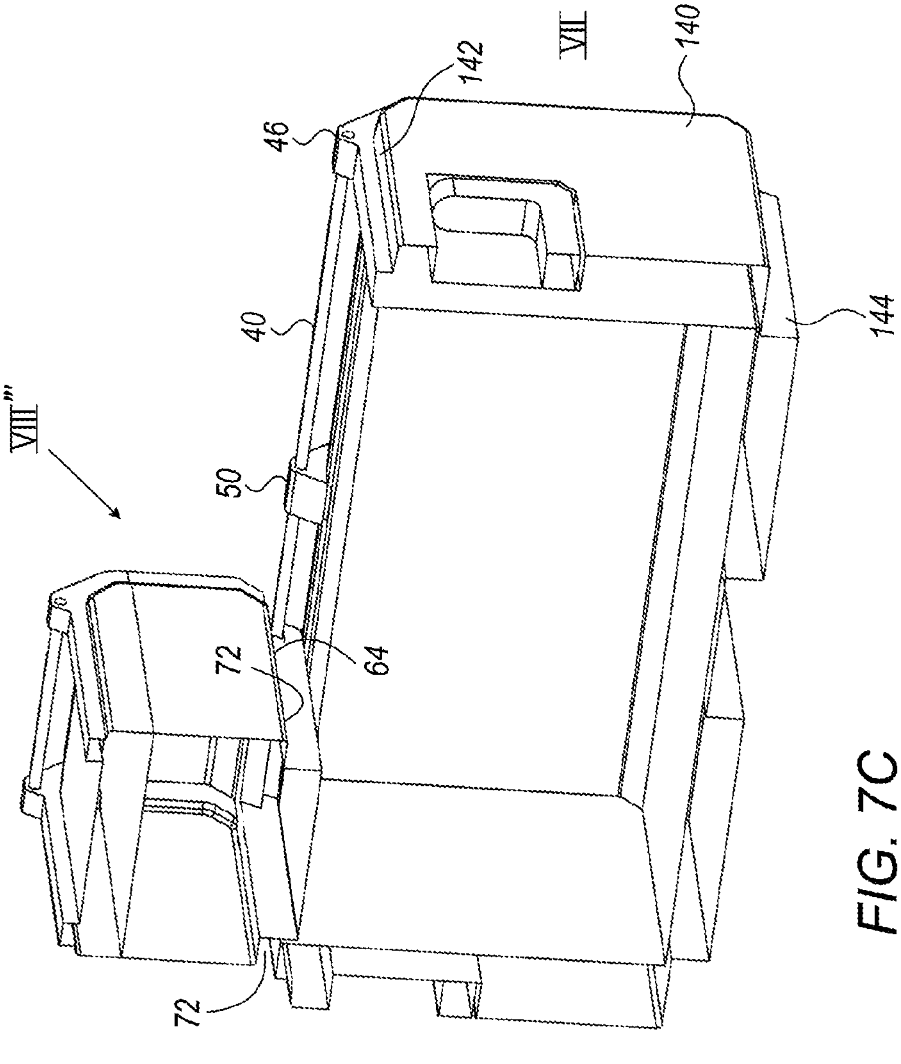
Figure 7F:
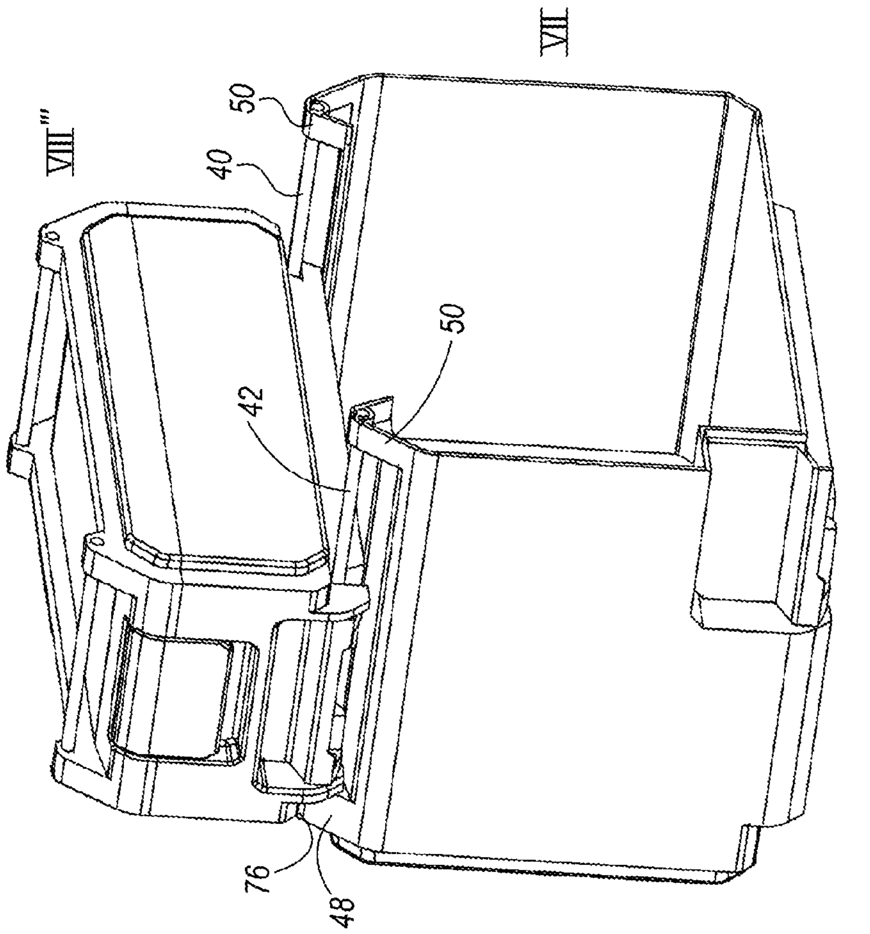
Figure 7E:
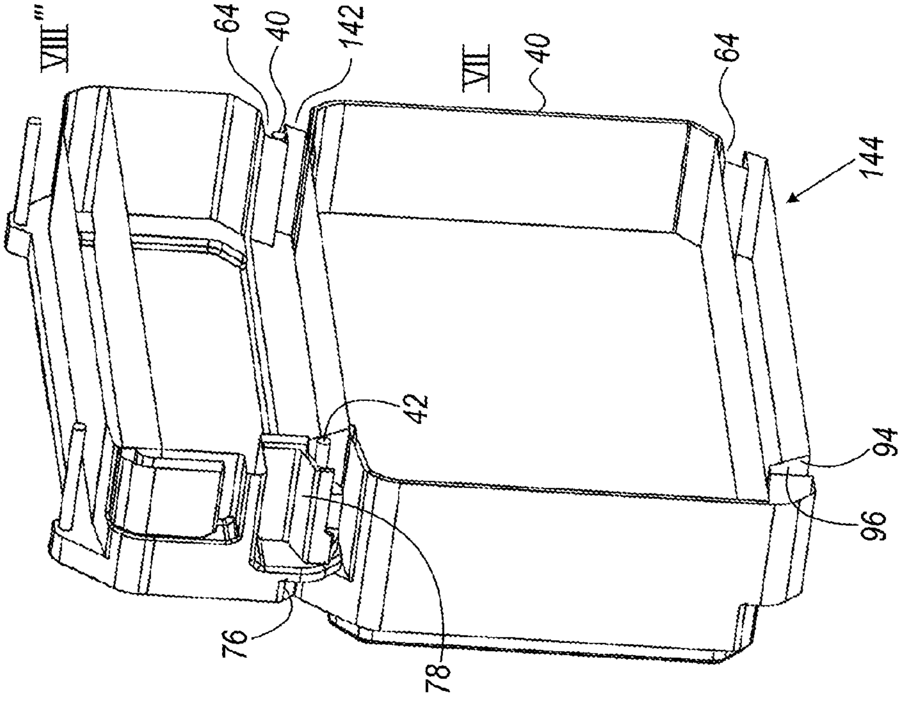
Figure 7G:
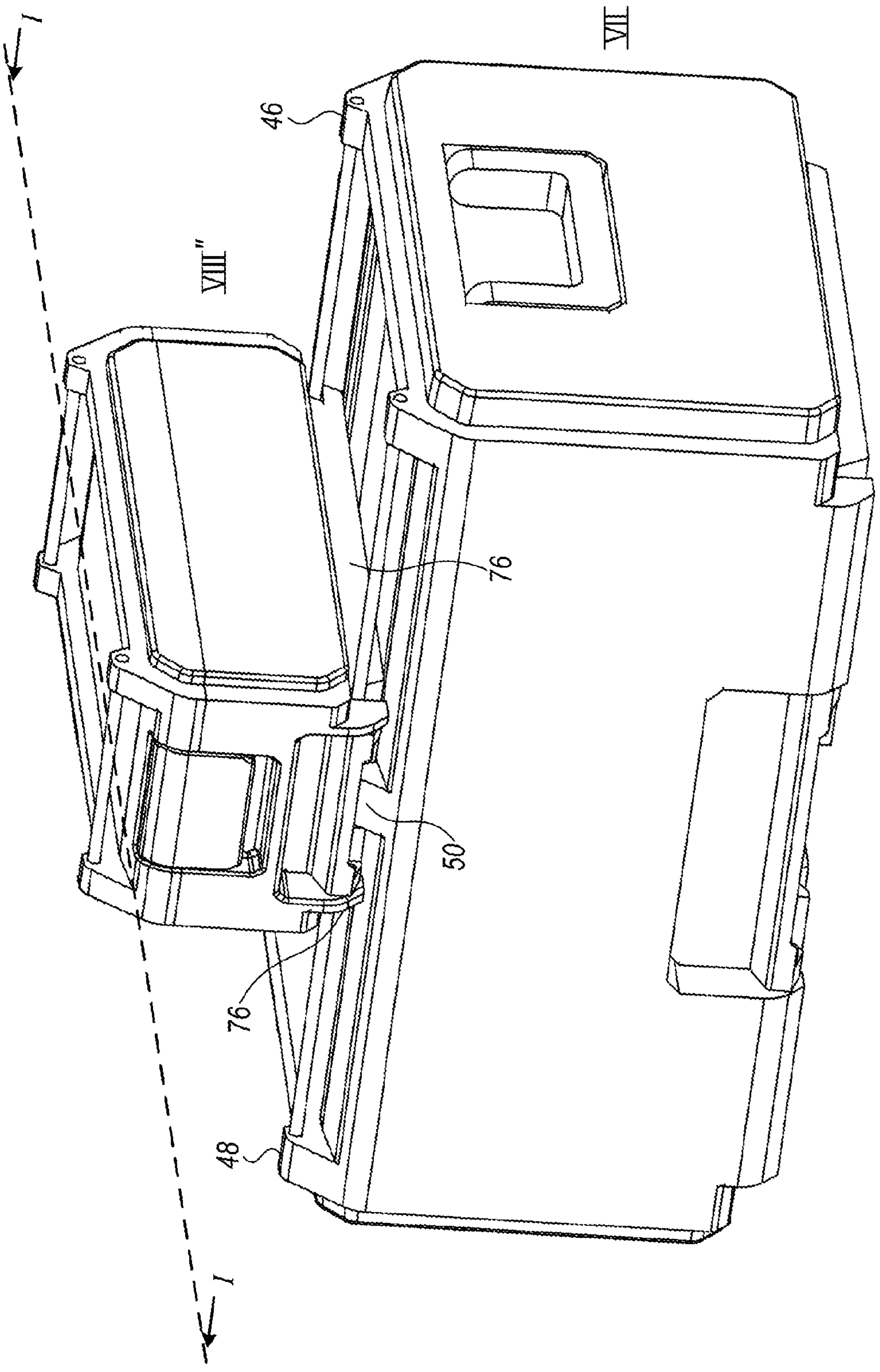
Figure 7I:
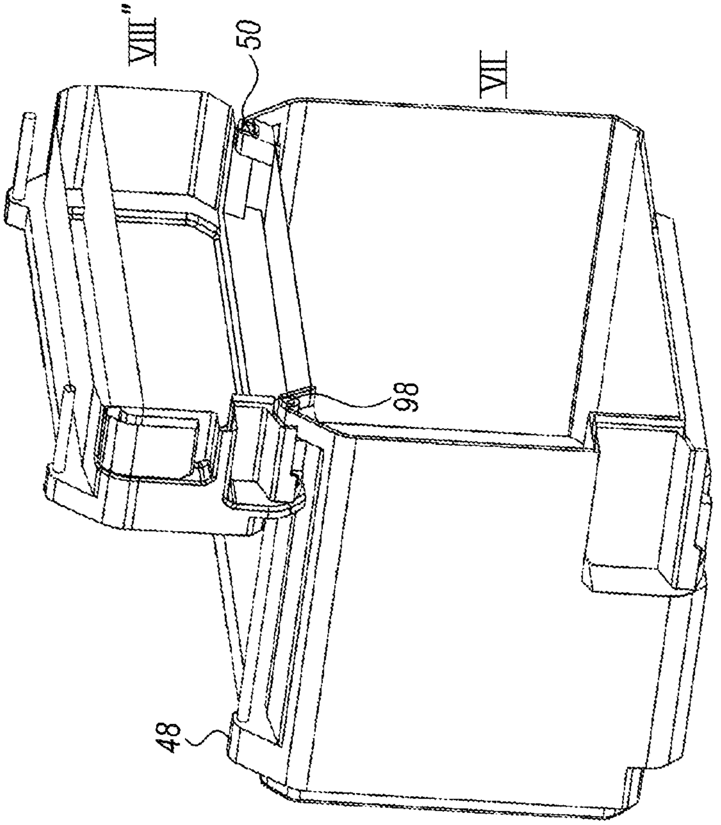
Figure 7H:
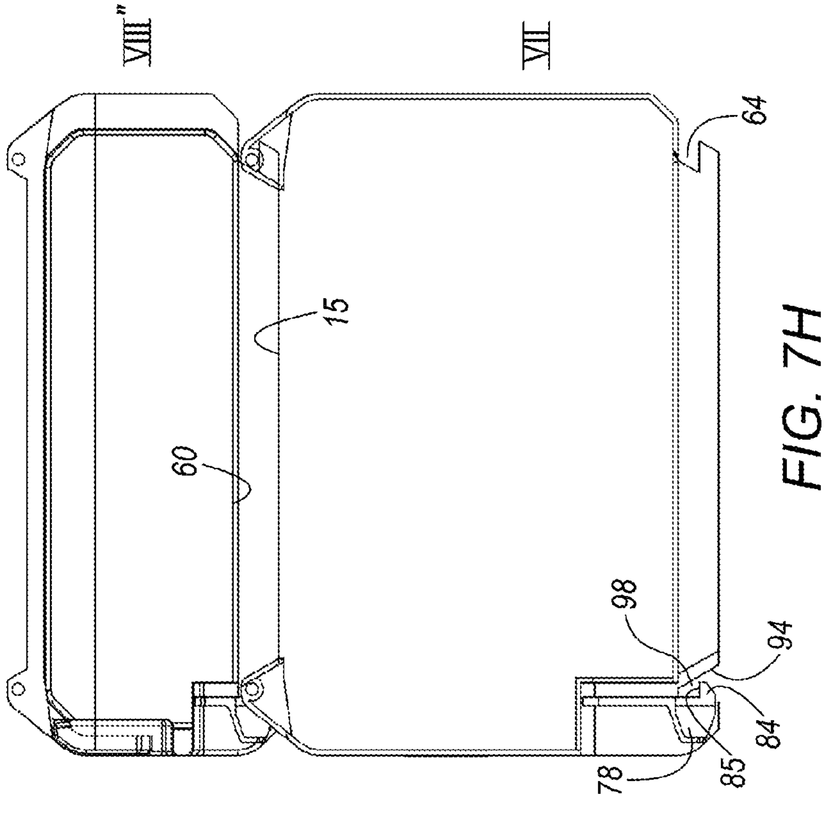
Figure 8B:
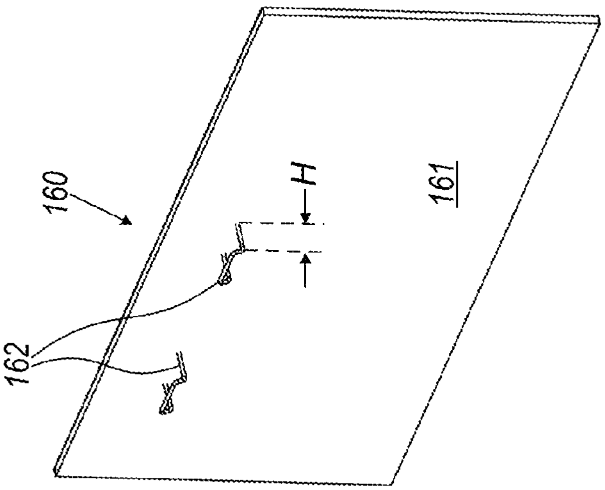
Figure 8A:
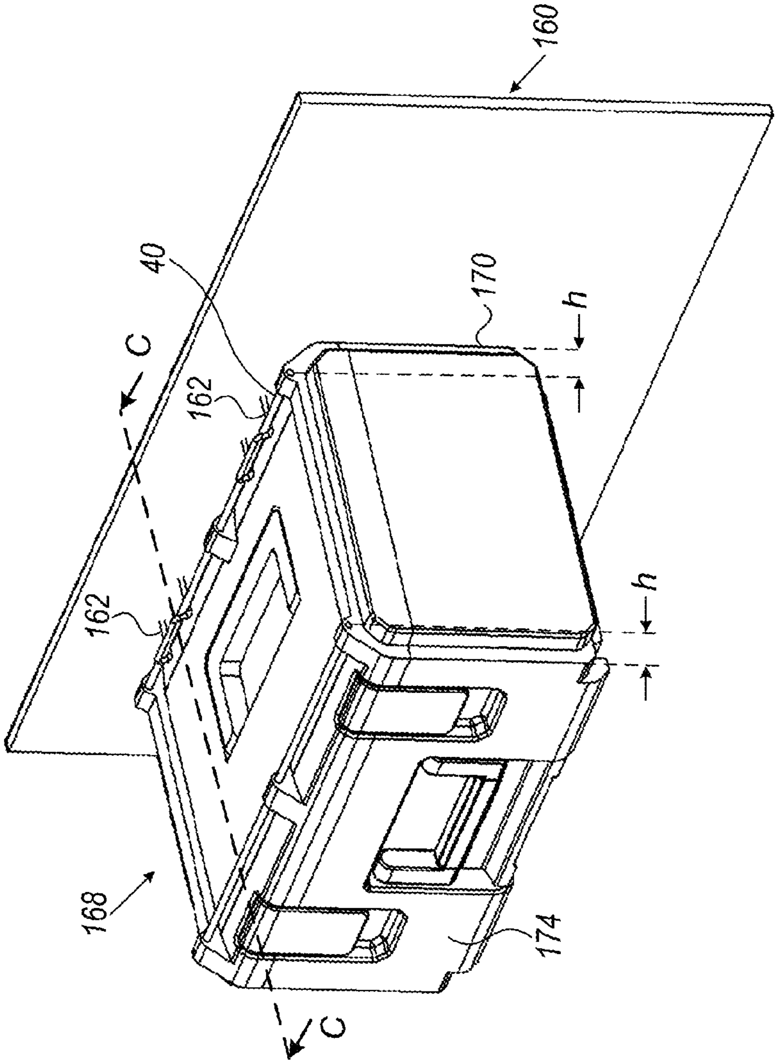
Figure 9:
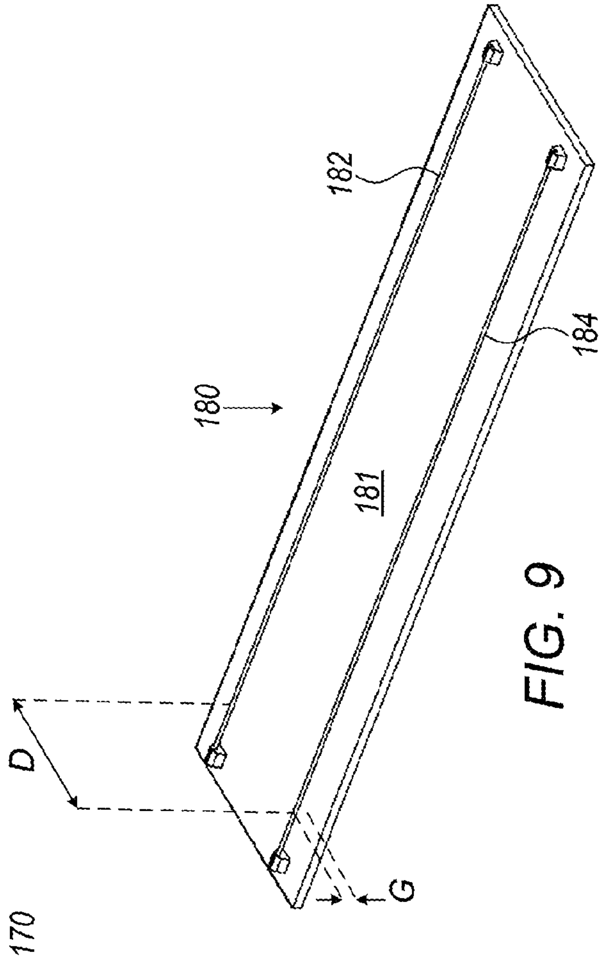
Figure 8C:
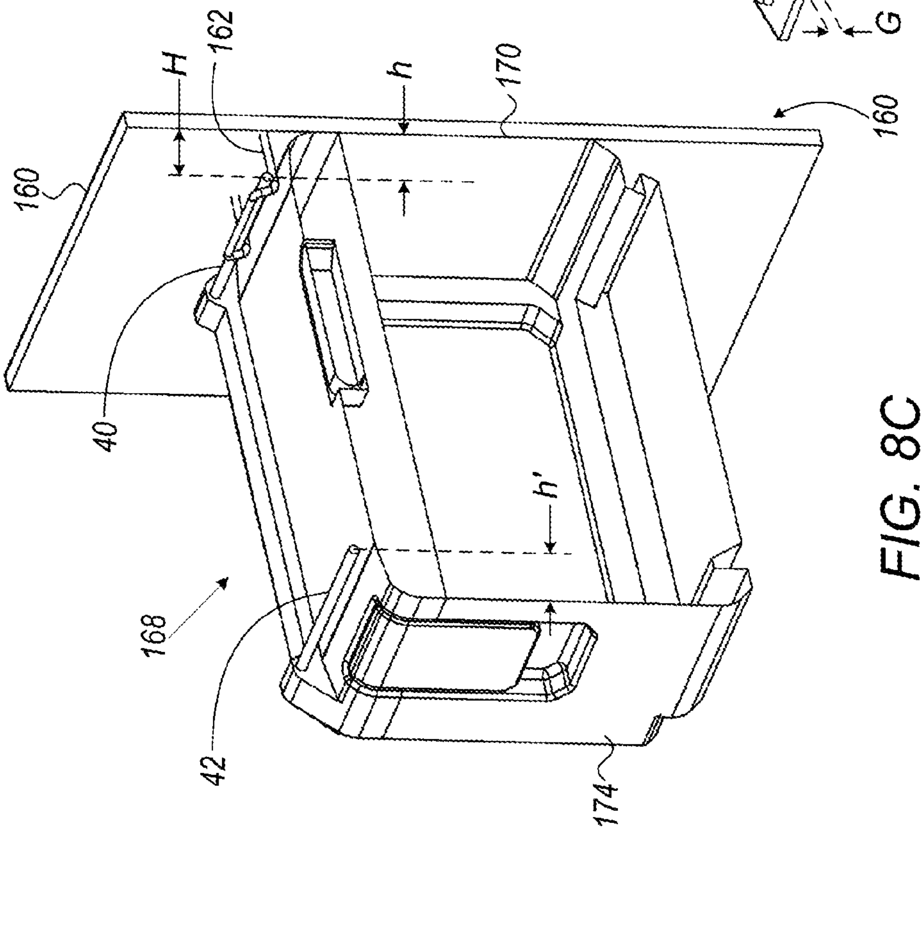
Figure 10B:
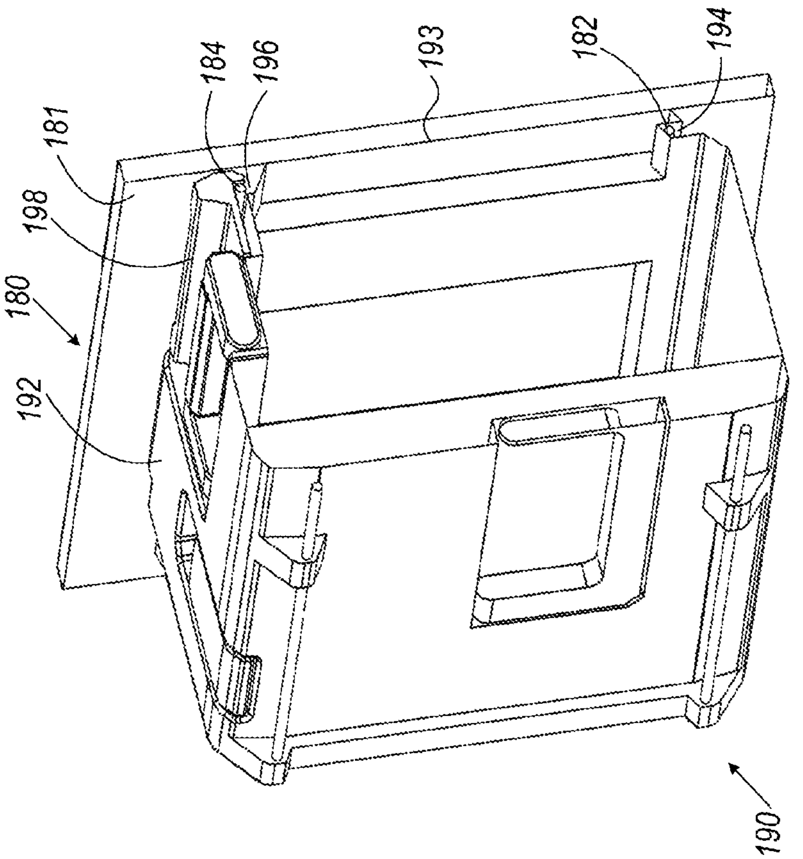
Figure 10A:
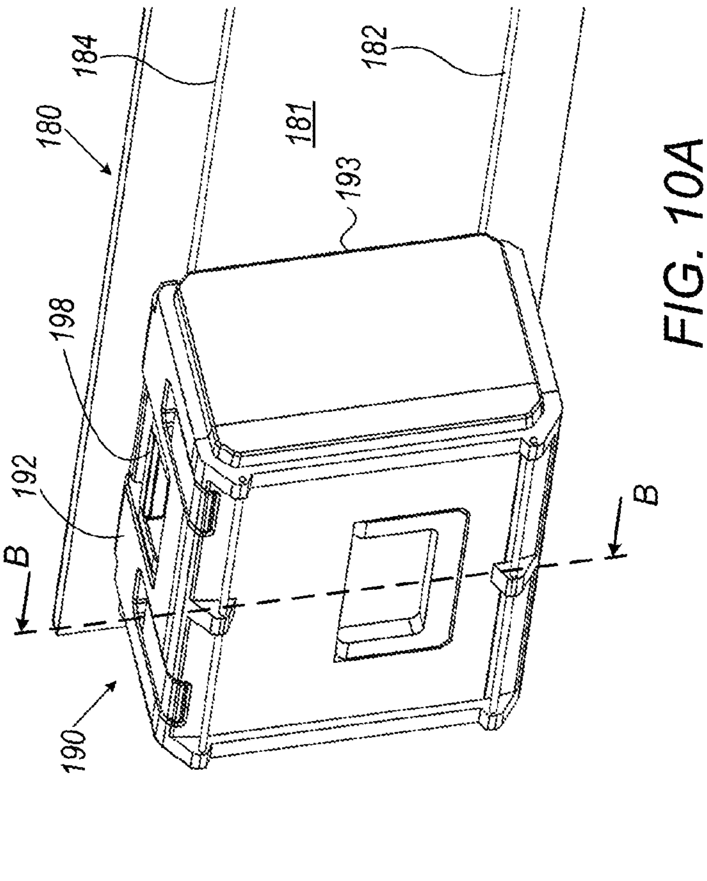
Figure 11A:
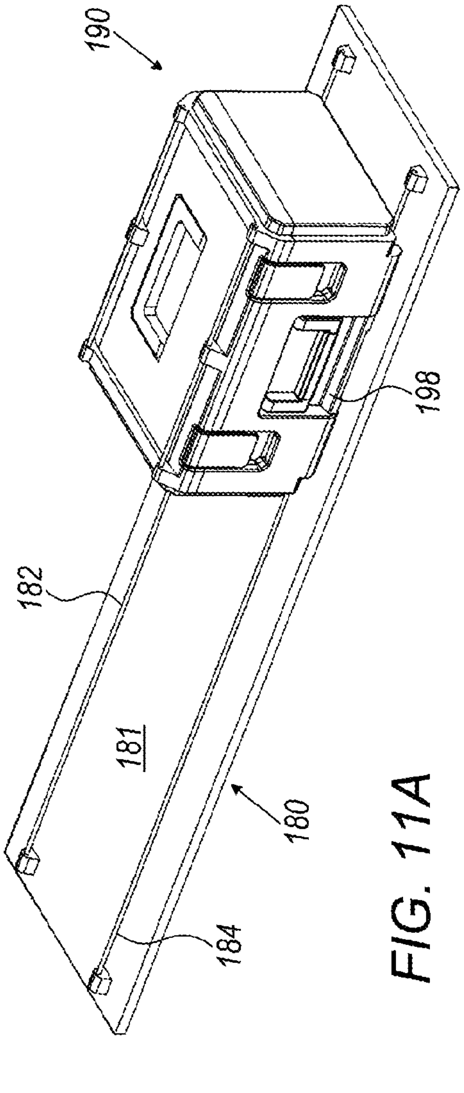
Figure 11B:
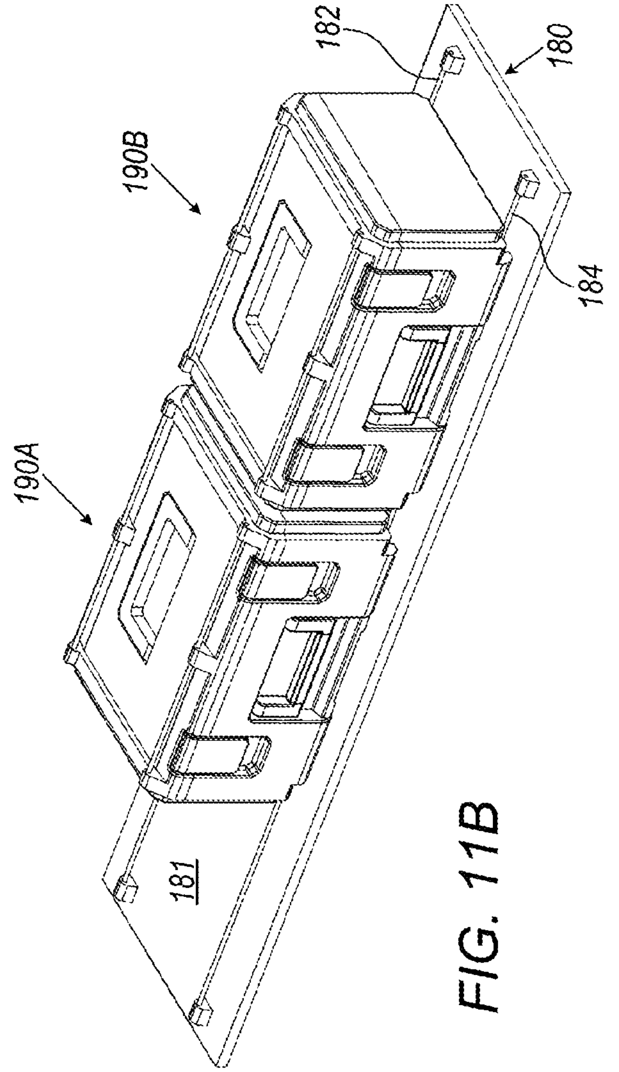
Figure 11C:
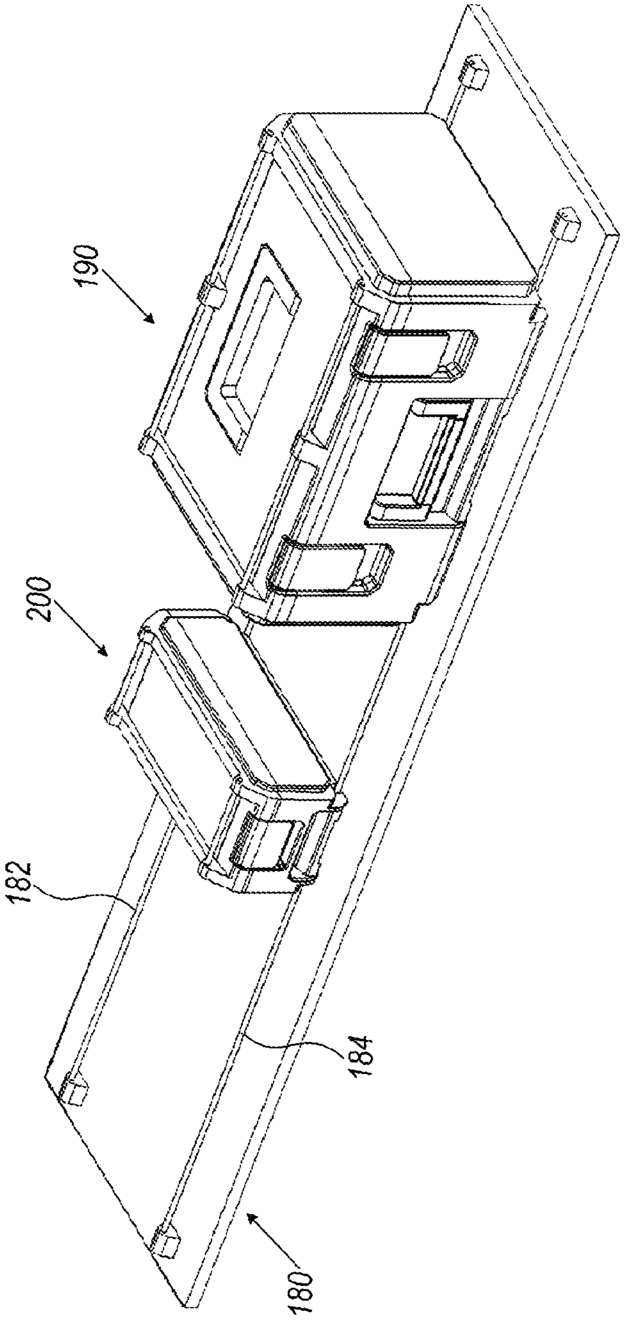
Figure 12B:
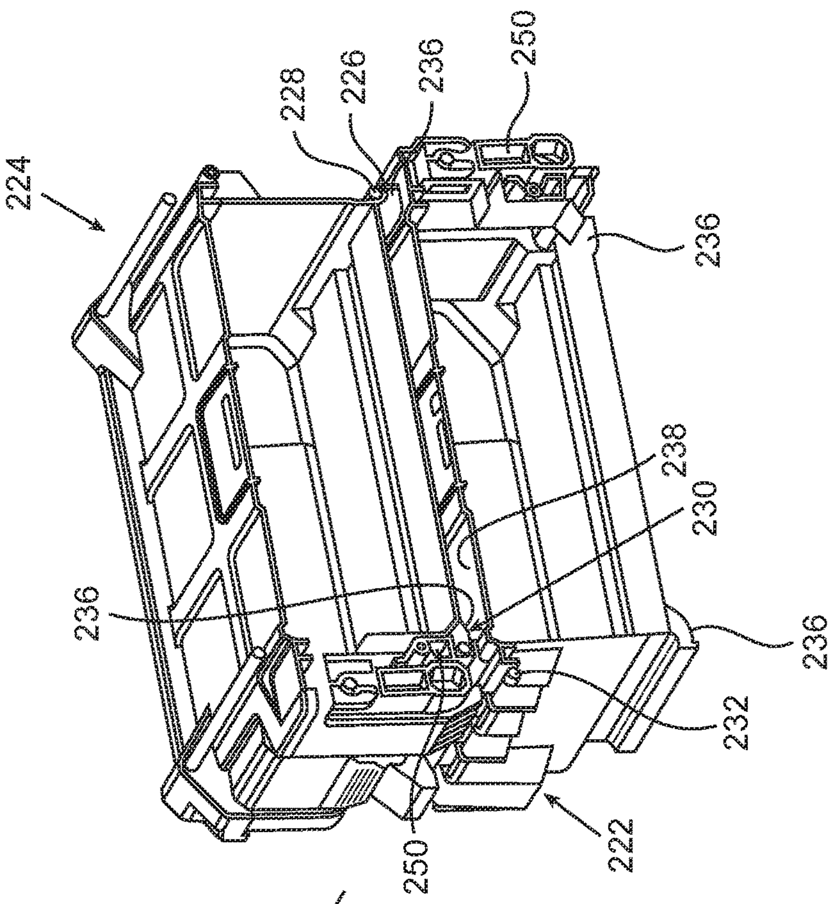
Figure 12A:
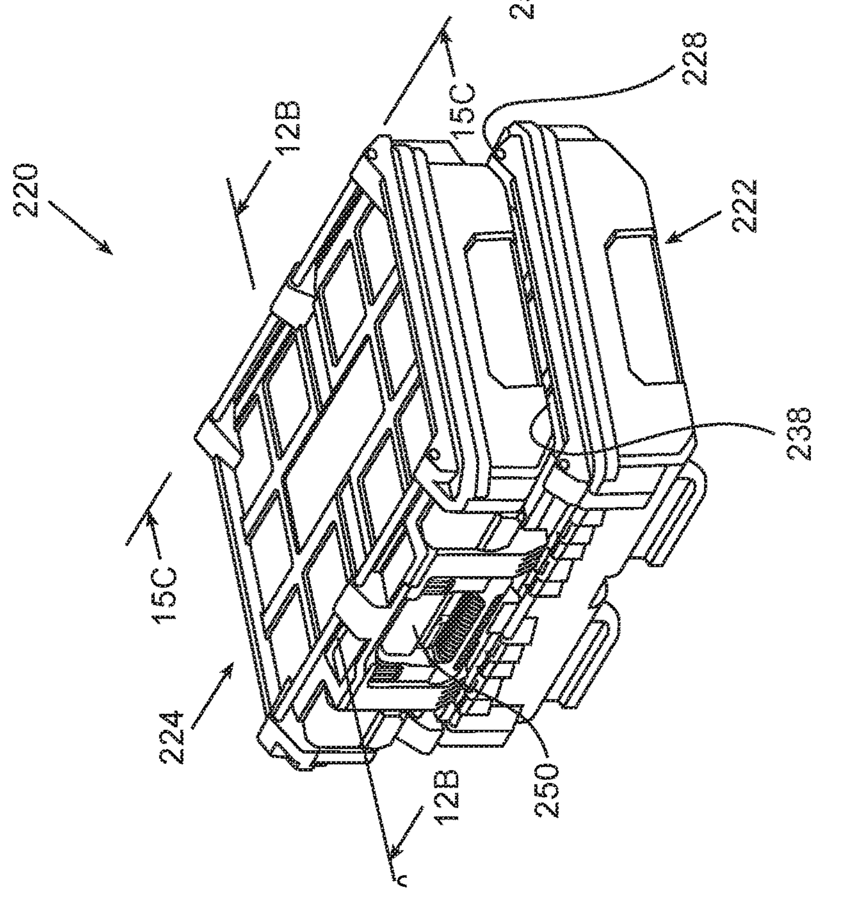
Figure 12D:
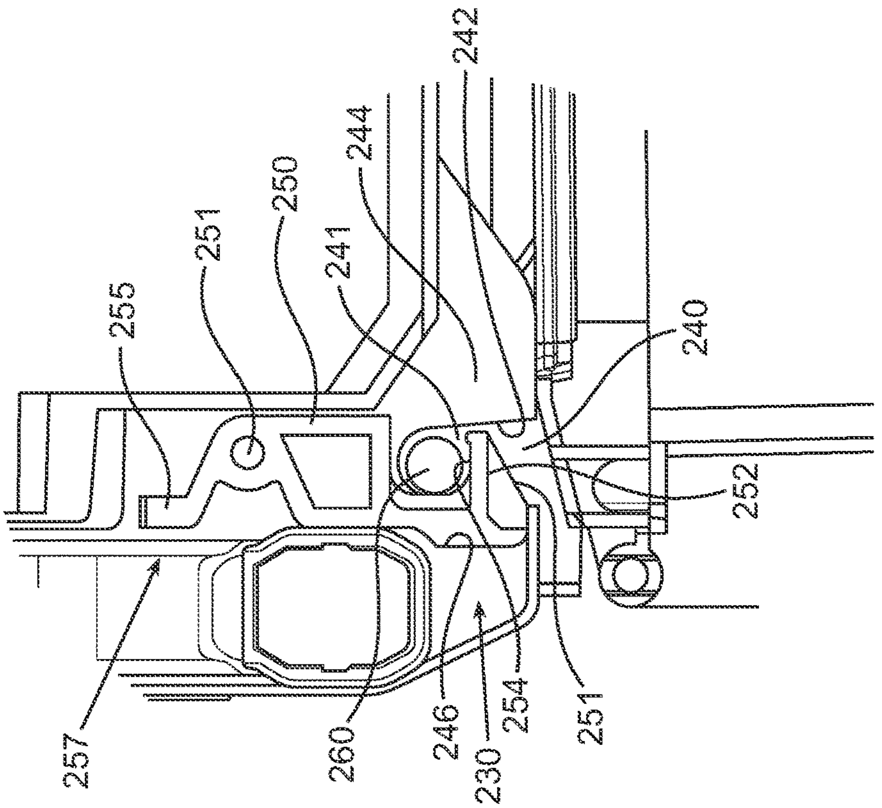
Figure 12C:
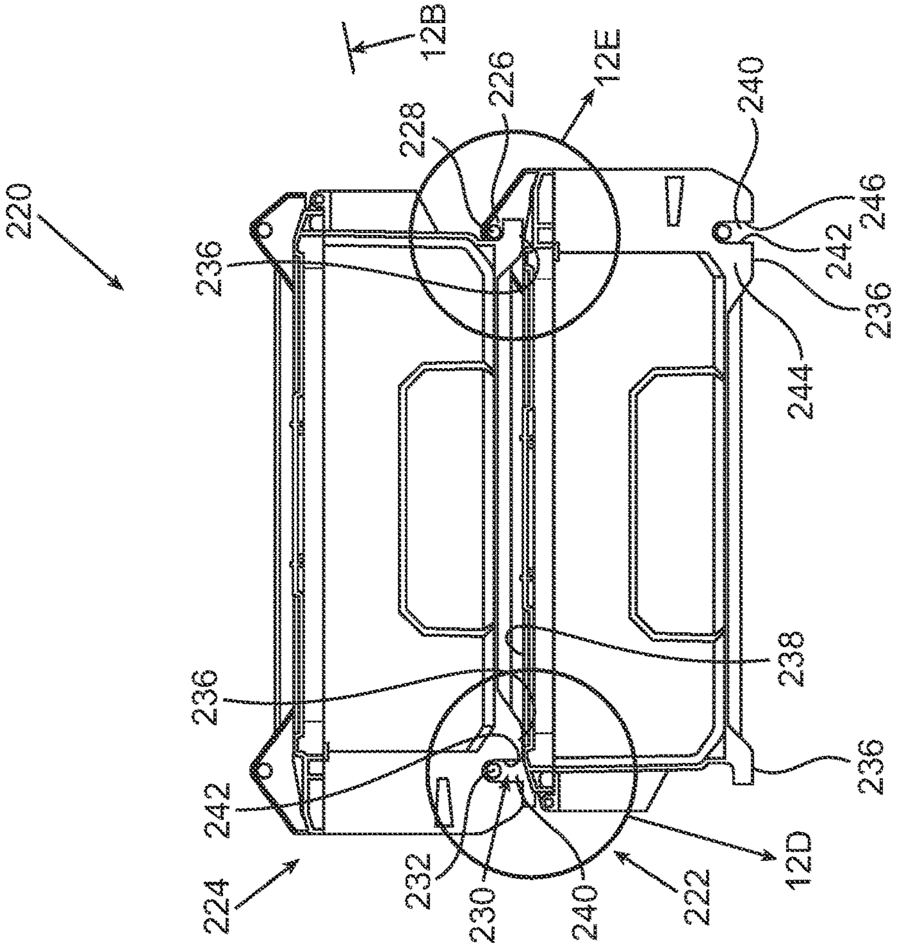
Figure 13A:
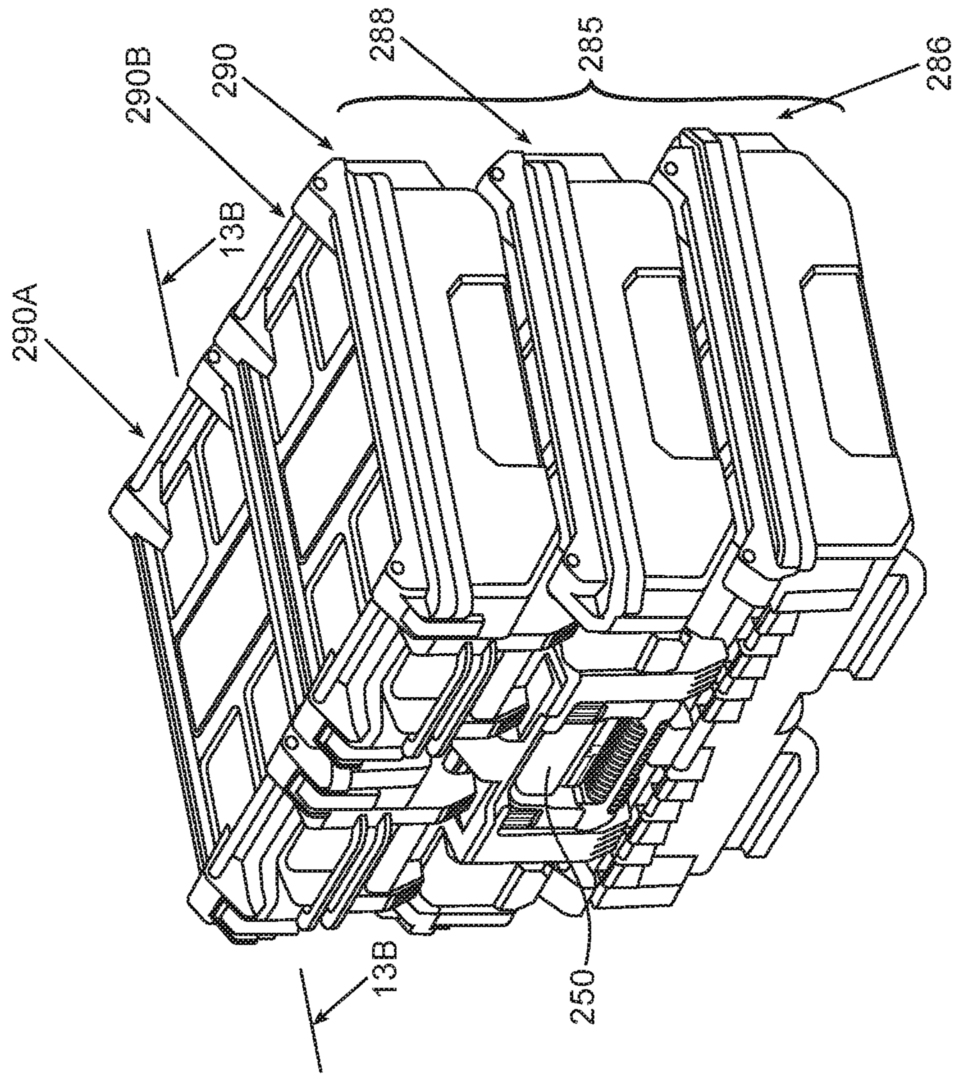
Figure 12E:
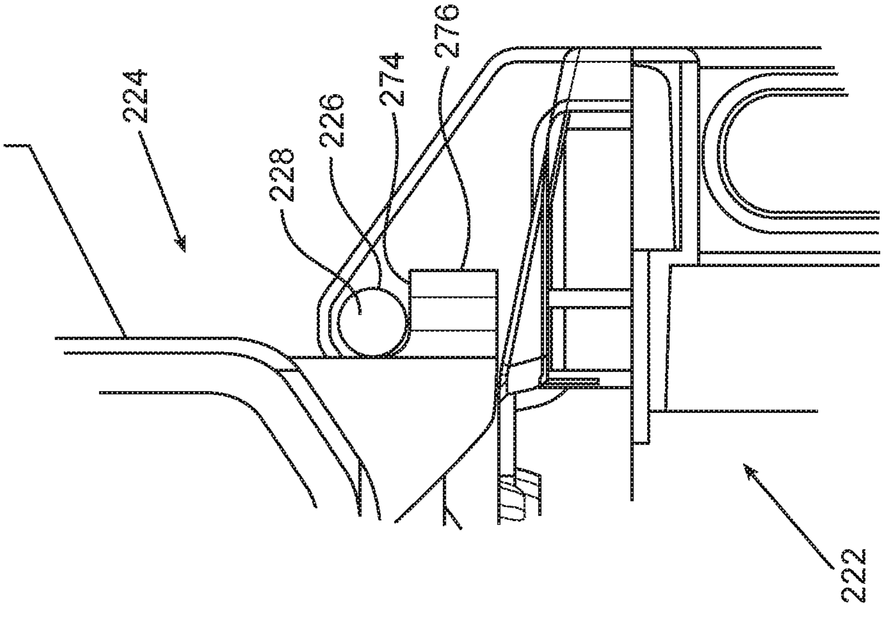
Figure 13C:
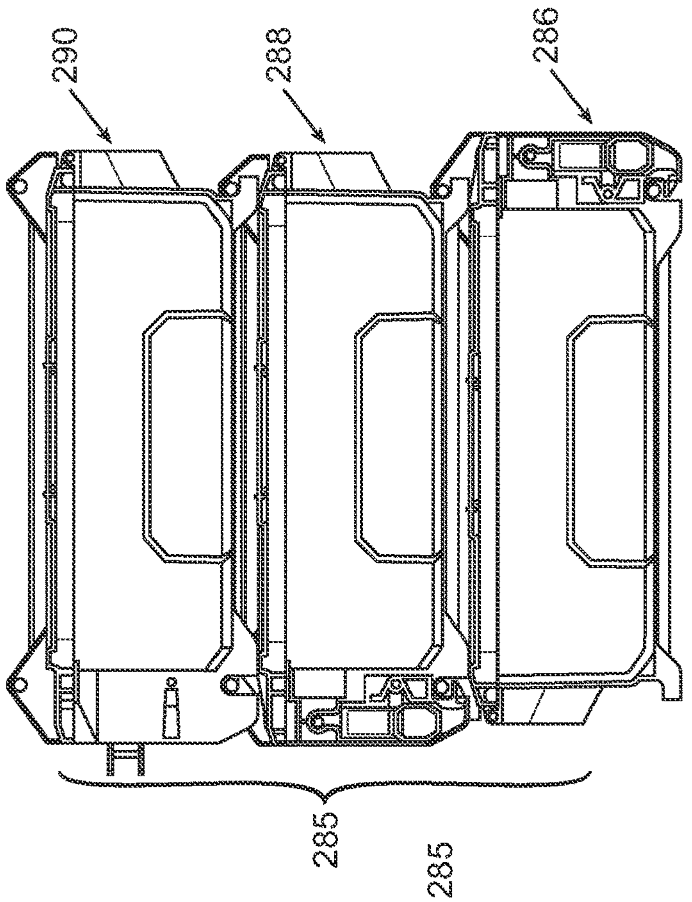
Figure 13B:
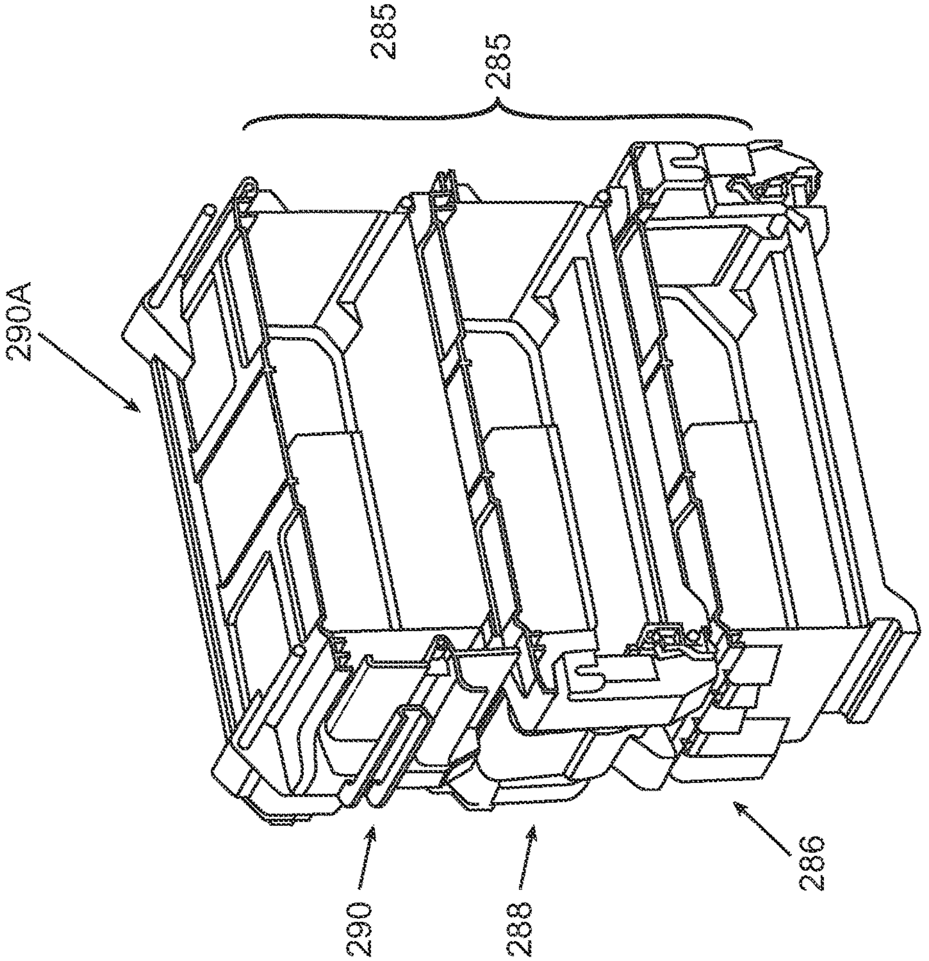
Figure 14B:
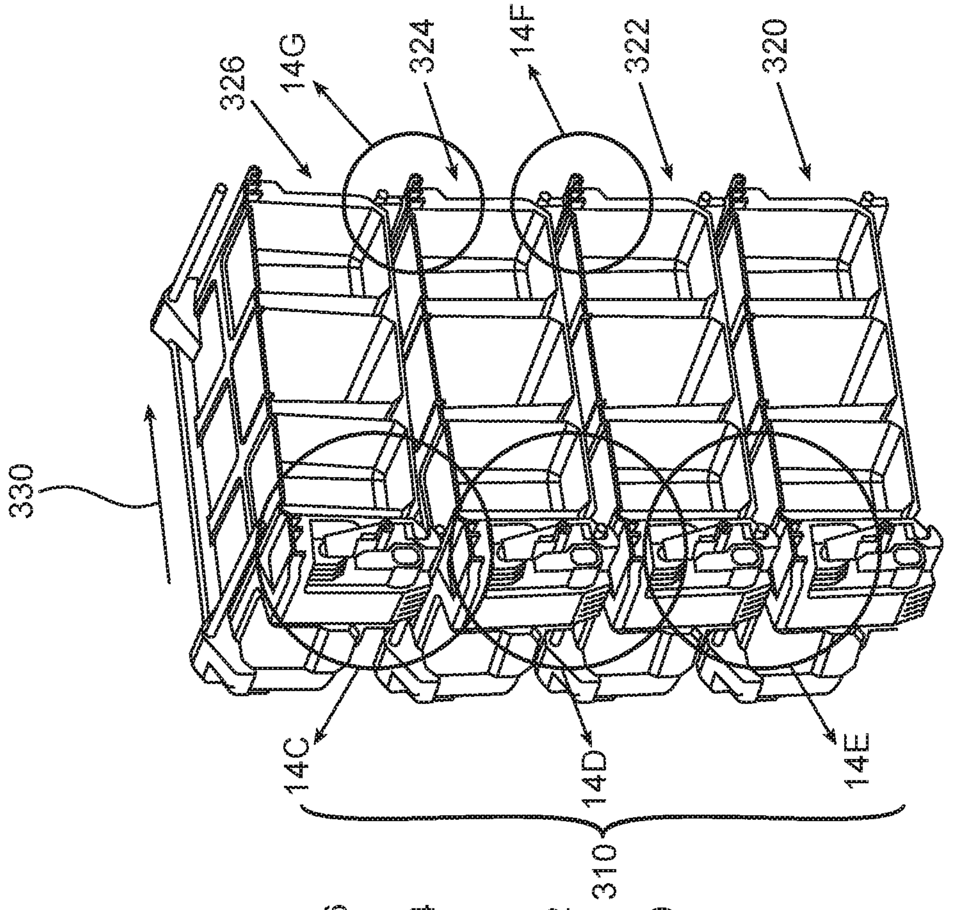
Figure 14A:
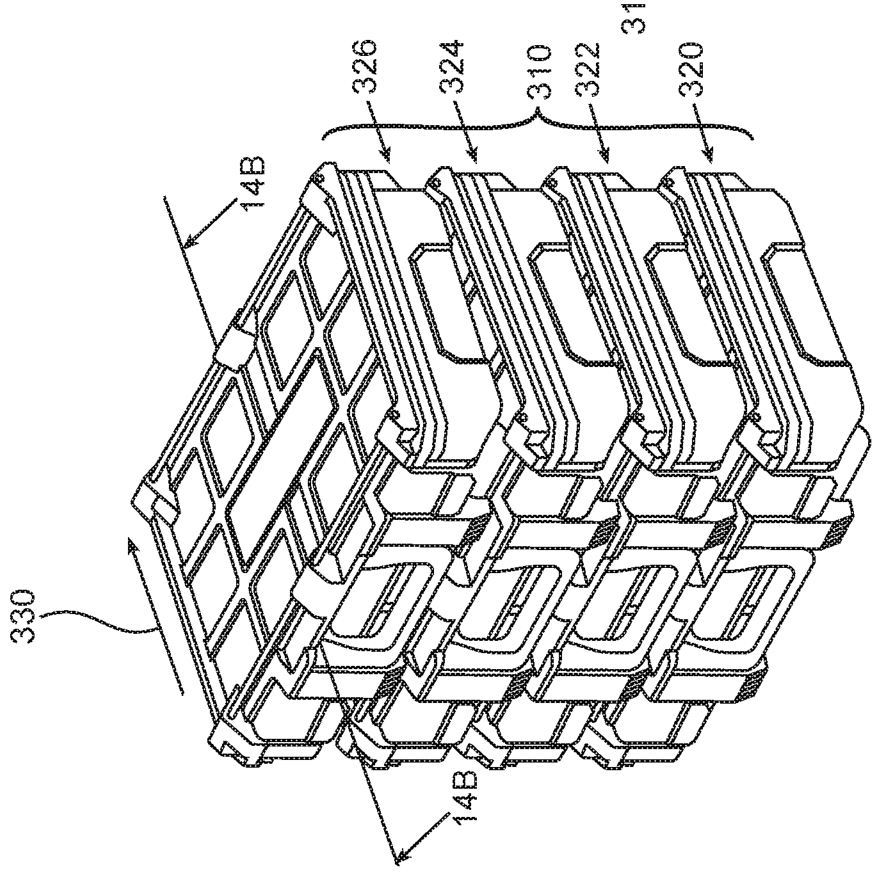
Figure 14E:
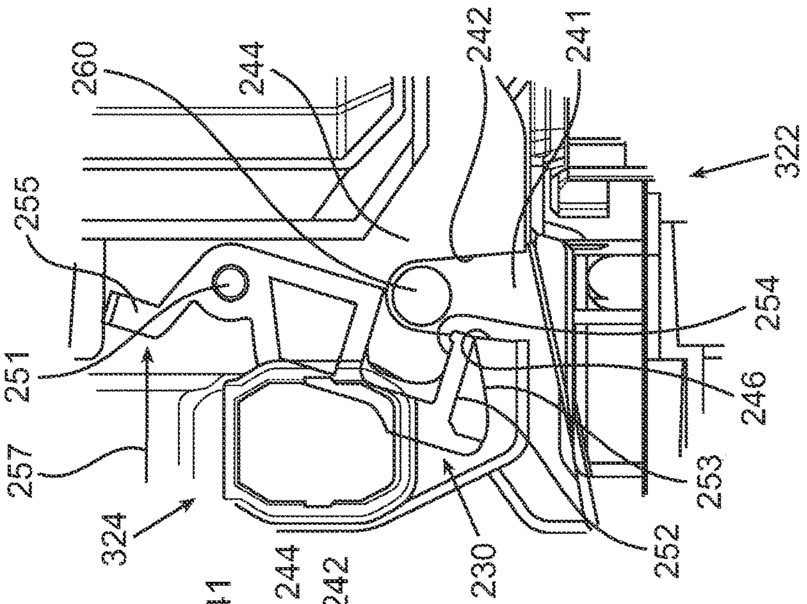
Figure 14D:
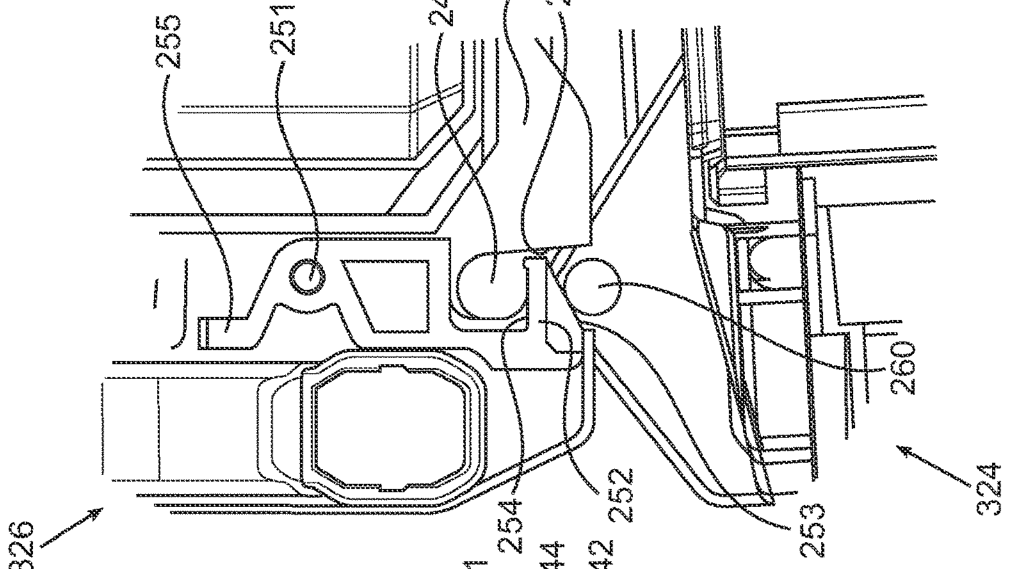
Figure 14C:
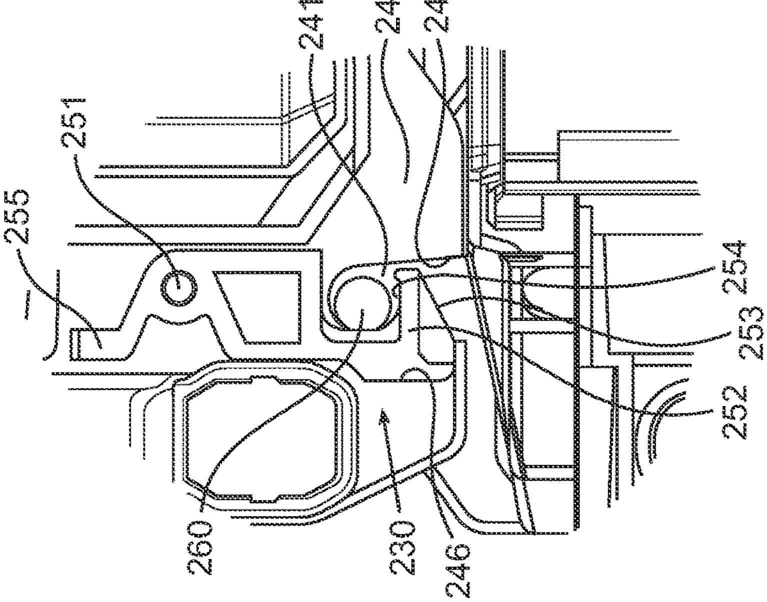
Figure 14G:
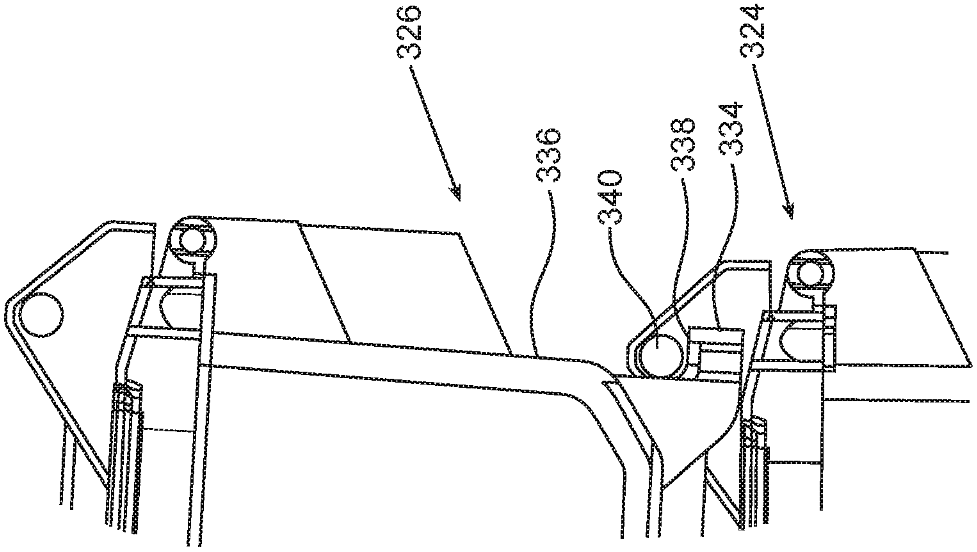
Figure 14F:
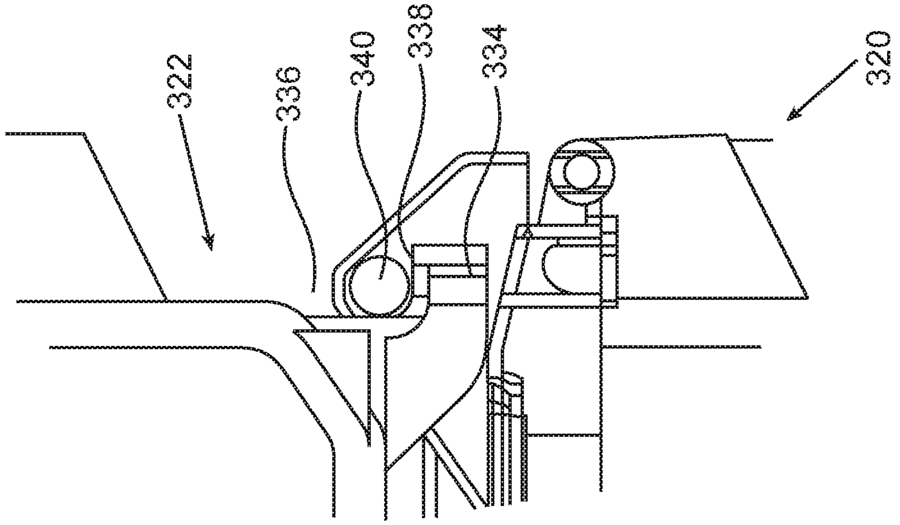
Figure 15B:
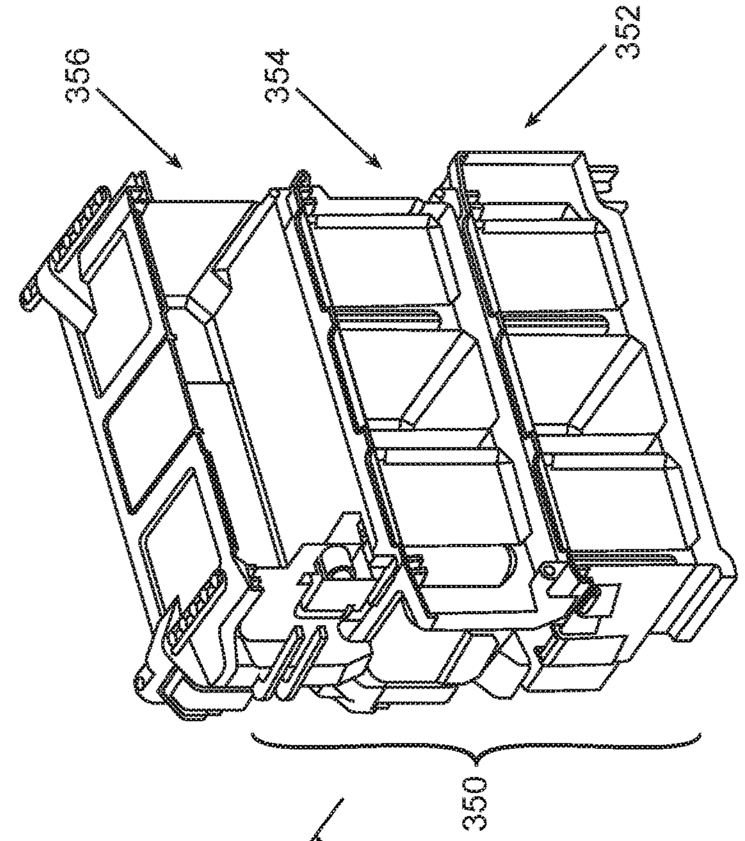
Figure 15A:
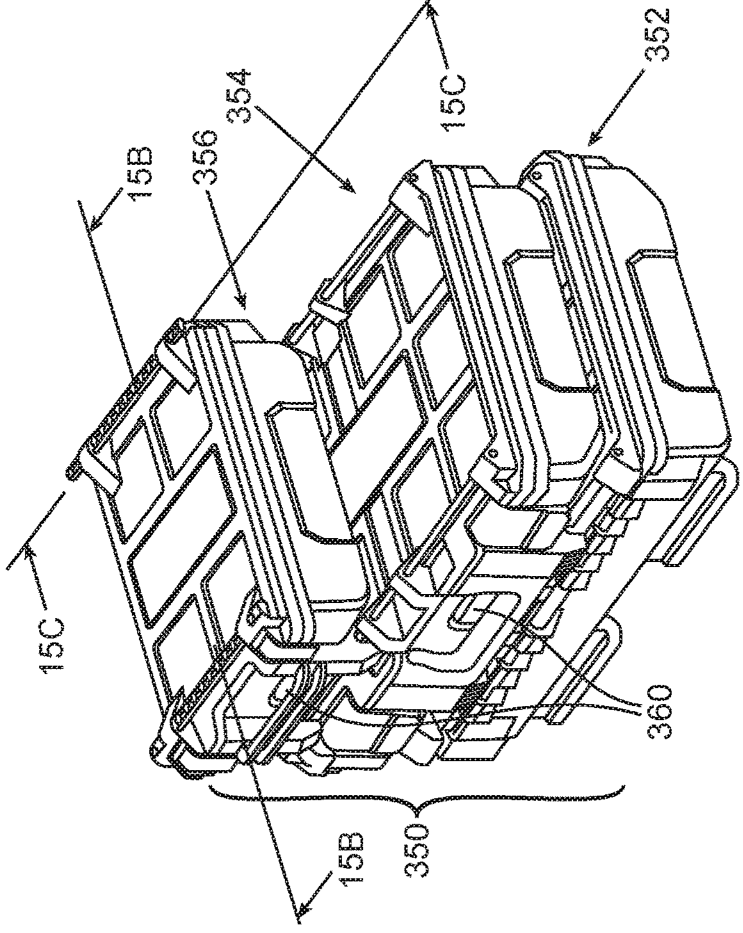
Figure 15C:
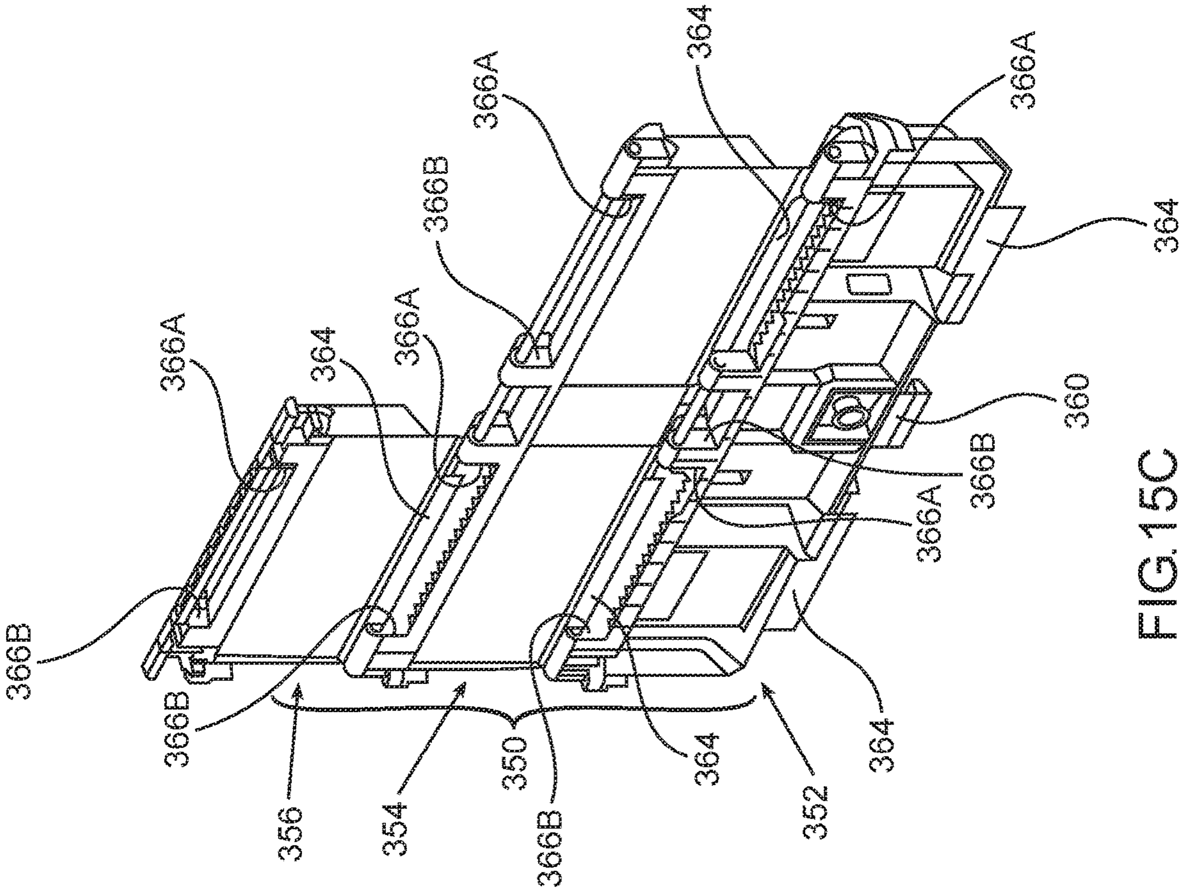
Figure 16B:
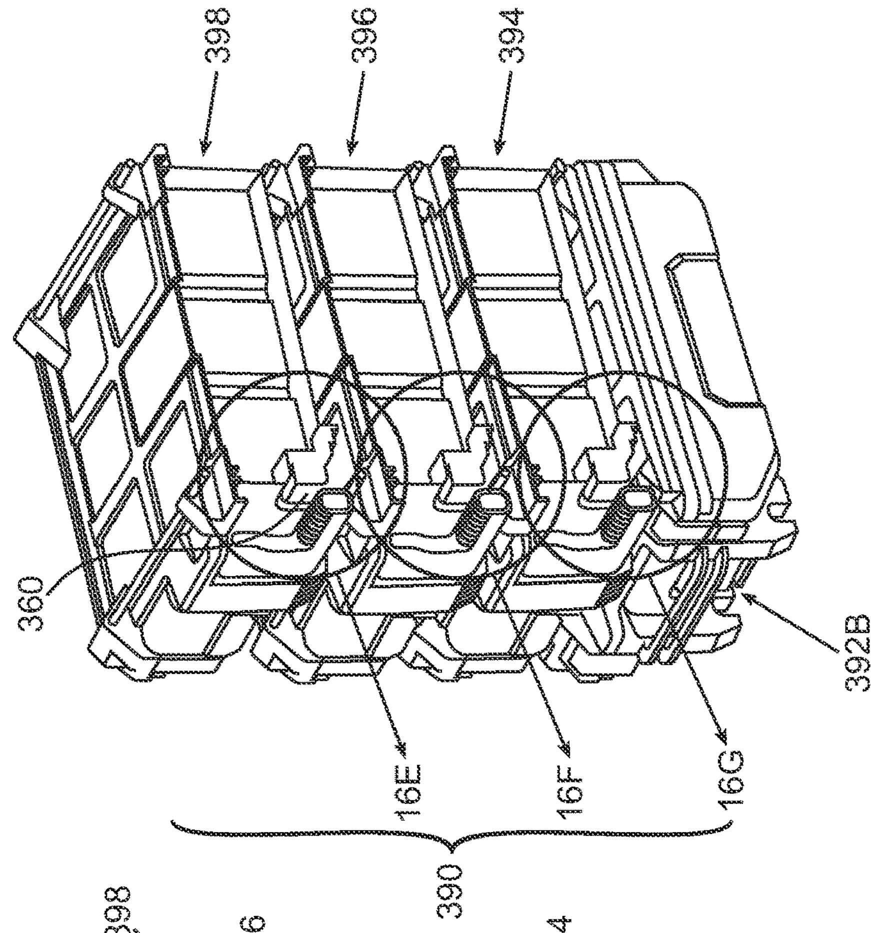
Figure 16A:
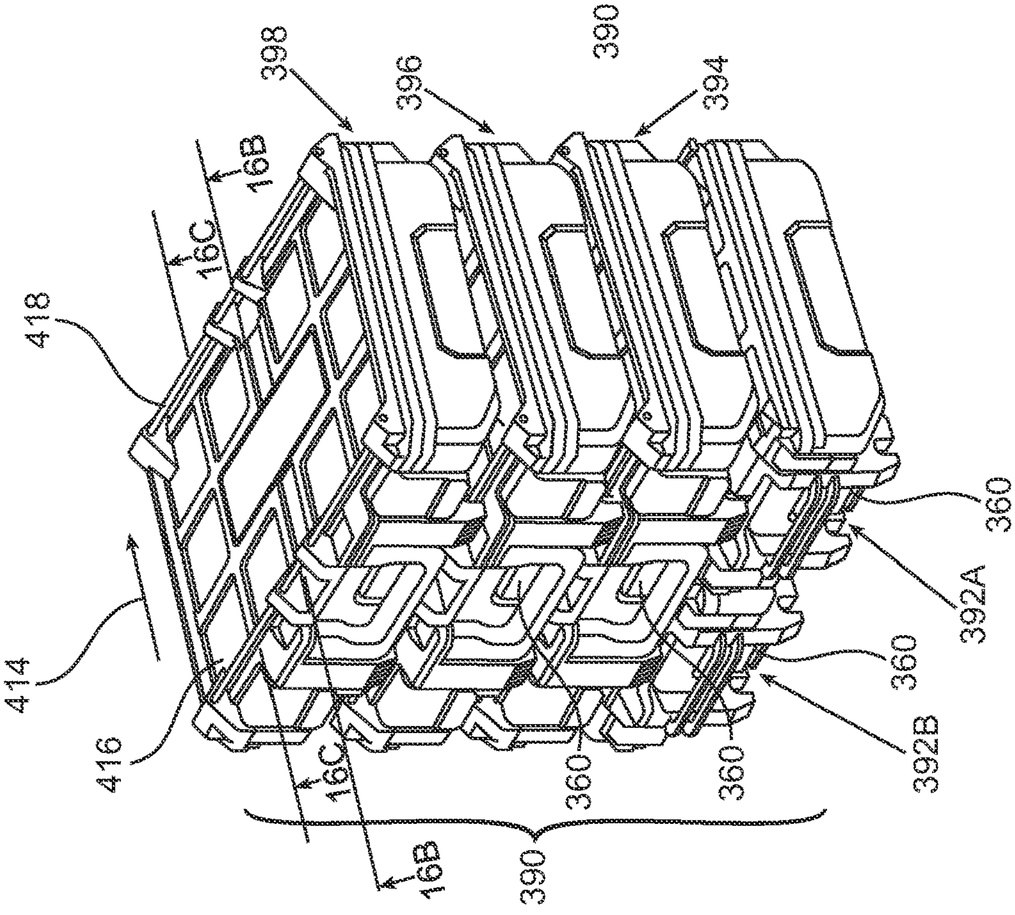
Figure 16D:
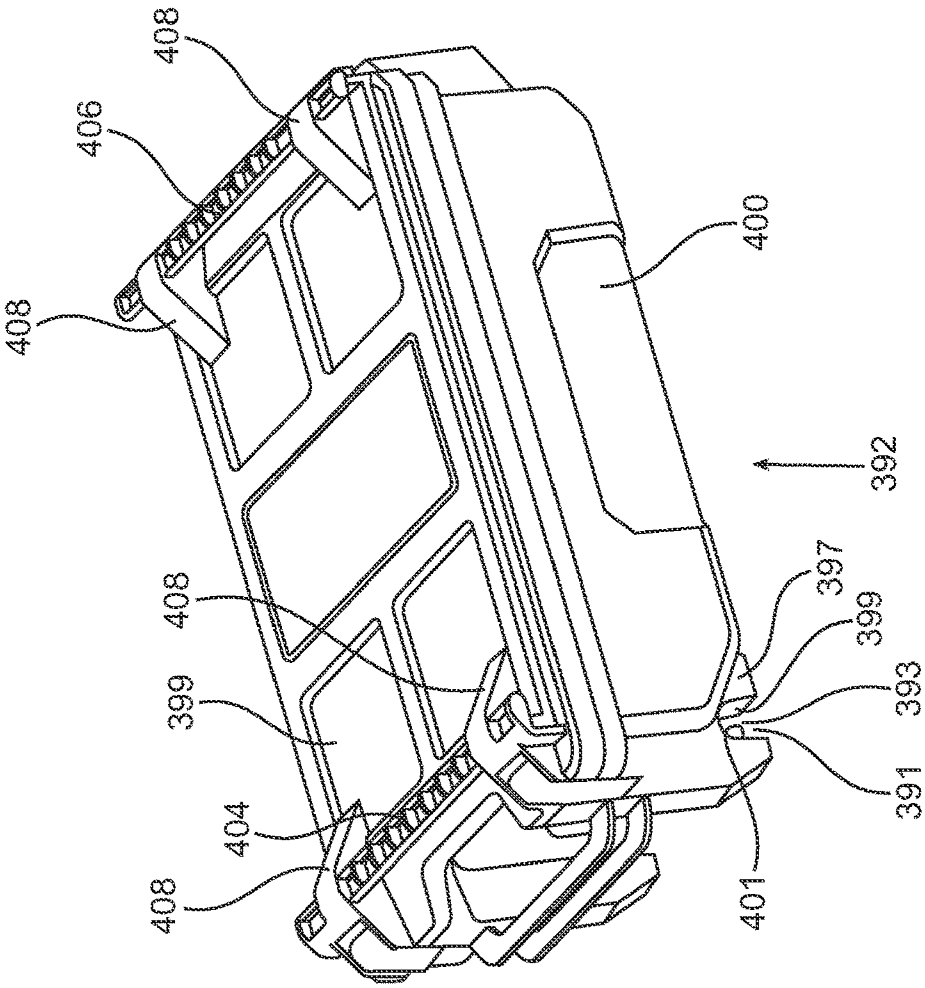
Figure 16C:
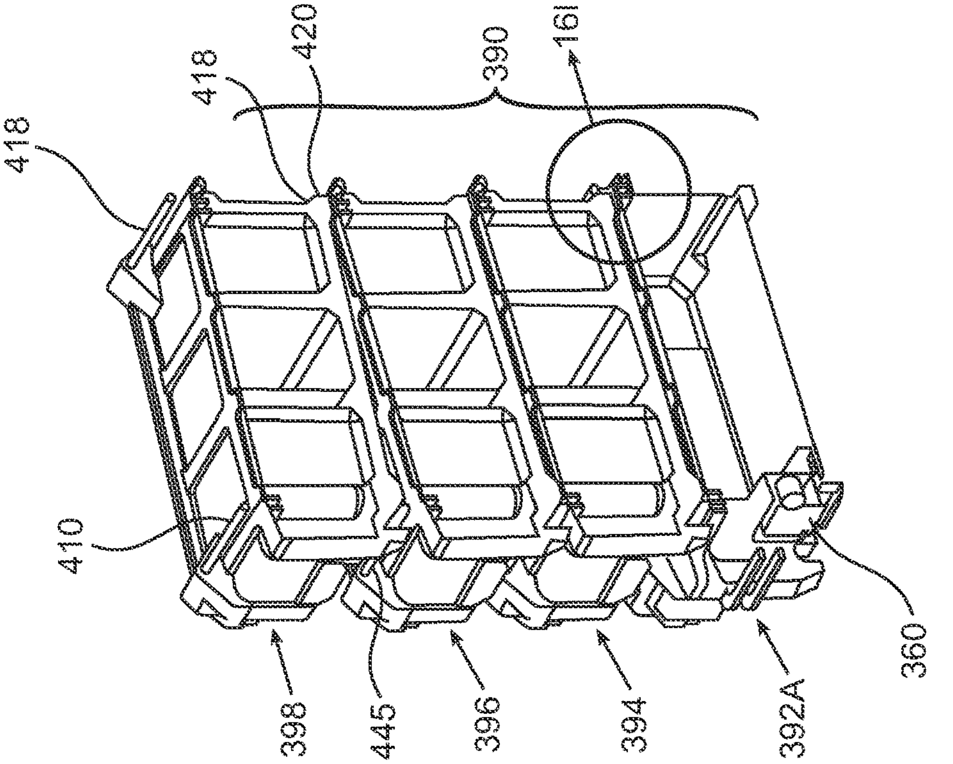
Figure 16F:
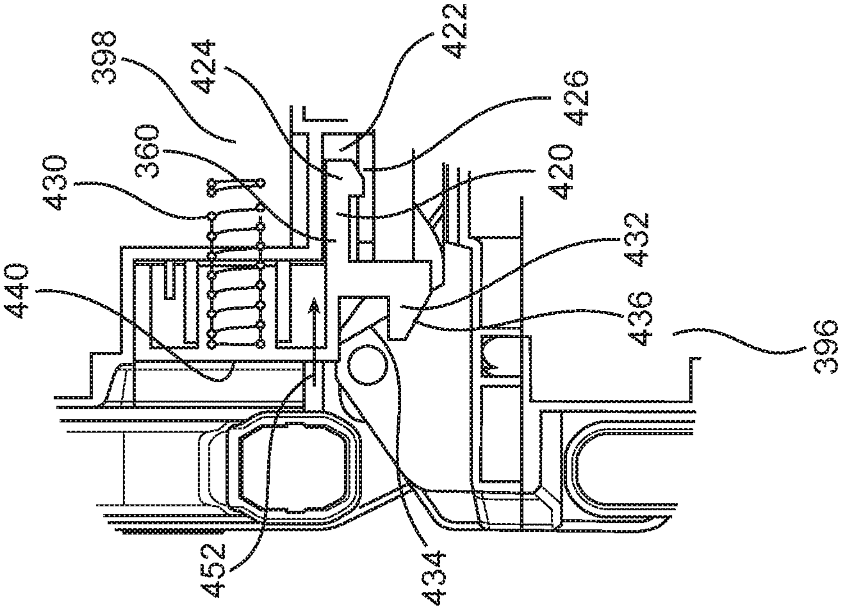
Figure 16E:
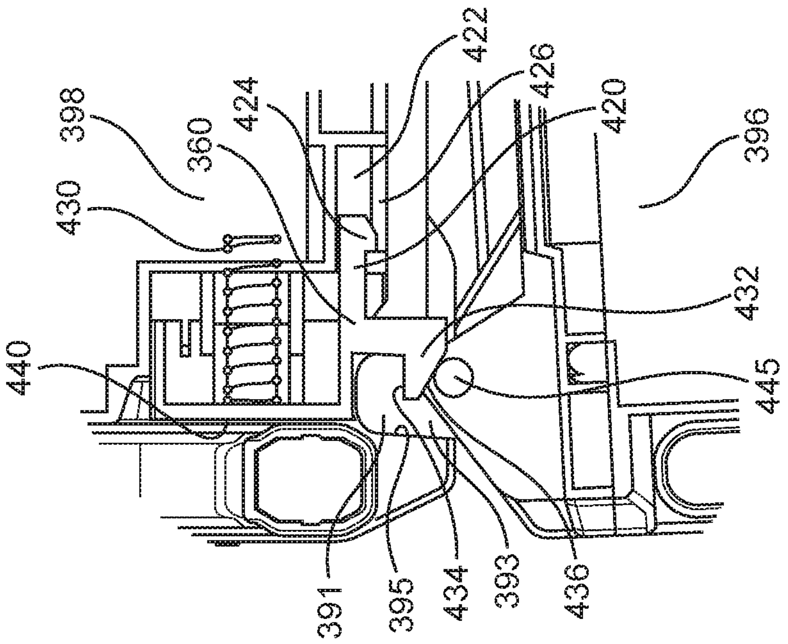
Figure 16H:
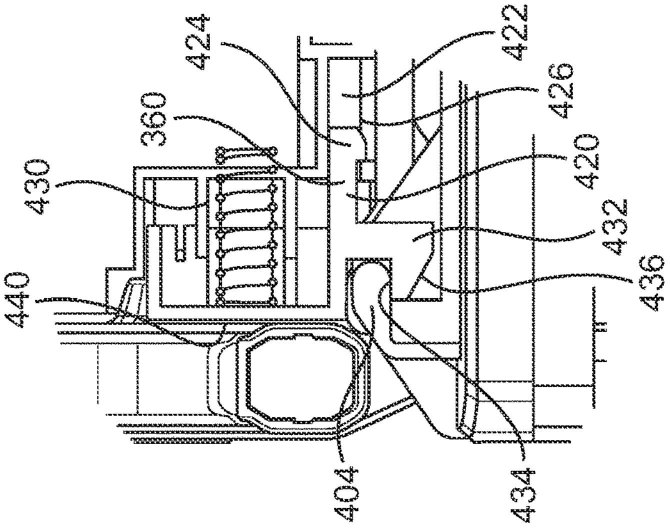
Figure 16G:
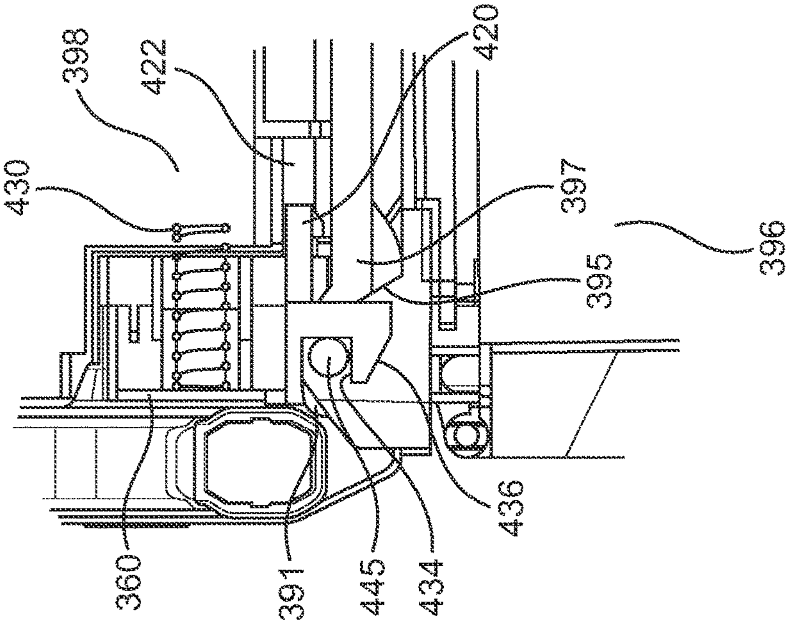
Figure 16I:
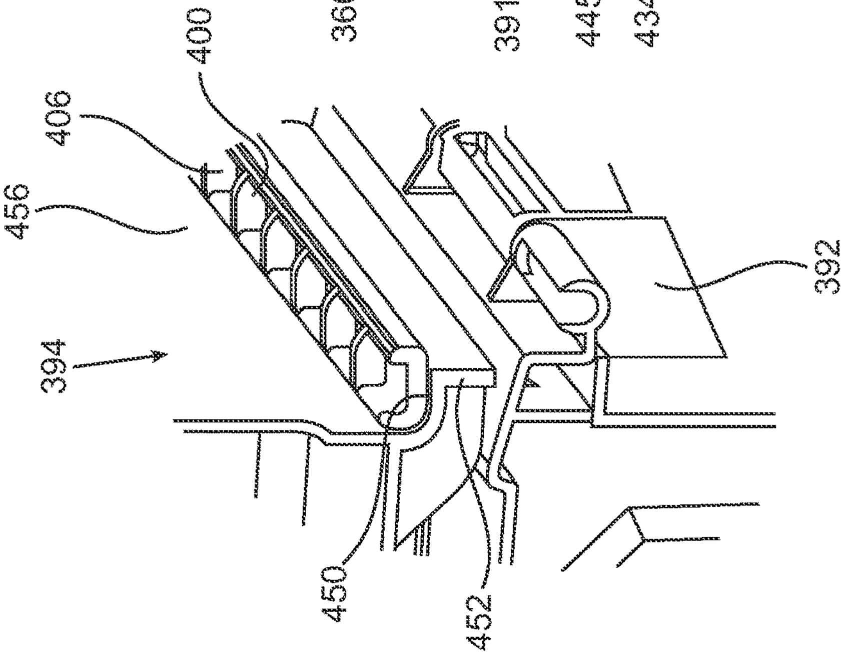
Figure 17A:
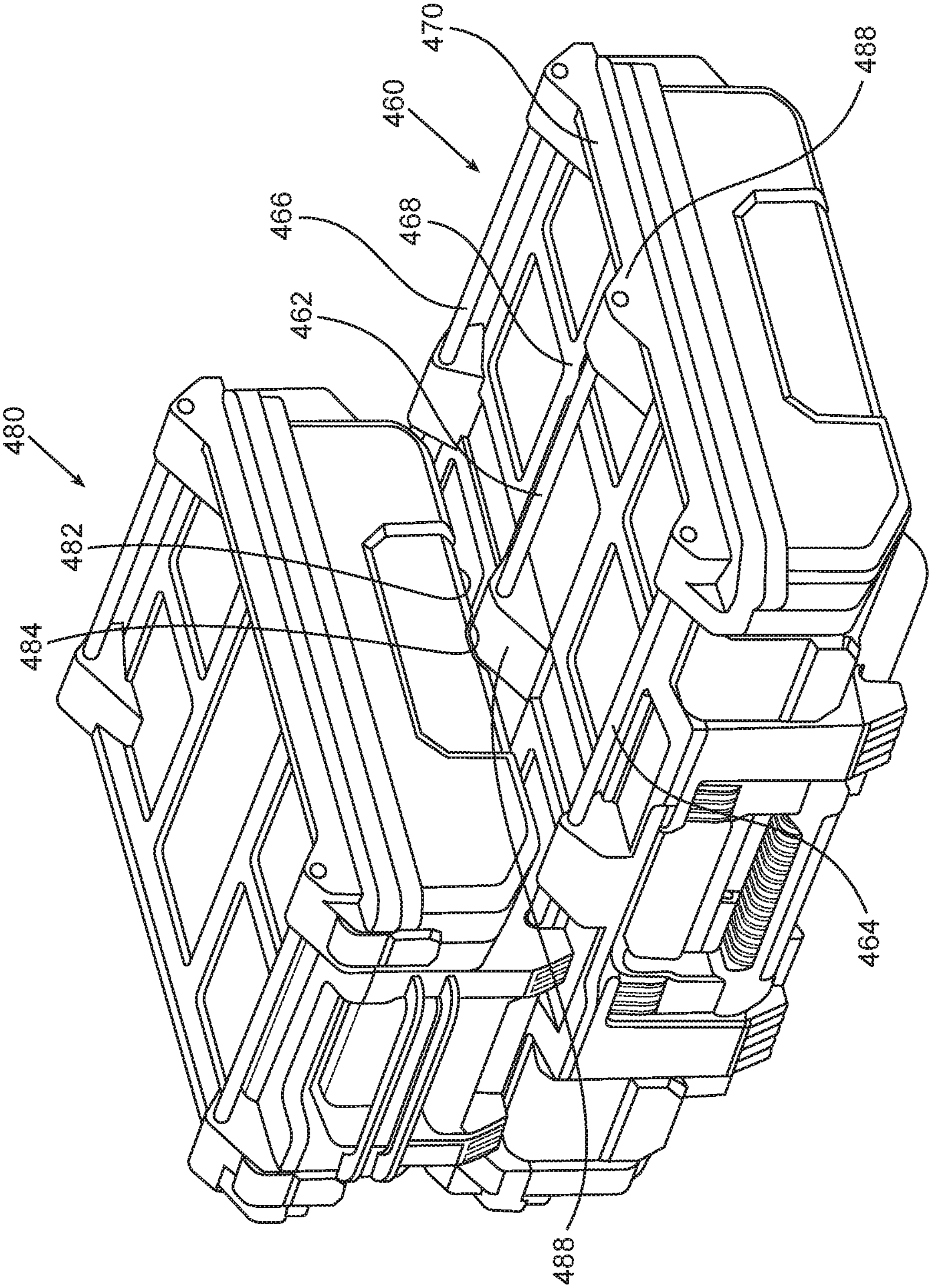
Figure 17B:
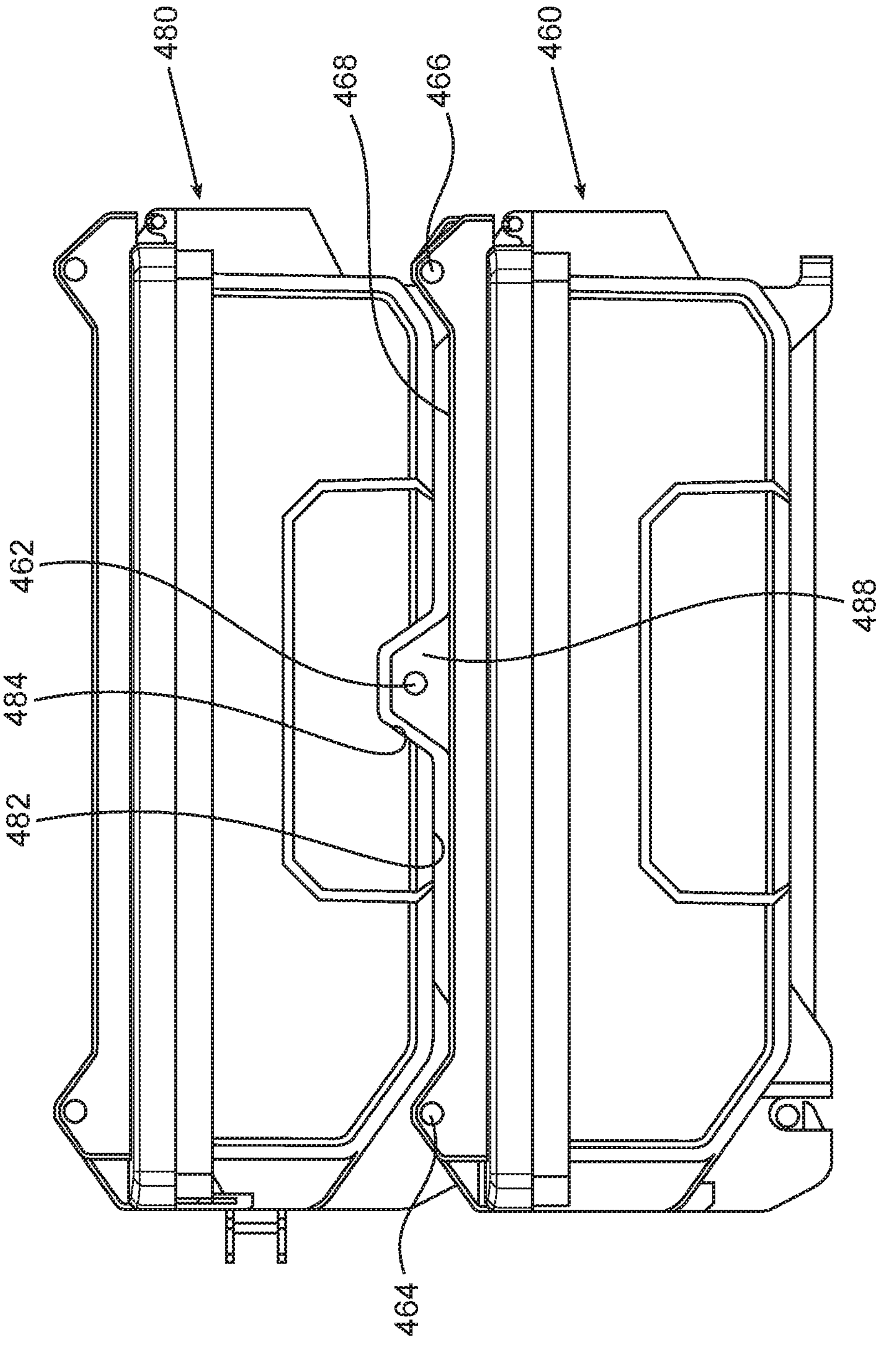

is a sectioned side view illustrating a stage of coupling a second utility module over a first utility module;

FIG. 3G is a top perspective sectioned view illustrating a utility module system at an articulated, locked state;

FIG. 3H is a planar side view of FIG. 3G;

FIG. 4A is a perspective view of multi-level utility module system;

FIG. 4B shows the utility module system of FIG. 4A with several levels removed;

FIG. 4C shows the utility module system of FIG. 4A with yet several levels removed;

FIG. 5A is a front top perspective view of a utility module according to an example of the disclosure, being a drawer organizer;

FIG. 5B is a bottom perspective view of the drawer organizer of FIG. 5A;

FIG. 6 is a perspective view of a wheeled utility module according to an example of the disclosure;

FIG. 7A is a top, front perspective view of a utility module system, comprising a first utility module and three co-planar second utility modules, and wherein the first utility module has an open top;

FIG. 7B illustrates the utility module system of FIG. 7A, however with two second utility modules removed;

FIG. 7C is a sectioned view taken along line C-C in FIG. 7A;

FIG. 7D is a sectioned view taken along line D-D in FIG. 7A;

FIG. 7E is a sectioned view taken along line E-E in FIG. 7A;

FIG. 7F is a sectioned view taken along line F-F in FIG. 7B;

FIG. 7G illustrates the utility module system of FIG. 7A, however with one centrally positioned second utility modules;

FIG. 7H is a sectioned, planar view taken along line I-I in FIG. 7G;

FIG. 7I is a sectioned, perspective view taken along line I-I in FIG. 7G;

FIG. 8A is a perspective view illustrating a wall mounted utility module, according to an example of the disclosure;

FIG. 8B illustrates the wall mounting plate seen in FIG. 8A;

FIG. 8C is a sectioned view taken along line C-C in FIG. 8A;

FIG. 9 is a perspective view of a mounting plate according to the present disclosure;

FIG. 10A illustrates a utility module according to the disclosure, articulated in a wall-mounting configuration to a mounting plate of FIG. 9;

FIG. 10B is a sectioned view taken along line B-B in FIG. 10A;

FIGS. 11A to 11C are examples of mounting utility modules to a mounting plate of FIG. 9;

FIGS. 12A to 12C are directed to a two-leveled utility module assembly, assembled at an inverted orientation, wherein:

FIG. 12A is a perspective view of the utility module assembly;

FIG. 12B is a vertical section taken along line 12B-12B in FIG. 12A;

FIG. 12C is a planar side view of FIG. 12B;

FIG. 12D is an enlarged view of the portion marked 12D in FIG. 12C;

FIG. 12E is an enlarged view of the portion marked 12E in FIG. 12C;

FIGS. 13A to 13C illustrate a three-leveled utility module assembly, assembled at an alternating orientation, wherein:

FIG. 13A is a perspective view of the utility modules assembly;

FIG. 13B is a vertical section taken along line 13B-13B in FIG. 13A;

FIG. 13C is a planar side view of FIG. 13B;

FIG. 14A is a perspective view illustrating consecutive assembly steps of a four-leveled utility modules assembly;

FIG. 14B is a sectioned view taken along line 14A-14A in FIG. 14A;

FIG. 14C is an enlarged planar side view of the portion marked 14C in FIG. 14B;

FIG. 14D is an enlarged planar side view of the portion marked 14D in FIG. 14B;

FIG. 14E is an enlarged planar side view of the portion marked 14E in FIG. 14B;

FIG. 14F is an enlarged view of the portion marked 14F in FIG. 14B;

FIG. 14G is an enlarged view of the portion marked 14G in FIG. 14B;

FIG. 15A is a perspective view of a three-leveled utility module assembly, assembled at an alternating orientation, with a top level utility module having a half-sized foot-print, and configured with a slider-type front bar locking arrangement;

FIG. 15B is a vertical section taken along line 15B-15B in FIG. 15A;

FIG. 15C is a vertical section taken along line 15C-15C in FIG. 15A;

FIG. 16A is a perspective view illustrating consecutive assembly steps of a four-leveled utility module assembly;

FIG. 16B is a sectioned view taken along line 16B-16B in FIG. 16A;

FIG. 16C is a sectioned view taken along line 16C-16C in FIG. 16A;

FIG. 16D is a perspective isolated view of a bottom most utility module seen in FIG. 16A, according to an example of the disclosure;

FIG. 16E is an enlarged view of the portion marked 16E in FIG. 16B;

FIG. 16F is an enlarged view of the portion marked 16G in FIG. 16B;

FIG. 16G is an enlarged view of the portion marked 16G in FIG. 16B, with the locking lever at the locked position;

FIG. 16H is an enlarged view of the portion marked 16F in FIG. 16B;

FIG. 16I is an enlarged view of the portion marked 16I in FIG. 16C, taken at a different angle;

FIG. 17A illustrates a utility module assembly wherein a first utility module is configured with an intermediate locking bar;

FIG. 17B is a planar side view of FIG. 17A; and

Figure 17C:
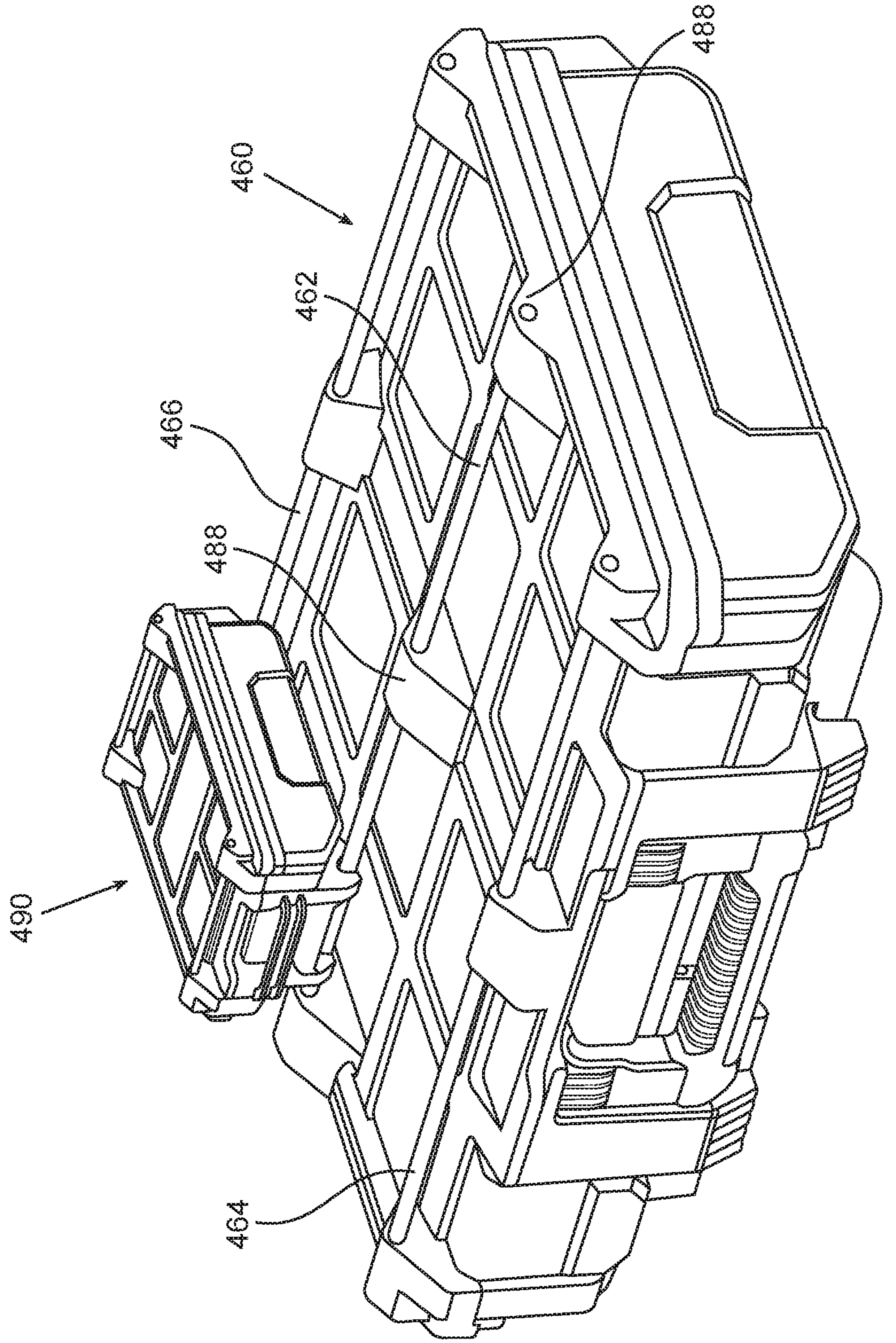

FIG. 17C illustrates a small-sized utility module assembled over a first utility module configured with an intermediate locking bar.

DETAILED DESCRIPTION OF EMBODIMENTS

Attention is first directed to FIGS. 1A to 1G of the drawings, directed to a utility module assembly generally designated 10, comprising a bottom, first utility module 12 and a top, second utility module 14. Both utility modules of the example are rectangle containers, each configured with a body portion 12B and 14B, respectively, and a top portion 12T and 14T respectively, of each container being a lid hingedly articulated to the respective body portion 12B and 14B.

Whilst the present example illustrates two similar utility modules, it is appreciated that the utility modules can be different and assume different function, shape and configuration. For example, the first utility module can be configured with only front and back locking bars at a top portion thereof, whilst the second utility module can be configured with a back bar coupling recess and a front locking bar arrangement as discussed hereinafter. Since in the present example both the first utility module 12 and the second utility module 14 are configured with full coupling arrangements, facilitating articulation on top and under each other to any other utility module, and for sake of clarity only, some elements are designated only with reference to the first utility module 12 and other elements are designated only with reference to the second utility module 14.

The first utility module 12 is a rectangular shaped container with the body portion 12B having a front side 20 and a back side 22, a right side 24 and a left side 26, a bottom base 28 and a top opening (not seen), configured with a lid 12T pivotally articulated at a top portion of the back side 22.

The lid 12T is pivotally secured to the container body portion 12B and is displaceable between a closed position, and an open position (not shown), wherein a pair of latches 32 are provided for securing the lid 12T at the closed position. The first utility module 12 is configured with a first carrying handle 36 at the front side 20 of the body portion 12B, and a second handle 38 at the top side of the lid 12T.

A top surface 15 of the top portion, namely lid 12T, is configured at a back portion thereof with a back locking bar 40 and at a front portion with a front locking bar 42, extending parallel to said back locking bar 40, where said locking bars are rigid round rods, fixedly supported at their respective ends by an elevated right bar support 46, an elevated left bar support 48 and an intermediate elevated central bar support 50.

The right bar support 46 and the elevated left bar support 48 extend along respective sides of the lid 12T and are disposed substantially parallel to a locking path extending in direction from the front side 20 towards the back side 22, represented by arrow marked LP. The locking path can extend in direction from the front side towards the back side, as indicated by the arrow, or in direction from the back side towards the front side.

The right bar support 46 and the elevated left bar support 48 are substantially parallel to one another and are equally spaced form the top surface of the lid 12T. Likewise, top surfaces of the bar supports 46, 48 and 50 are substantially equally elevated from the top surface of the lid 12T, defining together an imaginary plane.

Turning now to the second utility module 14, it is also rectangular shaped container, though smaller than the first utility module 12, and is configured with a front side 52, a back side 54, a right side 56 a left side 58, a bottom base 60 and a top opening (not seen), configured with the lid 14T pivotally articulated at a top portion of the back side 54.

Figure 1B:
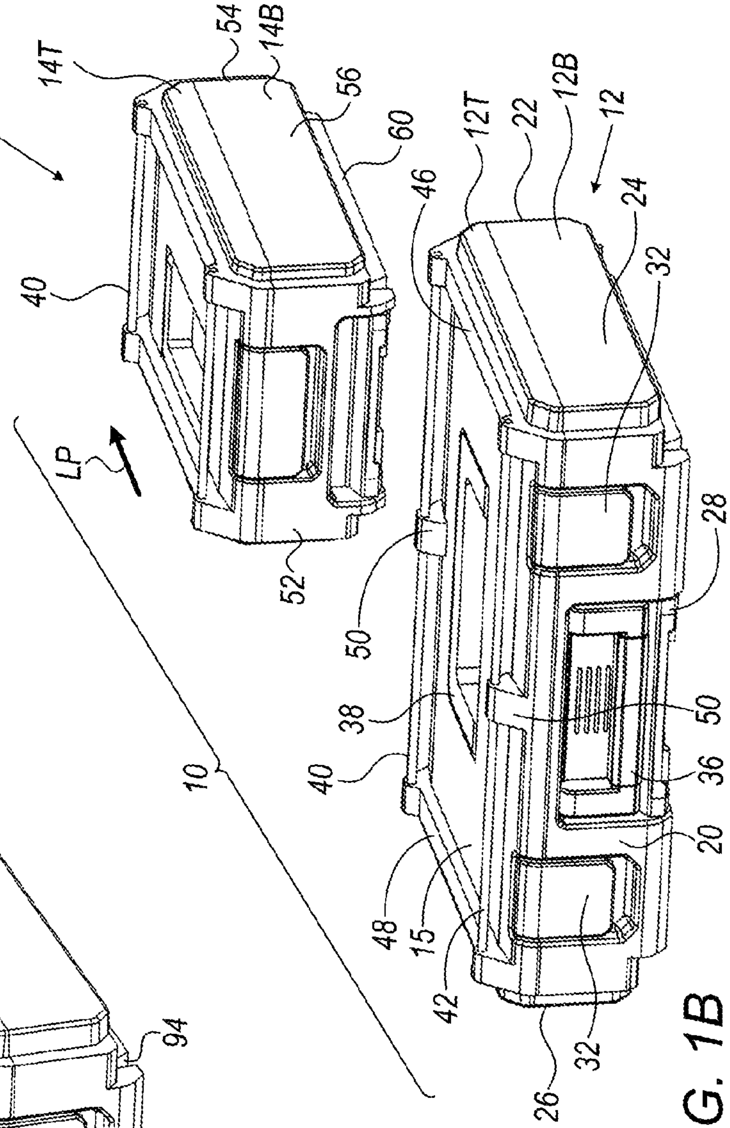
FIG. 1B is a top perspective, exploded view of FIG. 1A.
Figure 1A:
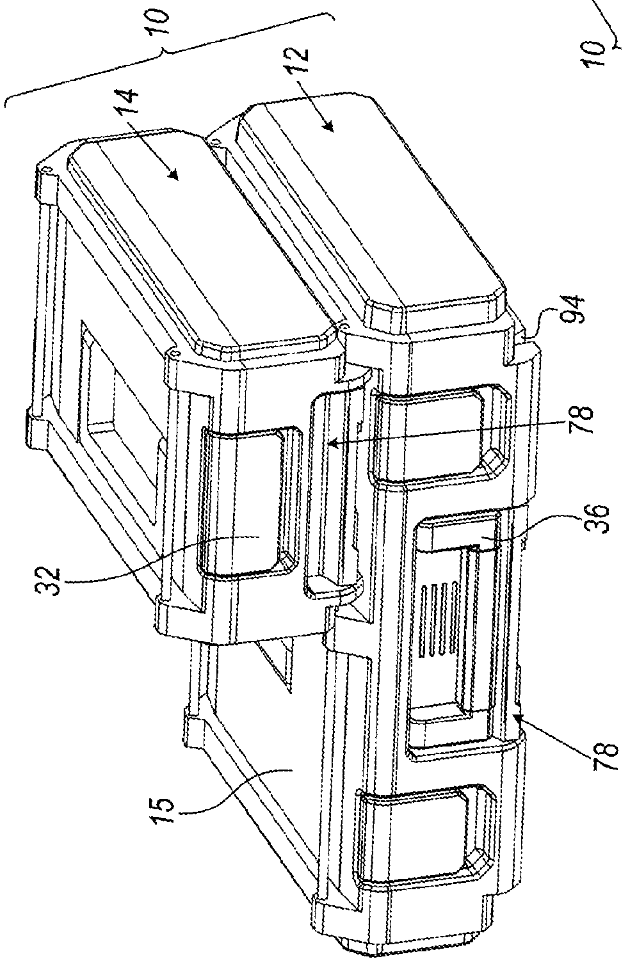
FIG. 1A is a front, right side, perspective view of a basic utility module system, according to an aspect of the present disclosure.
Figure 1C:
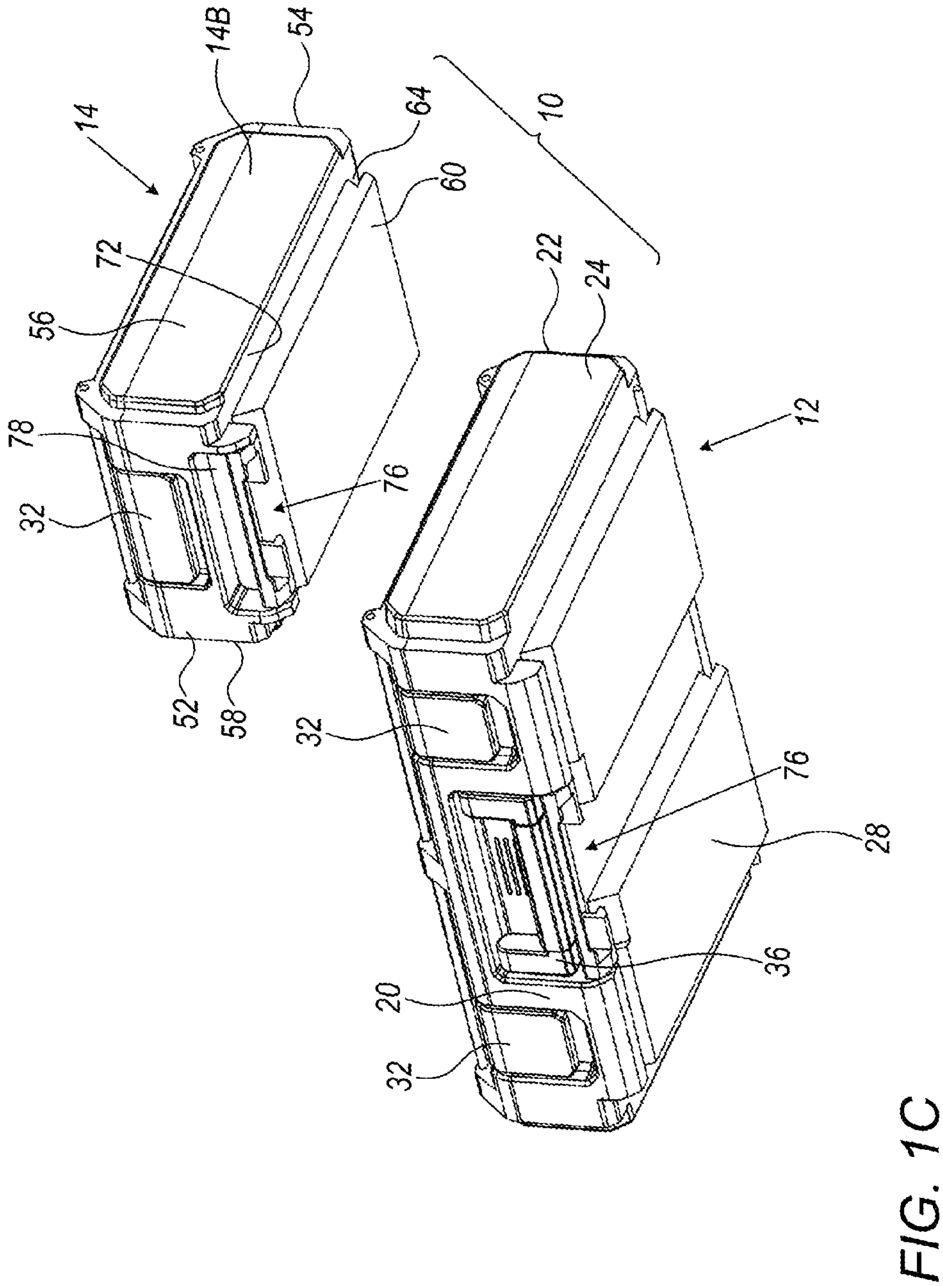
FIG. 1C is a bottom perspective, exploded view of FIG. 1A.
Figure 1E:
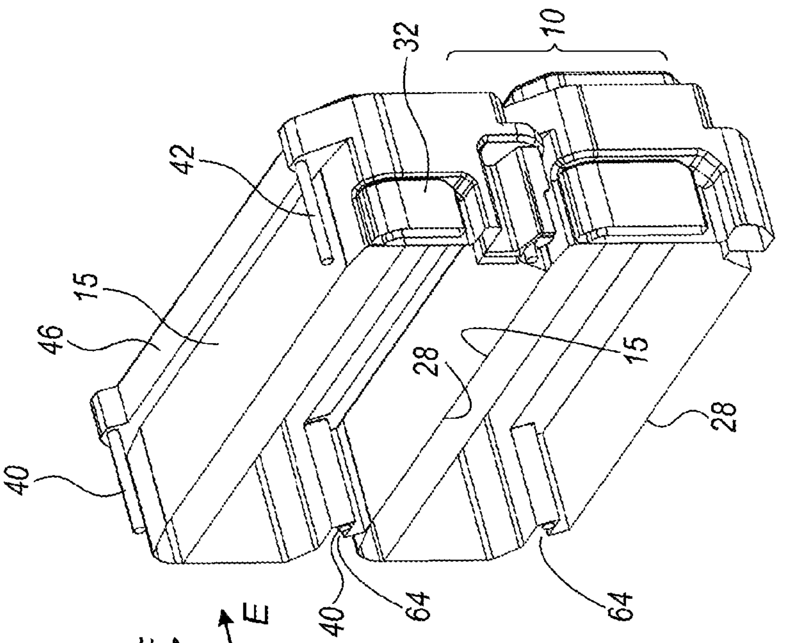
FIG. 1E is a section taken along line E-E in FIG. 1D.
Figure 1D:
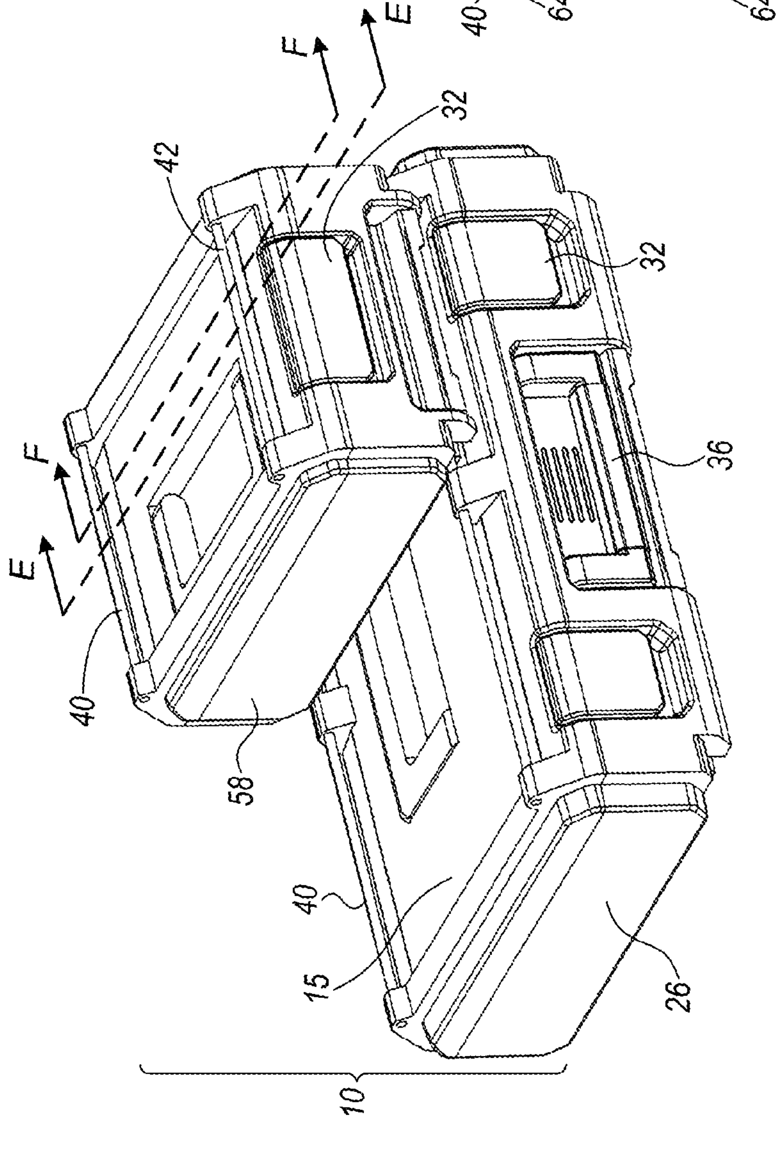
FIG. 1D is a left side perspective view of FIG. 1A.
Figure 1G:
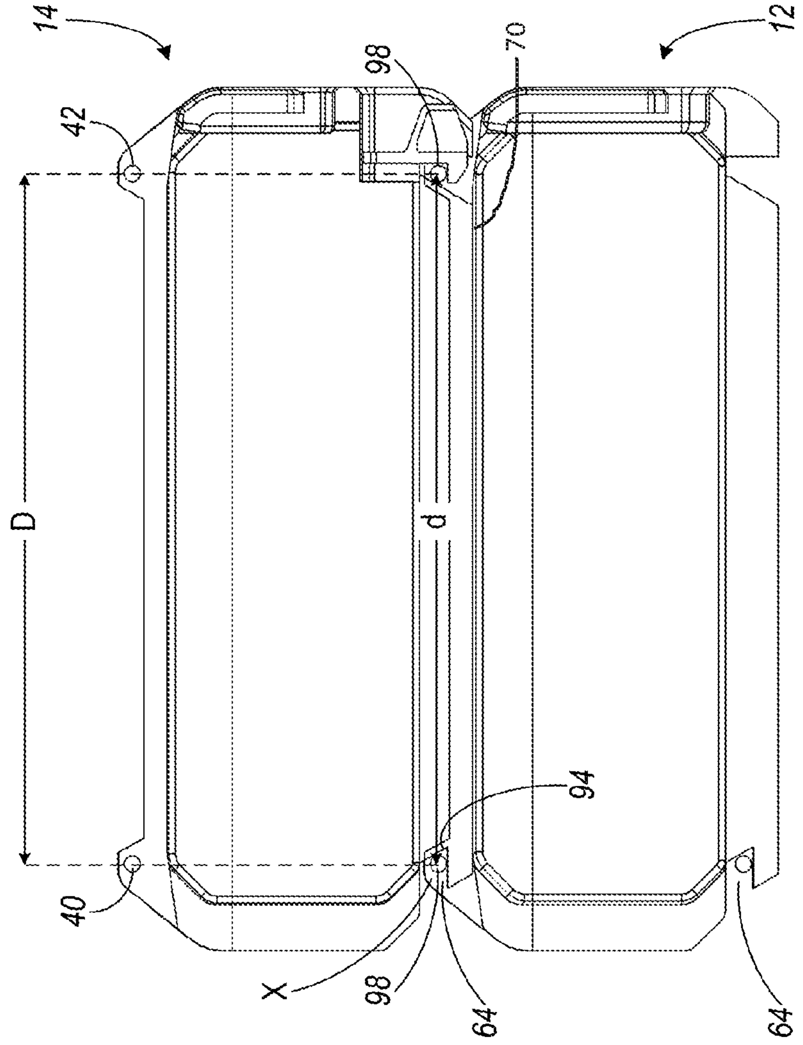
FIG. 1G is a planar side view of FIG. 1A.
Figure 1F:
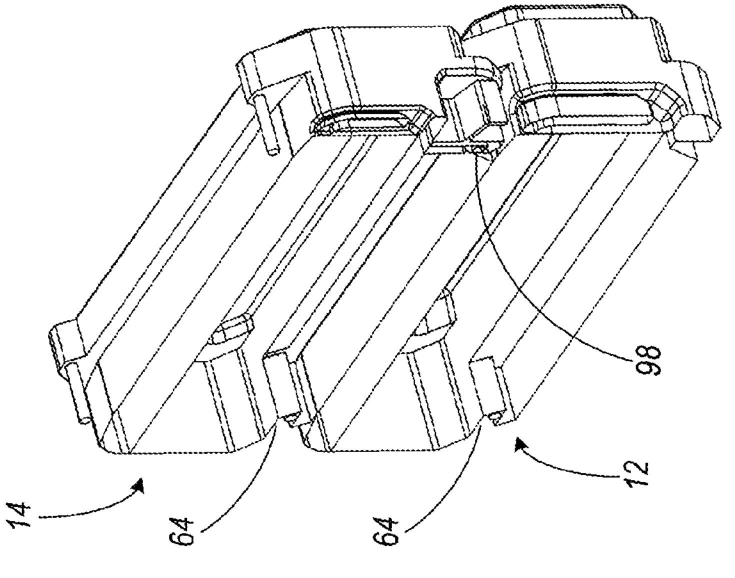
FIG. 1F is a section taken along line F-F in FIG. 1D.
Figure 1H:
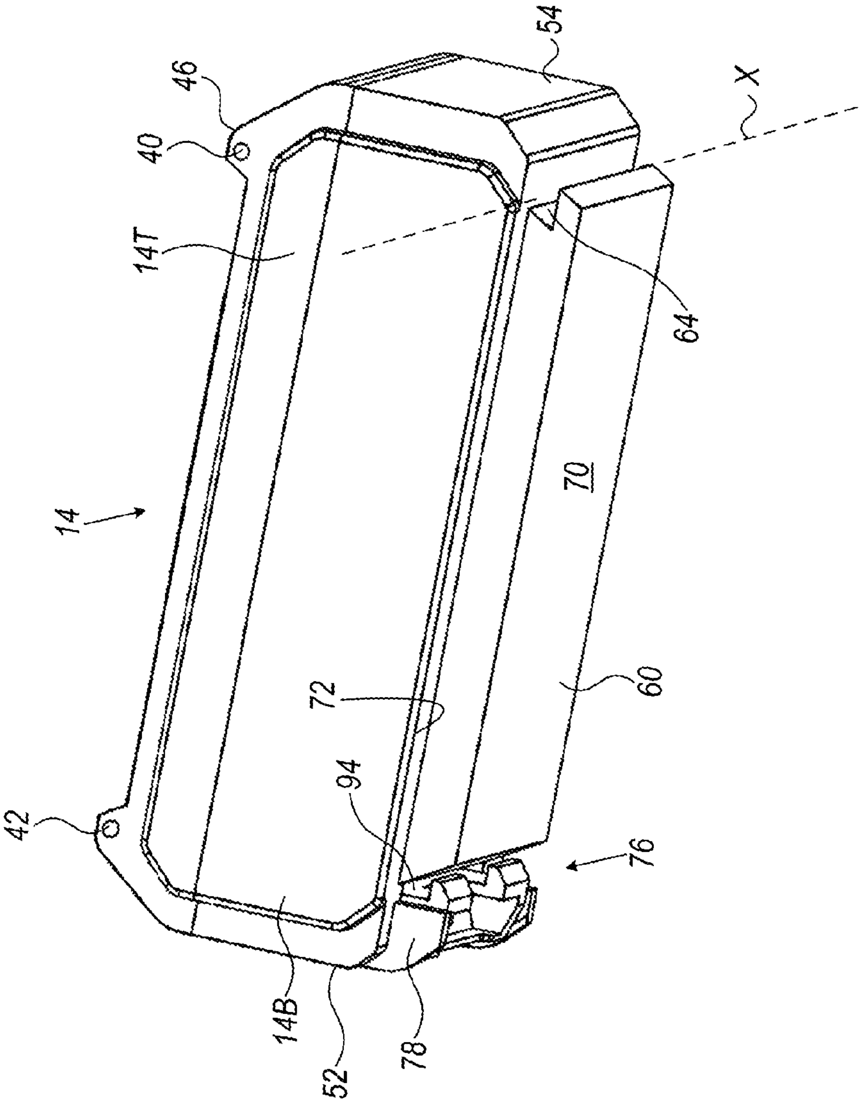
FIG. 1H is a bottom perspective view of a top utility module of the utility module system of FIG. 1A.

As can best be seen in FIG. 1H, the bottom base 60 of the second utility module 14 is configured a back portion thereof with a back bar coupling recess 64, formed within a U-like shaped bar receiving portion having an opening facing towards the back side 54, and 64 having a longitudinal axis X extending substantially parallel to the locking path LP. In the example of FIGS. 1 the bottom base 60 has a flat surface 70 with depressed side portions 72, wherein at an assembled, articulated position (FIG. 1A) the flat surface 70 portion is configured for bearing over a top surface 15 of the first utility module 12, with the depressed side portions 72 accommodating the elevated right bar support 46 and the central bar support 50.

Figure 2B:
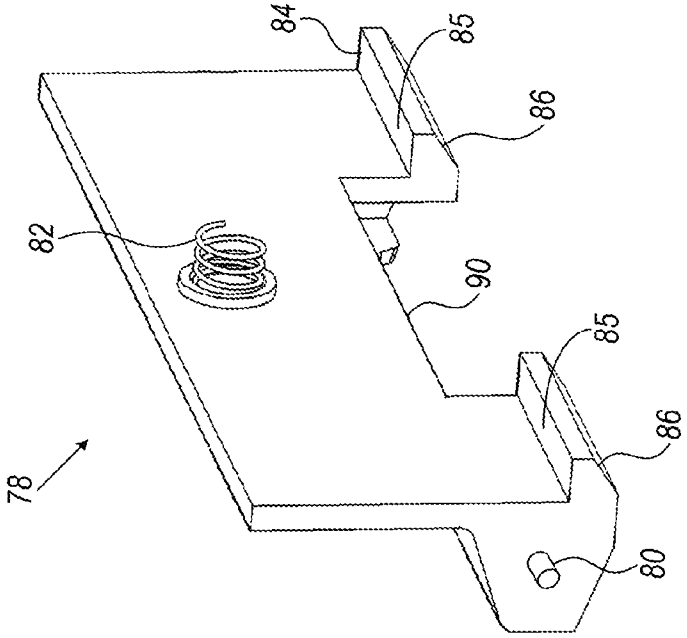
FIG. 2B is a perspective inside view of the locking lever of FIG. 2A.
Figure 2A:
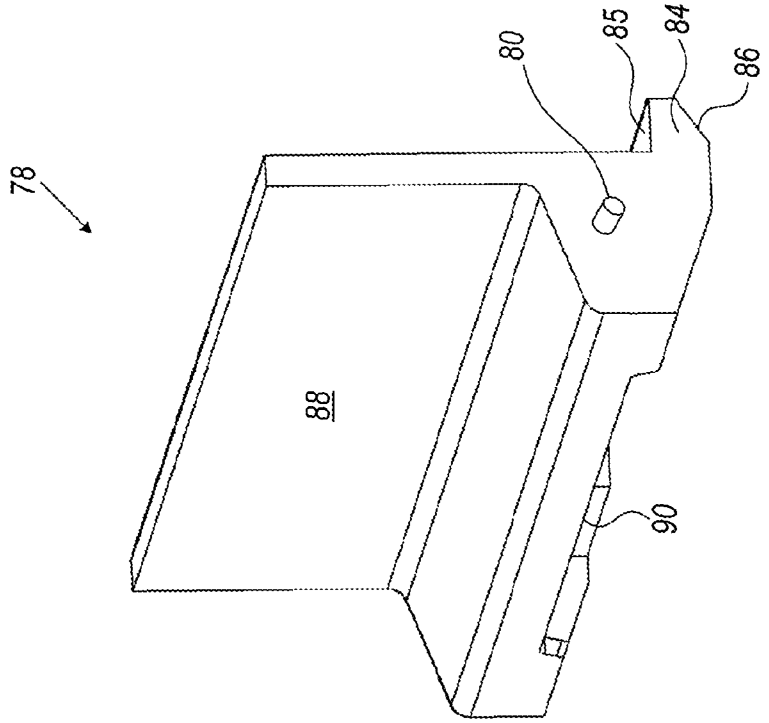
FIG. 2A is a perspective outside view of a locking lever of a utility module according to an example of the disclosure.

A front bar locking mechanism generally designated 76 is configured at a bottom front portion of the second utility module 14, the front bar locking mechanism 76 comprising a pivotally locking lever 78 (seen isolated, in greater detail in FIGS. 2A and 2B). The locking lever is pivotally articulated to the container by two laterally projecting axle pins 80, and is displaceable between a locked position (FIG. 3G) and an open position (FIG. 3E). The locking lever is normally biased into its locked position by a coiled spring 82 bearing against a front portion of the front wall of the container. The locking lever is generally an L-shaped lever with the bottom, short arm 84 thereof configured for engaging below a front locking bar, as will be illustrated hereinafter. Further noted, the short arm 84 is configured with an inclined gliding surface 86, chamfered in direction so as to temporarily displace the locking lever into its open position upon encountering the front locking bar, to facilitate snap locking thereof. The locking lever 78 is manually displaced into the open position, for detaching the utility modules from one another) either by depressing against a push surface 88 (FIG. 2A) extending above the two laterally projecting axle pins 80, or by pulling against a pulling grab 90 disposed below the two laterally projecting axle pins 80.

The front bar locking mechanism 76 cooperates with an inclined arresting wall portion 94 at a bottom portion of the front wall of the base, whereby they constitute together a front locking bar arresting space 98 extending between the top face 85 of the short arm 84 of the locking lever 78, and the arresting wall portion 94.

At an open position of the locking mechanism, the front locking bar arresting space 98 is open from below, allowing the front locking bar 42 to pass into and from the arresting space 98, to thereby position or remove the second utility module with respect to the first utility module.

As illustrated in FIG. 1G, the distance D between the back locking bar 40 and the front locking bar 42 corresponds with a distance d between the back bar coupling recess 64 and the front locking bar arresting space 98. Likewise, the back locking bar 40 and the front locking bar 42 are spaced form the top surface 15 at a distance corresponding with the distance of longitudinal axis X of the back bar coupling recess 64 and the center of front locking bar arresting space 98 from flat surface 70.

Further attention is directed also to FIGS. 3A to 3G, for better understanding how attaching/detaching a second utility module from a first utility module takes place. It is appreciated that in the drawings the utility modules may assume different shapes, however following the essential features of the disclosure. For example, in FIGS. 1A to 1H the first utility module 12 has a greater foot print than that of the second utility module 14, whilst in FIGS. 3A to 3G the second utility module 14' has substantially the same foot print as of the first utility module 12'. Also noted, like reference numbers throughout the drawings are designated with like reference numbers.

Articulation of a second utility module 14' over the first utility module 12' is facilitated by positioning the second utility module 14' over the first utility module 12' and displacing it along the locking path LP so that the back bar coupling recess 64 faces in close proximity the back locking bar 40 (FIGS. 3A to 3D) allowing the second utility module 14' to further displace along the locking path LP so that the back bar coupling recess 64 engages and partially embraces the back locking bar 40. Then a front portion of the second utility module is depressed downwards (in direction of arrow 100 in FIG. 3E) against the first utility module 12' so as to temporarily displace the locking lever 78 into its open position (as it is temporarily pivoted in a clockwise direction as indicated by arrow 103 in FIG. 3E), and as the second utility module 14' comes to rest over the top surface of the first utility module 12', the locking lever 78 springs back into its normally locked position, whereby the front locking bar 42 is now arrested at the front locking bar arresting space 98 (between a top face 85 of the short arm 84 of the locking lever 78, and the arresting wall portion 94 at the bottom portion of the front wall of the base second utility module 14'.

Detaching the second utility module 14' from the first utility module 12' takes place in a reverse sequence of operations. Namely, first the locking lever 78 is displaced into its open position (this is manually done either by pressing against a push surface 88 or by pulling grab 90 of the locking lever 78, against the biasing effect of spring 82, whereby the locking lever 78 is pivoted in a clockwise direction as indicated by arrow 103 in FIG. 3E), whereby a path into/from the front locking bar arresting space 98 is open, and then only the second utility module 14' can be withdrawn from coupling engagement with the first utility module 12'.

FIGS. 4A-4C illustrate examples of a utility module system according to an example of the disclosure. It is seen that the utility module system, generally designated 120 (FIG. 4A) comprises eight levels of utility modules (designated I to VIII, respectively), a bottom one of which is a wheeled container 122 (level I, seen separately in FIG. 6), configured with a pair of rear wheels 124 and a telescopic manipulating handle 126. At least a top portion of the wheeled container 122 is configured with a back locking bar 40 and a front locking bar 42 extending parallel to said back locking bar 40, as disclosed hereinabove.

In the utility module system 120' of FIG. 4B, levels VI to VIII were removed, and wherein it can be seen that level V comprises two utility modules, namely V' and V", articulately mounted over the single utility module IV. Thus it is seen that the foot print of the two containers V' and V" is approximately the same as that of the container IV (and of drawer assembly VI seen in FIG. 4A). However, articulation and detaching of the containers from one another is the same as discussed hereinabove. Also, lateral displacement of the smaller containers V' and V" over the larger utility module IV is prevented by the center bar support 50 disposed at the top face of the utility module IV, which at the assembled position extends between the two containers V' and V".

In the utility module system 120" of FIG. 4C is principally the same as that seen in FIG. 4B, however with smaller container V" removed as well.

FIGS. 5A and 5B illustrate the utility module at level VI of the utility module system 120, and is a two level drawer unit, comprising a housing 130 slidingly accommodating two drawers 132 and 134, said housing configured at a top portion thereof 136 with a back locking bar 40 and a front locking bar 42 extending parallel to said back locking bar 40, as disclosed hereinabove, and having at bottom portion thereof 138 a back bar coupling recess 64 and a front bar locking mechanism 76 configured with pivotally locking lever 78 and an arresting wall portion 94 which together constitute the front locking bar arresting space 98 as discussed herein before.

FIGS. 7A to 7I are directed to utility modules at level VII and VII of the utility module system 120 of FIG. 7A, wherein level VII is an open-top container, e.g. for storage of tools or other goods or equipment, and level VIII comprise one, two or three small storage containers, designated VIII', VIII" and VIII"', respectively.

The open-top container VII (bucket-type container) comprises a body 140 with an open top portion, however comprising a back locking bar 40 and a front locking bar 42 extending parallel to said back locking bar 40, as disclosed hereinabove, and having at bottom portion thereof 138 a back bar coupling recess 64 and a front bar locking mechanism 76 configured with pivotally locking lever 78 and an arresting wall portion 94 which together constitute the front locking bar arresting space 98 as discussed herein before.

In FIG. 7A the three small storage containers VIII', VIII" and VIII"' are articulated on the open-top container VII, articulated over the back locking bar 40 and the front locking bar 42, and with the depressed side portions 72 of the small containers resting over the elevated right bar support 46, elevated left bar support 48 and intermediate elevated central bar support 50. FIGS. 7B to 7F illustrate the assembly with only the left small storage container VIII"' is articulated over the open-top container VII, and in FIGS. 7G to 7I only the central small storage container VIII" is articulated over the open-top container VII.

It is apparent from the drawings and explanations herein that any utility module according to any level can be articulately coupled over an other utility module, providing that they are both configured with an articulation system as discussed herein.

Turning now to FIGS. 8A to 8C of the drawings there is illustrated a utility module being a wall mounting plate 160, configured for substantially vertical mounting and comprising one or more suspending hooks 162 extending from the mounting plate 160 and configured for insertion under a back locking bar 40 of a utility module, such as container 168 of the present example (though it is appreciated that any other utility module configured with a mounting and locking mechanism according to the disclosure can interlock with the mounting plate). The horizontal length H of the suspending hooks 162 corresponds with the distance h of the back locking bar 40 from the back face 170 (as well as the distance h' of the front locking bar 42 from the back face 174), whereby when suspended from the suspending hooks 162, the back face 170 of container 168 bares flush against surface 161 of the wall mounting plate 160. To facilitate easy mounting of a utility module (e.g. container 168) on a wall mount, or other suspension system, the top edges thereof can be chamfered.

Yet an example of a mounting plate unillustrated in FIG. 9 of the drawings, directed to a mounting plate 180 configured with a back locking bar 182 and a front locking bar 184 spaced apart from one another at a distance D, corresponding with the distance D between the back locking bar 40 and front locking bar 42 of the utility modules disclosed hereinbefore, and further wherein the back locking bar 182 and a front locking bar 184 are spaced from the surface 181 of the mounting plate 180 leaving a gap G, overall mimicking the mounting arrangement of the utility modules (e.g. containers) as discussed herein.

In FIGS. 10A and 10B the mounting plate 180 is illustrated at a vertical configuration (i.e. so-called 'wall mounting' configuration), wherein a utility module according to an example of the disclosure, e.g. container 190 (though it is appreciated that any other utility module configured with a mounting and locking mechanism according to the disclosure can interlock with the mounting plate) is articulated to the mounting plate 180 with a front face 192 thereof facing upwards, i.e. with a bottom surface thereof 193 bearing against surface 181 of the mounting plate 180, and whereby the back locking bar 182 and a front locking bar 184 are articulately engaged by the back bar coupling recess 194 and the front locking bar arresting space 196 of the container 190, as discussed hereinbefore, wherein detaching the container from the mounting plate 180 is facilitated by displacing the locking lever 198 into its open position.

In the examples illustrated in FIGS. 11A to 11C the mounting plate 180 is illustrated as a 'horizontal mount', wherein in FIG. 11A there is articulated thereto a single utility module, namely container 190 as in the example of FIG. 10, FIG. 11B illustrates the mounting plate 180 supporting two such containers 190A and 190B, side by side, and FIG. 11C illustrates the mounting plate 180 supporting a large container 190 and a small container 200, as per the coupling mechanism disclosed herein.

With further attention made to FIGS. 12A to 12C there is illustrated a utility module assembly generally designated 220, comprising a first utility module (bottom container) 222 and a second utility module (top container) 224, which in the illustrated example are identical containers, however assembled over one another at an inverted orientation, namely wherein the back side of the second utility module 224 extends over the front side of the first utility module 222.

Accordingly, the back bar coupling recess 226 of the second utility module 224 arrests the front bar 228 of the first utility module 222 and respectively the front locking bar locking arrangement 230 (FIG. 12B) of the second utility module 224 is engaged with the back locking bar 232 of the first utility module 222.

It can be further seen, best in FIG. 12C) that both the utility modules 222 and 224 are each configured with surface engaging feet 236, having a coplanar bottom surface and serving for placing the first utility module 222 over a surface and respectively resting the second utility module 224 over a top surface 238 of the first utility module 222.

The front locking bar locking arrangement 230 of the utility modules illustrated in FIGS. 12A to 13E is configured with a front locking bar arresting space 240, with a locking path 241 having a U-like shape (when viewed from the side, i.e. at a side projection, as best seen in FIGS. 12D, 14E2, 14D2 and 14E2), extending between a front face 242 of a barrier wall 244 and a front locking wall 246, and having a bottom open portion. The front locking bar locking arrangement 230 further comprises a spring loaded pivotal locking lever 250 pivotal about axis 251, biased into a normally locked position (e.g. FIGS. 12D, 14C2 and 14D2), and comprising an arresting tongue 252, such that at the locked position said arresting tongue 252 projects into the U-like shaped locking path of the front locking bar arresting space 240, with an under-bar arresting surface 254 of the arresting tongue 252 closing the locking path 241 (and arresting a locking bar 260 when received therein).

It is seen (clearly in FIG. 12D) and in FIGS. 14C2, 14D2 and 14E2) that the arresting tongue 252 of pivotal locking lever 250 has a slanted bottom surface 253, configured for automatic displacing the pivotal locking lever 250 into its open position upon encountering a locking bar 260 (front or back locking bar, as the case may be), whereby placing the second utility module 224 over the first utility module 222 and applying moderate downwards oriented force on the second utility module results in automatic pivotal displacement of the pivotal locking lever 250 into its open position. However, the pivotal locking lever 250 is manually pivotable into its open position, for sake of unlocking the engagement between the second and the first utility module, by manually depressing a push tab 255 at a top portion of the pivotal locking lever 250 in direction of arrow 257 Alternatively, or in addition, the pivotal locking lever 250 can be configured with a pull tab at a bottom portion of thereof, whereby the locking lever is displaced into its open position by pulling at the pull tab in a counter clock wise direction (not shown).

Considering the other side of the utility module assembly 220, it is seen (best in FIG. 12E, and also in FIG. 14G; though refereeing to a front-to-front utility module assembly) that at the assembled position the back bar coupling recess 226 of the second utility module 224 accommodates front locking bar 228 of the first utility module 222, wherein a back under-bar arresting surface 274 of a back bar arresting tongue 276 (constituting a bottom wall of the coupling recess 226) engages the back locking bar 272 from below.

It is appreciated that at the locked position, both the front locking bar and the rear locking bar of a first utility module (any first utility module baring any second utility module) are arrested by the respective front under-bar arresting surface and back under-bar arresting surface at a tight position, so as to reduce to minimum tolerances and freedom between the utility modules. Optionally, the respective front under-bar arresting surface and back under-bar arresting surface can be slanted for that purpose.

Further attention is now directed to FIGS. 13A to 13C, exemplifying assembly versatility of the utility module system, wherein in the illustrated example the utility module system 285 comprises a first, bottom-most utility module 286, a second, intermediate utility module 288 and another, top-most utility module 290 (comprising two utility modules 290A and 290B at a side-by-side orientation), wherein the intermediate utility module 288 facilitates as a first utility module for the to-most utility module 290, facilitating as a second utility module. It is seen however, that the intermediate utility module 288 is articulated over the bottom-most utility module 286 at a front-to-back orientation (as discussed hereinabove in connection with FIGS. 12A to 12C) and the top-most utility module 290 is articulated over the intermediate utility module 288 at a front-to-front (or back-to-back) orientation. It is noted however that articulation and detaching of the utility units, at any orientation, takes place in the same fashion as discussed herein above.

Also noted in FIG. 13A, the top-most utility modules 290A and 290B are not articulated to one another, but rather are each independently articulated over the top surface of the intermediate utility module 288, and likewise are each independently detachable therefrom, in the same fashion.

The four-level utility module system 310 of FIGS. 14A to 14G follows the same articulation principals as discussed herein above, wherein each utility module engages a utility module disposed below, respectively. It is seen that the back under-bar arresting surface of any second utility module arrests a respective back bar of any first utility module (regardless of the orientation of the two utility modules), as seen in FIG. 12E (front-to-back orientation) and in FIG. 14F (Front-to-front orientation).

Assembling a second utility module over a first utility module takes place following the steps of first placing a second utility module 326 over a respective first utility module 324 at a slightly inclined position (FIG. 14G) and displacing it along a locking path 330 (extending in direction between a front locking bar and a rear locking bar) so that the back bar arresting tongue 334 of the back bar coupling recess 336 sides under the back locking bar 340 of the first utility module 320, with the back under-bar arresting surface extending below the back locking bar 340. Then, the front portion of the second utility module reaches a position at which the slanted bottom surface 253 of the pivotal locking lever 250 rests over the front locking bar 260 of the first utility module (FIG. 14D), and then the second utility module is pressed against the first utility module, resulting in automatic/spontaneous momentarily displacement of the pivotal locking lever 250 in a clock-wise direction (FIG. 14E), such that when the second utility module comes to rest over the top surface of the first utility module the pivotal locking lever 250 returns to its locked position (under biasing effect), whereby the two utility modules are now articulated to one another.

Turning now to FIGS. 15A to 15C there is illustrated a three-level utility module assembly generally designated 350, according to yet an example of the disclosure, however in accordance with the same principals of the disclosure. The utility module assembly 350 comprises a bottom most, first utility module 352, an intermediate, second utility module 354 and a top, second utility module 356, the latter being a half sized utility module. Also noted, the intermediate, second utility module 354 is articulated over the bottom most, first utility module 352 at a front-to-back orientation, and the top utility module 356 is articulated over the intermediate utility module 354 at a front-to-front orientation, as already exemplified herein before. However, the main difference resides in the front bar locking mechanism comprises a push-type slider locking lever 360, as will be discussed herein below in greater detail.

As seen in FIG. 15C displacement of a second utility module over a surface of a respective first utility module (i.e. lateral/side-to-side displacement) is prevented by the surface engaging feet 364 (continuous or interrupted) which at an assembled position are disposed between facing side walls 366A and 366B of a locking bar supports, projecting from a top surface of the first utility module. This arrangement can apply at one or both a front side and a back side of a utility module.

Turning now to FIGS. 16A to 16G there is illustrated four-level utility module assembly according to an example of the disclosure, generally designated 390 and comprising at a first level two half-sized utility modules 392A and 392B, and three more identical full-sized utility modules 394, 396 and 398 articulated to one another.

In the present example the half-sized utility modules 392A and 392B, seen isolated in FIG. 16D, comprises a top lid 399 articulated to a container body 400, said lid 399 made of injected polymer material and is integrally configured with a front locking bar 404 and a back locking bar 406. The front locking bar 404 and a back locking bar 406 extend over locking supports 408, supporting the locking bars parallel to one another and equally spaced from a top face of the lid 399. Though integrally molded with the lid 399, the locking bars are flat (as opposed to previously disclosed round locking bars) and function principally similar to the round locking bars disclosed herein before, as will be illustrated.

Similar to disclosure above, each second utility module is configured with a front locking bar arresting space 391 (best seen in FIG. 16D), with a locking path 393 having a U-like shape (when viewed from the side, i.e. at a side projection extending between a front face 395 of a barrier wall 397 and a front locking wall 401, and having a bottom open portion.

Turning now to FIGS. 16E to 16G, reference is made to the sliding locking lever 360. It is seen that the locking lever 360 is configured for only sliding displacement by sliders 420 within a recess 422 configured at a side wall of the utility module. The slider 420 is configured with a stopper projection 424 slidingly received within a restricting groove 426, limiting sliding displacement of the lever, respectively. A coiled biasing spring 430 biases the locking lever 360 into the closed position (FIGS. 16E and 16G). The locking lever 360 further comprises a locking tongue 432 with a front under-bar arresting surface 434 and an inclined locking bar engaging surface 436, and a front push tab 440 exposed at a side wall of the utility module.

Assembling a second utility module over a first utility module takes place following the following steps: first (as in FIG. 16E), the second utility module 398 is placed slightly inclined over the first utility module 396, sliding it along a locking path 414 (extending in direction between a front locking bar 416 and a rear locking bar 418) so as to dispose the back bar arresting tongue of the back bar coupling recess under the back locking bar of the first utility module, with the back under-bar arresting surface extending below the back locking bar, similar to the disclosure if FIG. 14G.

Then, the front portion of the second utility module reaches a position at which the slanted bottom surface 436 of the slider locking lever 360 rests over the front locking bar 445 of the first utility module, and then the second utility module is pressed against the first utility module, resulting in automatic/spontaneous momentarily sliding displacement of the pivotal locking lever 360 in direction of arrow 452 (FIG. 16F), such that when the second utility module 398 comes to rest over the top surface of the first utility module 396 the locking lever 360 returns to its locked position as in FIG. 16G (under biasing effect of spring 430), whereby the two utility modules are now articulated to one another.

FIGS. 16H and 16D illustrate articulation of a second utility module to the first utility module 392, which as mentioned herein before has oval or flat front locking bar 404 and rear locking bar, both integrally molded with the lid 399. It can be seen in FIG. 16H that the push-type slider locking lever 360 is well configured for arresting engagement also with the flat front locking bar 404, by the front under-bar arresting surface 434 extending below said front locking bar 404 and arresting it at the locked position. In FIG. 16I one can note the back under-bar arresting surface 450 of the back bar arresting tongue 452 of the back bar coupling recess 456 extending below the back flat locking bar 406, following the same principals discussed herein above e.g. with reference to FIG. 14G.

It is appreciated, according to any of the examples of the present disclosure, the back bar coupling recess of a utility module can extend in alignment with a front bar locking arrangement or shifted (i.e. along the locking path extending between the front side and the back side) or shifted.

Turning now to FIGS. 17A to 17C there is illustrated utility module assemblies according to different examples of the disclosure, however, wherein the first utility module 460 is configured with an additional locking bar, namely intermediate locking bar 462, which in the illustrated example is disposed symmetrically between a front locking bar 464 and a back locking bar 466, and wherein all three locking bars are parallel to one another, equally spaced from a top surface 468 of the lid 470 of the utility module 460 and extend perpendicular to a mounting/locking path. It is appreciated that when considering extremely large utility modules, more than one intermediate locking bars can be configured, at different locations over a top surface of the utility module.

In FIGS. 17A and 17B a second utility module 480 is articulated over the first utility module 460, wherein the footprint of the second utility module 480 is about half that of the first utility module 460. A bottom face 482 of the second utility module 480 is configured with a groove 484 extending from side to side and disposed in register with the location and size of the intermediate locking bar 462 and its side supports 488, and however sufficiently large to facilitate minor sliding displacement required for articulation of the second utility module 480 over the first utility module 460, according to the disclosure herein above.

In FIG. 17C the first utility module 460 is the same as that seen in FIGS. 17A and 17B, however wherein the second utility module 490 is a small unit (e.g. a power tool battery pack, an organizer, etc.), having a small footprint and articulated to the first utility module 460 over the intermediate locking bar 462 and the back locking bar 466 (similar to the disclosures above), and wherein additional one or more utility modules can be articulated over the first utility module.

The invention claimed is:

1. A utility module system comprising at least a first utility module and a second utility module; the first utility module comprising a top portion configured at a back portion thereof with at least one back locking bar and at a front portion thereof with at least one front locking bar extending parallel to said back locking bar; said back locking bar and said front locking bar disposed parallel to a top surface of the top portion and front being spaced from the top surface; the second utility module comprising a bottom base portion configured at a back portion thereof with a back bar coupling recess facing towards a back side and having a back under-bar arresting surface; and a front bar locking arrangement comprising an inclined front facing barrier wall and a locking lever comprising an arresting tongue extendable in front of said inclined front facing barrier wall and having a front under-bar arresting surface, said inclined front facing barrier wall forms an acute angle with said bottom base portion, said locking lever displaceable between a locked position at which the front under-bar arresting surface extends at a front locking bar arresting space in front of the inclined front facing barrier wall, and an open position at which the locking lever is displaced to facilitate passage of said front locking bar into and from the front locking bar arresting space.

2. The utility module system of claim 1, wherein the front locking bar arresting space defines a locking path extending between a front face of the inclined front facing barrier wall and a rear face of a front locking wall, and wherein said locking path is selectively interrupted by the arresting tongue displaceable between the locked position at which it projects into the locking path, and the open position at which it is displaced away from the locking path.

3. The utility module system of claim 2, wherein the locking path of the front locking bar arresting space has a U-like side projection shape, extending between the front face of the inclined front facing barrier wall and the front locking wall, and having a bottom open portion.

4. The utility module system of claim 2, wherein the top portion is substantially flat, with elevated bar supports, from which the back locking bar and the front locking bar extend, said bar supports extending parallel to the locking path, wherein the bar supports extend across the top portion, continuously or interrupted.

5. The utility module system of claim 1, wherein the top portion is integral with a body portion of the first utility module, or it can be articulated thereto.

6. The utility module system of claim 1, wherein the back locking bar and the front locking bar are equally spaced from the top surface of the top portion.

7. The utility module system of claim 1, wherein the locking lever of the front bar locking mechanism is normally biased into the locked position.

8. The utility module system of claim 1, wherein the locking lever is configured with an inclined gliding surface, chamfered in direction so as to temporarily displace the locking lever into its open position upon encountering the front locking bar.

9. The utility module system of claim 1, wherein the locking lever is hingedly articulated through a hinge articulation at a front wall portion of a body of the second utility module.

10. The utility module system of claim 1, wherein the locking lever is displaced into the open position by depressing against a push surface extending above a hinging articulation.

11. The utility module system of claim 1, wherein the locking lever is displaced into the open position by sliding displacement or pivotal displacement.

12. The utility module system of claim 1, wherein the distance between the back locking bar and the front locking bar corresponds with a distance between the back bar coupling recess and the front locking bar arresting space.

13. The utility module system of claim 1, wherein the vertical height of the back bar coupling recess and the front locking bar arresting space corresponds with the thickness of the back locking bar and the front locking bar, respectively.

14. The utility module system of claim 1, wherein the back bar coupling recess is formed within a U-like shaped bar receiving portion with an open end thereof facing a back wall of the second utility module, said bar receiving portion having a longitudinal axis extending substantially parallel to the locking path.

15. The utility module system of claim 14, wherein the U-like shaped bar receiving portion is configured with a bottom arm portion being shorter than a top arm portion, said top arm portion extending from a back wall of the second utility module.

16. The utility module system of claim 1, wherein the locking lever is an L-shaped lever, wherein at the locked position a short arm thereof is configured for engaging below the front locking bar.

17. The utility module system of claim 1, wherein the back locking bar and the front locking bar each extend along at least a portion of the rear portion and the front portion of the top surface, respectively.

18. The utility module system of claim 1, wherein the front locking bar and the back locking bar are equally spaced from the respective back wall and front wall of the utility module.

19. The utility module system of claim 1, wherein the locking path can extend in direction from the front side towards the back side, or from in direction from the back side towards the front side.

20. The utility module system of claim 1, wherein one or more intermediate locking bar extend between the front locking bar and the back locking bar, wherein a reduced size second utility module is interlockable between the intermediate locking bar and the front locking bar, or between said intermediate locking bar and a back locking bar.

21. The utility module system according to claim 20, wherein the second utility module is configured at a bottom face thereof with a depression disposed in register with the one or more intermediate locking bar of the first utility module.

* * * * *